(12) United States Patent
Mochizuki

(10) Patent No.: US 10,539,848 B2
(45) Date of Patent: Jan. 21, 2020

(54) IN-PLANE RETARDATION SWITCHING DEVICE

(71) Applicant: I-CORE TECHNOLOGY, LLC, Louisville, CO (US)

(72) Inventor: Akihiro Mochizuki, Louisville, CO (US)

(73) Assignee: I-CORE TECHNOLOGY, LLC, Louisville, CO (US)

( * ) Notice: Subject to any disclaimer, the term of this patent is extended or adjusted under 35 U.S.C. 154(b) by 75 days.

(21) Appl. No.: 15/227,528

(22) Filed: Aug. 3, 2016

(65) Prior Publication Data
US 2018/0039124 A1  Feb. 8, 2018

(51) Int. Cl.
*G02F 1/137* (2006.01)
*G02F 1/139* (2006.01)

(52) U.S. Cl.
CPC ........ *G02F 1/13731* (2013.01); *G02F 1/1393* (2013.01); *G02F 1/13781* (2013.01); *G02F 2203/24* (2013.01)

(58) Field of Classification Search
None
See application file for complete search history.

(56) References Cited

U.S. PATENT DOCUMENTS

| | | | | |
|---|---|---|---|---|
| 5,755,997 A * | 5/1998 | Shivkumar | ............ | C07C 69/92 252/299.65 |
| 5,781,265 A * | 7/1998 | Lee | .................... | G02F 1/13781 349/103 |
| 6,103,322 A * | 8/2000 | Gibbons | ................ | C08G 73/10 349/123 |
| 6,549,255 B2 * | 4/2003 | Stebler | .............. | G02F 1/133711 349/123 |
| 7,283,196 B2 * | 10/2007 | Helgee | .................. | C09K 19/02 349/123 |
| 7,576,814 B2 * | 8/2009 | Choi | ...................... | C09K 19/02 349/100 |
| 7,787,088 B2 * | 8/2010 | Choi | ................ | G02F 1/134363 349/128 |
| 7,889,299 B2 * | 2/2011 | Choi | .................... | G02F 1/1337 349/127 |
| 2004/0196428 A1 | 10/2004 | Mochizuki et al. | | |
| 2011/0102731 A1 | 5/2011 | Takanashi et al. | | |
| 2011/0141418 A1 * | 6/2011 | Ennis | .................... | C09K 19/28 349/123 |

OTHER PUBLICATIONS

Invitation to Pay Additional Fees, mailed Aug. 17, 2017, directed to PCT Application No. PCT/US2017/032937; 15 pages.

(Continued)

*Primary Examiner* — Edward J Glick
*Assistant Examiner* — David Y Chung
(74) *Attorney, Agent, or Firm* — Morrison & Foerster LLP

(57) ABSTRACT

An in-plane retardation switching device includes a first substrate, a second substrate, a non-chiral smectic C phase liquid crystal material disposed between the first substrate and the second substrate. The liquid crystal material is of a bulk state. The liquid crystal material has a phase transition sequence of a smectic C phase, a smectic A phase, a nematic phase and an isotropic phase in this order. The liquid crystal material does not have spontaneous polarization and is configured to be driven by quadra-pole momentum of the liquid crystal material.

7 Claims, 40 Drawing Sheets

(56) References Cited

OTHER PUBLICATIONS

Meyer, Robert B., "Piezoelectric Effects in Liquid Crystals," Physical Review Letters, vol. 22, No. 18, May 5, 1969, pp. 918-921.

Mochizuki, Akihiro, "An introduction to PSS-LCDs: A fast-optical-response smectic LCD" Journal of the SID, vol. 14/6, 2006, pp. 529-536.

Xing, Hong-Yu et al, "Flexoelectric-Induced Voltage Shift in Hybrid Aligned Nematic Liquid Crystal Cell," Journal of Communication for Theoretical Physics, vol. 56, No. 5, Nov. 15, 2011, pp. 939-942.

Coles, Harry et al., "Ultrafast High Optical Contrast Flexoelectric Displays for Video Frame Rates," SID Technical Digest, Paper No. 40.1, 2012, pp. 544-547.

Lai, Cheng-Wwi et al., "Investigation of Flexoelectric Effect in Vertically-Aligned In-Plane-Switching Mode by Low Frequency Driving," SID Technical Digest, Paper No. 24.2, 2014, pp. 312-313.

Toyotaka, Kouhei et al., "513-ppi Liquid Crystal Display Using C-Axis Aligned Crystalline Oxide Semiconductor with Narrow Bezel and Aperture Ratio Greater Than 50%," SID Technical Digest, Paper No. 44.3, 2014, pp. 634-637.

Kim, Jung-Wook et al., "Elimination of Image Flicker in a FFS Panel under Low Frequency Driving," SID Technical Digest, Paper No. 73.3, 2015, pp. 1081-1083.

Xu, Daming et al., "Image Sticking Reduction of Fringe Field Switching LCDs," SID Technical Digest, Paper No. 49.2, 2015, pp. 739-742.

International Search Report and Written Opinion dated Dec. 5, 2017, directed to PCT Application No. PCT/US2017/032937; 15 pages.

\* cited by examiner

IN-PLANE RETARDATION SWITCHING DEVICE

FIELD OF THE INVENTION

The present invention relates generally to liquid crystal display and liquid crystal phase modulation devices. In particular, the present invention relates to a liquid crystal device requiring fast optical response as well as clear separation between in-plane and out-of-plane retardation switching. These specific requirements enable high image quality, fast response, full-color, motion image liquid crystal displays, three-dimensional displays, and fast phase modulation devices.

BACKGROUND OF THE INVENTION

Recent intense and rapid improvement of image quality in liquid crystal display devices has identified new technical challenges. One such challenge is local image unevenness in a display panel primarily due to the extremely fine pixel pitch pattern. This particular issue differs from overall unevenness of image quality in a display panel, also known as "Mura", but is dependent on fundamental physical properties in terms of fringe field influence and the dielectric response of the liquid crystal material. For several years, so called "in-plane switching" (IPS) and fringe field switching (FFS) have become mainstream technologies for their relatively fast inter-gray shade optical response times as well as wide viewing angles. Despite such attractive features of IPS and ITS LCD technologies, both technologies have an image degradation problem with fine pixel pitch pattern displays. There are multiple interpretations of this problem, including flexo-electric effect (*SID (Society for Information Display)* Technical Digest, Paper No. 24.2: Investigation of Flexo-electric Effect in Vertically aligned in Plane Switching Mode by Low Frequency Driving, Cheng-Wwi Lai, Sau-Wen Tsao, Cho-Yan Chen, Tien-Lun Ting, Wen-Hao Hsu and Jenn-Jia Su, page 312-313 (2014)), distorted electric field influence on flickering (*SID Technical Digest*, Paper No. 733: Elimination of Image Flicker in a FFS Panel under Low Frequency Driving, Jung-Wook Kim, Tae-Hoon Choi, Tae-Hoon Yoon, E-Joon Choi and Ji-Hoon Lee, page 1081-1083 (2015)), and distorted electric field influence on image sticking (*SID Technical Digest*, Paper No. 49.2: Image Sticking Reduction of Fringe Field Switching LCDs, Darning Xu, Fenglin Peng, Haiwei Chen, Jiamin Yuan, Shin-Tson Wu, Ming-Chen Lii, Seok-Lyul Lee and Wen-Ching Tsai, page 739-742 (2015)). Aside from the particular technical accuracy of these analyses, there is consensus that the image quality degradation problem is due to the extremely fine pixel pitch of display devices.

The most advanced recent fine pixel pitch FFS LCD panels, used widely in smart phones, have approximately 800 pixels per inch, or a sub-pixel pitch of approximately 30 microns, unlike displays with large pixel pitches of more than 200 microns. Panel with such fine pixel pitches must overcome the local fringe field influence, which degrades local image quality in a display panel. Although the image degradation of each pixel pitch is local issue, the ratio of the degradation area to overall area increases as the PPI (Pixel Per Inch) increases, due to the fine pixel pitch. Therefore, the image degradation issue becomes an overall display issue, rather than a local area issue. Moreover, even finer pixel pitch is required to provide more vivid image quality. Image degradation due to increased pixel pitch is accompanied by slower response. Smaller pixel pitch results in increased boundary area relative to the bulk response area. Due to the larger boundary area at finer pixel pitches, the conflict area of liquid crystal molecular movement becomes larger, resulting in slower response time. Such an increase in response time is a critical issue, not only for display applications, but also for phase modulation applications. Therefore, local image degradation with fine pixel pitch is a technical problem in need of solution.

In addition to high resolution display applications, such as smart phones, an extremely fine pixel pitch pattern is also required for phase modulation purposes such as three-dimension display applications and light beam steering. Such applications require control of light phase rather than light amplitude. Therefore, the requirement for extremely fine pixel pitch is intrinsic. It is increasingly important to solve local liquid crystal molecular behavior under electric field application for both amplitude modulation, primarily used for display applications, and phase modulation, primarily used for photonics applications. Additionally, both amplitude and phase modulation applications require very fast optical response. To satisfy such technical requirements, sufficiently fast optical response and sufficient stability to retain the initial designed alignment configuration to resist disturbing the electric field, such as uncontrollable fringe field, are both critical issues.

Current conventional IPS/FFS LCD technology requires "inter digit electrode structure" to drive liquid crystal molecules. Typical inter digit electrode structure is described in SID (Society for Information Display) Technical Digest, Paper No. 44.3: 513-ppi Liquid Crystal Display Using C-Axis Aligned Crystalline Oxide Semiconductor with Narrow Bezel and Aperture Ratio Greater than 50%, Kouhei Toyotaka and others, page 634-637 (2014). When the pixel pitch of an inter digit electrode pitch represented by so called line and space (the sum of electrode line width and electrode gap) is larger than approximately 200 microns, the fringe electric field has no significant effect on liquid crystal molecule alignment. Due to the relatively large distance between neighboring electrodes relative to electrode length, most of the electric field applied between two neighboring inter digit electrodes is substantially parallel to the substrates, resulting in a substantially ideal electric field direction to drive IPS/FFS liquid crystal molecules. Conversely, when the pixel pitch is smaller than approximately 50 microns, an effective electric field to drive liquid crystal molecules in an IPS/FFS LCD panel significantly distorts the electric field direction as shown in FIG. 1. Due to the small distance between two neighboring electrodes, the electric field near each electrode edge area has significant distortion. The actual electric field distortion is even enhanced by the liquid crystal itself. The dielectric constant of most liquid crystal material is larger than that of air or in a vacuum, and often larger than 20. Since the liquid crystal panel is filled with a medium having a larger dielectric constant, the actual electric field power line is more distorted than in a vacuum or with air, as illustrated in FIG. 2 due to dielectric reordering or the liquid crystal molecules. Such a significantly distorted electric field drives liquid crystal molecules into almost vertical alignment when positive dielectric anisotropy liquid crystal material is deployed as an IPS/FFS LCD, as illustrated in FIG. 3. Due to the positive dielectric anisotropy of liquid crystal molecules (the dielectric constant parallel to the long molecular axis is larger than that perpendicular to the long molecular axis), the liquid crystal molecules align along the electric power line direction. When the electric power line is distorted, as shown in FIGS. 1 and 2, the liquid crystal molecules change their molecular direction with the electric power line direction. Such electric field distortion is determined not only by inter digit electrode pixel pitch, but also by the mutual relationship between pixel pitch and the liquid crystal panel gap, as well as the permittivity of the filled liquid crystal materials. Since IPS/FFS LCDs are driven by the fringe electric field, they work well without any significant degradation of image quality, including reduction of contrast ratio, flickering, and image sticking when the applied electric field direction is substantially parallel to the top and bottom substrates. However, when electrode pitch shrinks below approximately 50 microns, the applied electric fringe field becomes significantly distorted, resulting in unevenness of image quality as well as flickering and image sticking as described by the published references cited above, regardless of liquid crystal material.

Local electric field distortion creates another technical problem. The liquid crystal molecular response has variation due to uneven electric field strength. Such response variation creates mutual conflict among liquid crystal movement, resulting in reduced response time.

As described above, fringe electric field distortion is an intrinsic phenomenon governed by the relative distance between electrode gap and electrode width. Additionally, market demand for display devices and three-dimensional displays is trending toward fine pitch, higher resolution displays. Moreover, for phase modulation devices, most applications require extremely fine pixel pitch configuration to have sufficiently smooth continuous phase variation in spatially. Here, the meaning of smooth continuous phase variation in spatially is provided by a small difference in refractive indices formed by slightly different orientation of the liquid crystal molecules, along with fine pitch patterned electrode in a liquid crystal panel. Therefore, electric field distortion is a more significant issue for phase modulation devices than display devices in terms of the controllability of smooth and/or continuous refraction indices of liquid crystal panels. Therefore, new liquid crystal device technology which enables fine pixel pitch and high resolution devices without image quality degradation, including flickering, image sticking, and uniform image quality, is desired.

Electric power line distortion is also a technical issue for phase modulation devices. In particular, the problem exists for phase modulation devices when phase modulation switching mixes both in-plane and out-of-plane modulation. Some phase modulation applications require only in-plane retardation switching for clear phase modulation. Other applications require only out-of-phase retardation switching for clear phase modulation. IPS/FFS liquid crystal devices only require in-plane retardation switching. However, there is a mixture of in-plane and out-of-plane retardation due to the fringe field influence described above. In particular, for the fine pixel pitch configuration required for phase modulation devices, current IPS/FFS liquid crystal devices do not separate in-plane and out-of-plane retardation switching.

For out-of-plane retardation, a planar aligned electrically controlled birefringence (ECB) liquid crystal panel should provide only out-of-plane retardation switching. FIGS. 4(a) and 4(b) show a typical ECB panel operating principle. As shown in FIG. 4(a), when no voltage is applied, liquid crystal molecules show a planar aligned structure which is substantially parallel to the top and bottom substrates. The alignment is not completely parallel due to the surface pre-tilt angle. A typical surface pre-tilt angle is between 1 and 3 degrees. With such a small pre-tilt angle, when a voltage is applied to the panel, each liquid crystal molecule in the panel moves in the same direction. Such a small pre-tilt angle works as a direction leading trigger for each liquid crystal molecule. When an external driving voltage is applied, as shown in FIG. 4(b), most liquid crystal molecules align perpendicularly to the top and bottom substrates, or along the electric power line. Therefore, the ECB case illustrated in FIGS. 4(a) and 4(b) provides only out-of-plane retardation switching between with and without application of voltages to the panels. The cases shown in FIGS. 4(a) and 4(b) use large, single electrodes. Therefore, the fringe field influence is negligible. When the fringe field is negligible, such an ECB panel provides only out-of-plane retardation switching. However, fine pixel pitch is required in most cases. In such case, the fringe field influence is not negligible, but a large electric field, as illustrated in FIG. 5. As shown in FIG. 5, fine pixel pitch creates a fringe field and liquid crystal molecules do not respond with simple parallel or perpendicular alignment to the top and bottom substrates in the distorted electric power line area, resulting in a mixture of both in-plane and out-of-plane retardation switching. Therefore, for both amplitude and phase modulation purposes, the fringe field influence creates unacceptable levels of degradation when the pixel pitch size is less than approximately 50 microns.

SUMMARY OF THE INVENTION

The invention provides an in-plane retardation switching device that includes a first substrate, a second substrate, a non-chiral smectic C phase liquid crystal material disposed between the first substrate and the second substrate. The liquid crystal material is of a bulk state. The invention also provides another in-plane retardation switching device that includes a first substrate, a second substrate, a liquid crystal material disposed between the first substrate and the second substrate. The liquid crystal material has a phase transition sequence of a smectic C phase, a smectic A phase, a nematic phase and an isotropic phase in this order. The invention further provides an in-plane retardation switching device that includes a first substrate, a second substrate, a non-chiral smectic C phase liquid crystal material disposed between the first substrate and the second substrate. The liquid crystal material does not have spontaneous polarization and is configured to be driven by quadra-pole momentum of the liquid crystal material.

DETAILED DESCRIPTION OF THE INVENTION

Fringe electric fields are primarily governed by electrode gap width and electrode width, as discussed above and in published papers such as SID (Society for Information Display) Technical Digest, Paper No. 24.2: Investigation of Flexoelectric Effect in Vertically aligned in Plane Switching Mode by Low Frequency Driving, Cheng-Wwi Lai, Sau-Wen Tsao, Cho-Yan Chen, Tien-Lun Ting, Wen-Hao Hsu and Jenn-Jia Su, page 312-313 (2014). When the applied electric field is distorted, it is difficult to uniformly control the liquid crystal molecular axis between two inter digit electrodes. Therefore, to avoid uneven applied electric fields or have sufficiently uniform electric fields applied to the liquid crystal molecules, the inter digit electrode structure should be abandoned. In other words, application of an electric field in the vertical direction between the top and bottom substrates significantly reduces unfavorable unevenness of the electric field.

Most currently know liquid crystal drive modes, such as patterned vertical alignment (PVA) or multiple vertical alignment (MVA), give only an out-of-plane retardation change when a vertical electric field is applied to the liquid crystal layer by top and bottom electrodes. Since the externally applied electric field has a vertical direction relative to the liquid crystal layer, there is no means to drive liquid crystal molecules in plane by the vertically applied electric field without any coupling driving toque at the liquid crystal layer. Both PVA and MVA use negative dielectric anisotropy liquid crystal materials and their initial liquid crystal molecular alignment is vertical to both the top and bottom substrates. When a vertical electric field to the liquid crystal layer is applied, only the vertical element of the externally applied electric field couples with negative dielectric anisotropy of liquid crystal materials. When the pixel pitch is large enough, as discussed above, most of the externally applied electric field works in the vertical direction to the liquid crystal layer, resulting in well-controlled liquid crystal molecular movement behavior. This liquid crystal movement behavior is from vertical alignment to horizontal alignment both to top and bottom substrates, resulting in out-of-plane retardation switching. However, when pixel pitch is very small, even externally applied electric field is perpendicular to liquid crystal layer, local area in the liquid crystal panel, specifically near to fine pitch patterned electrode edge area's electric field has parallel components of electric field to both the top and bottom electrodes.

Figure 1:
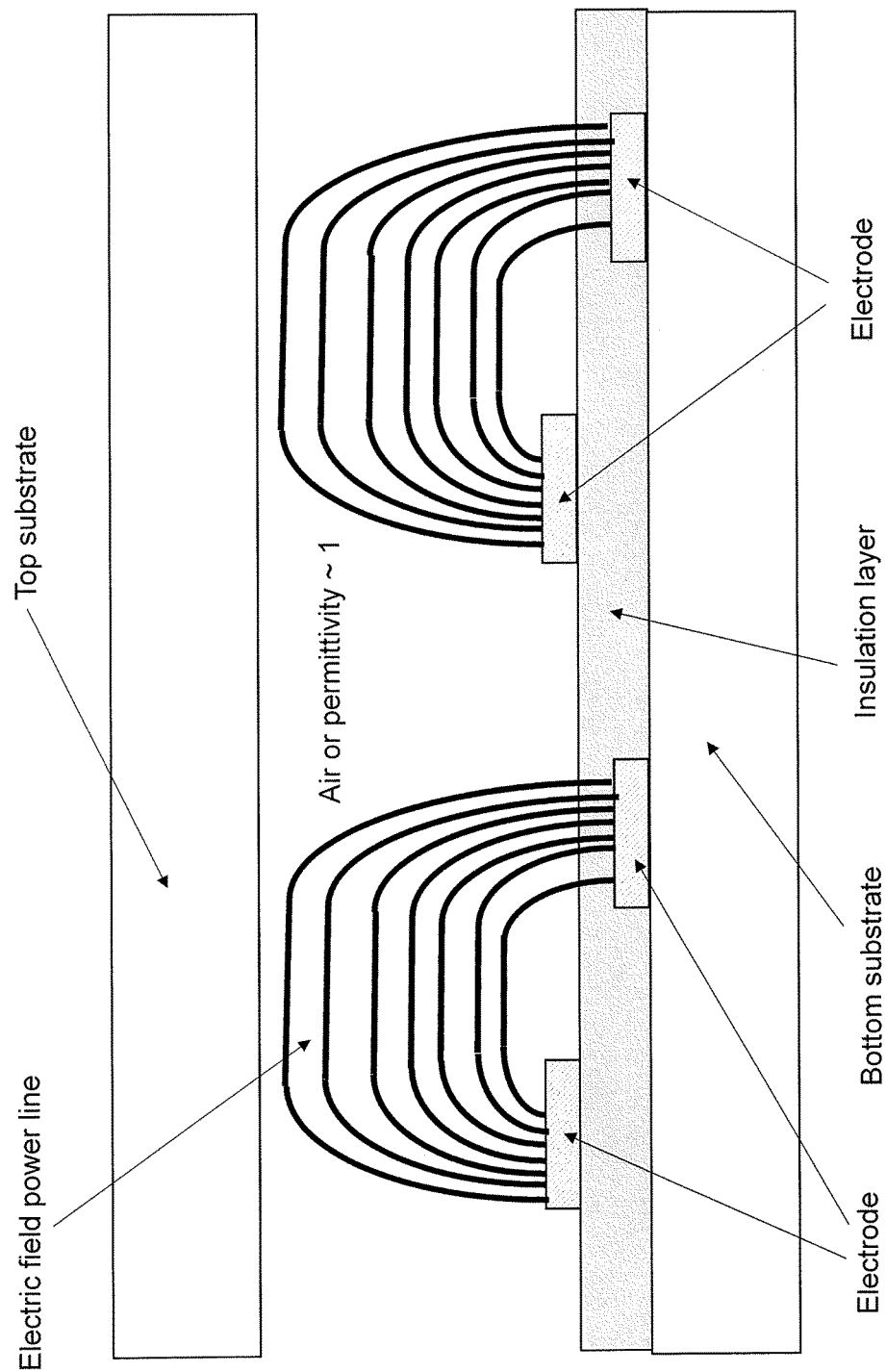
FIG. 1 illustrates an exemplary electrode structure of an FFS LCD panel and its electric power line without consideration of the influence of the dielectric constant of the filled medium.
Figure 2:
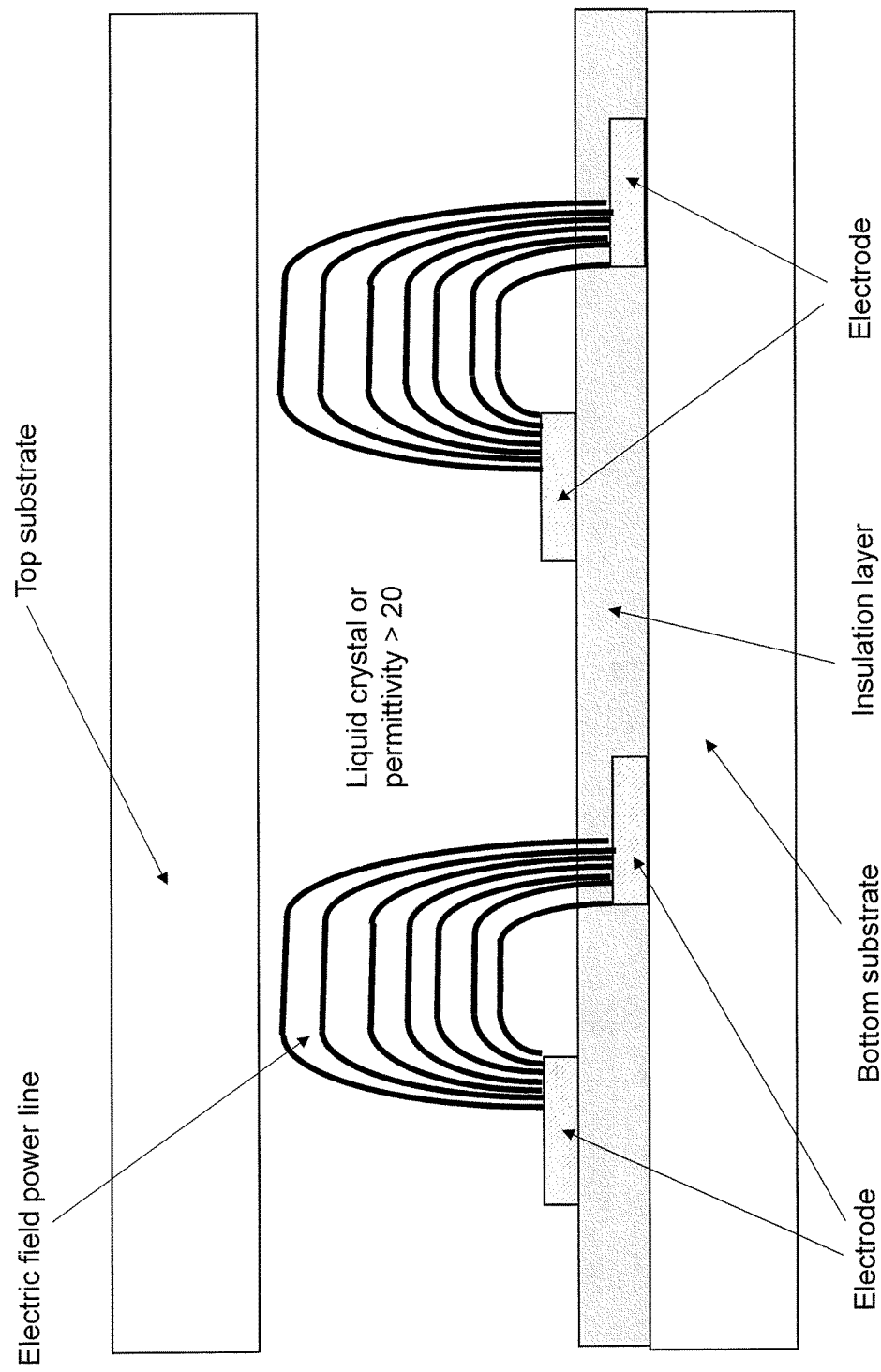
FIG. 2 illustrates an exemplary electrode structure of an FFS LCD panel and its electric power line with consideration of the influence of the dielectric constant of the filled medium.
Figure 3:
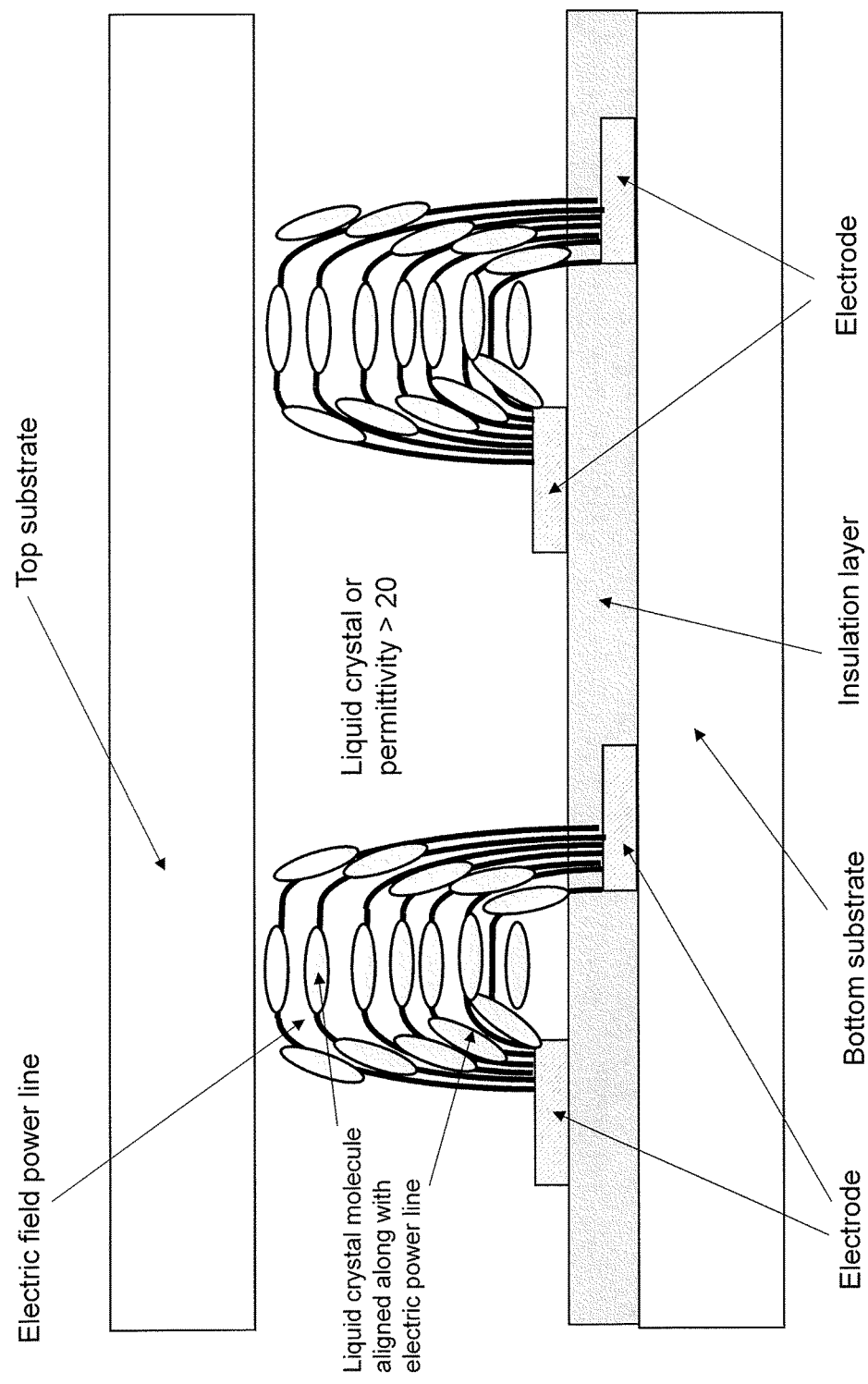
FIG. 3 illustrates a typical liquid crystal molecular alignment under the influence of a distorted electric power line with consideration of the influence of the dielectric constant of the filled medium.
Figure 4:
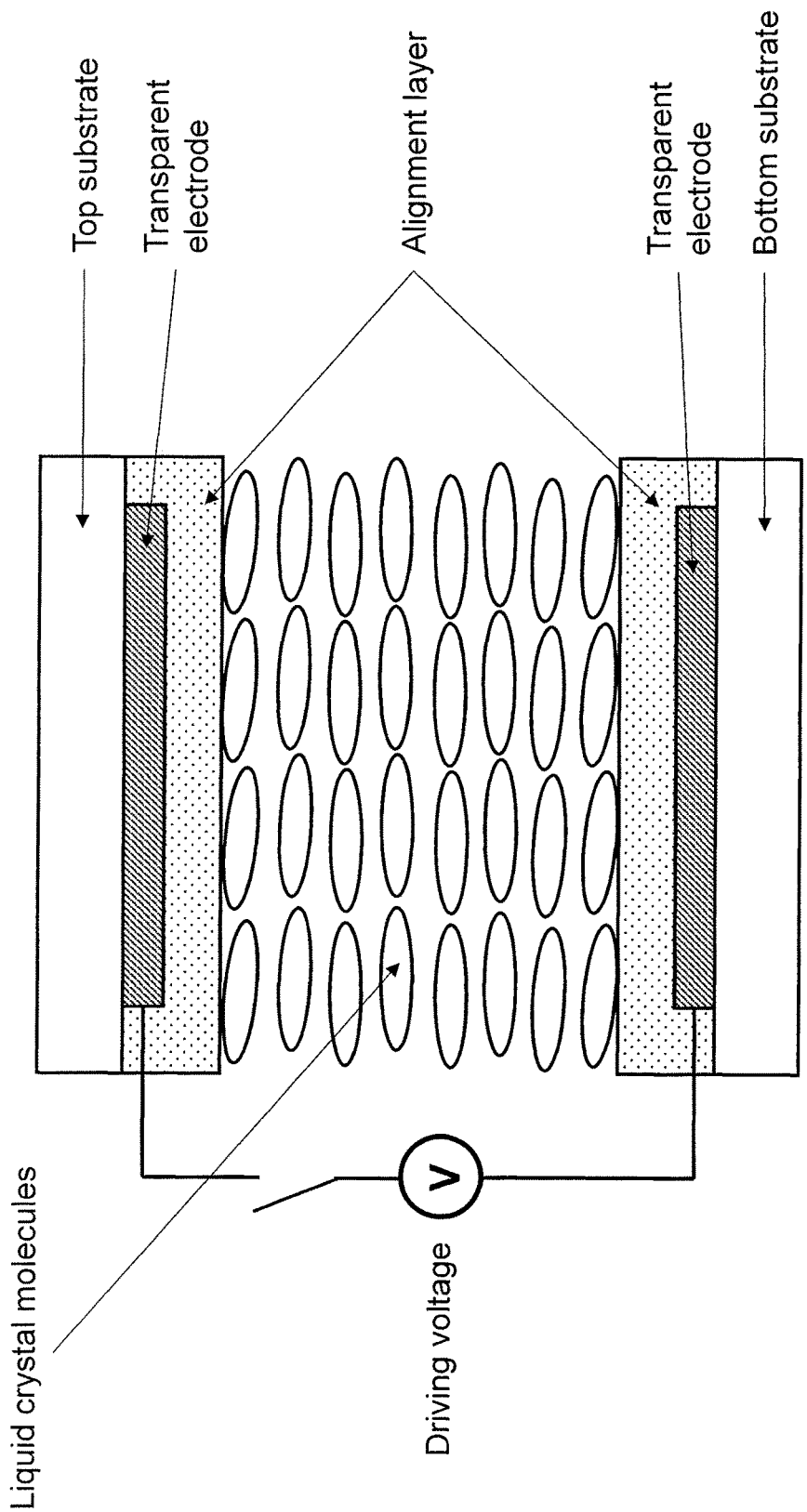
FIG. 4(a) illustrates the initial liquid crystal molecular alignment status of a planar aligned ECB panel.
FIG. 4(b) illustrates the liquid crystal molecular alignment status of a planar aligned ECB panel with application of a driving voltage.
Figure 4:
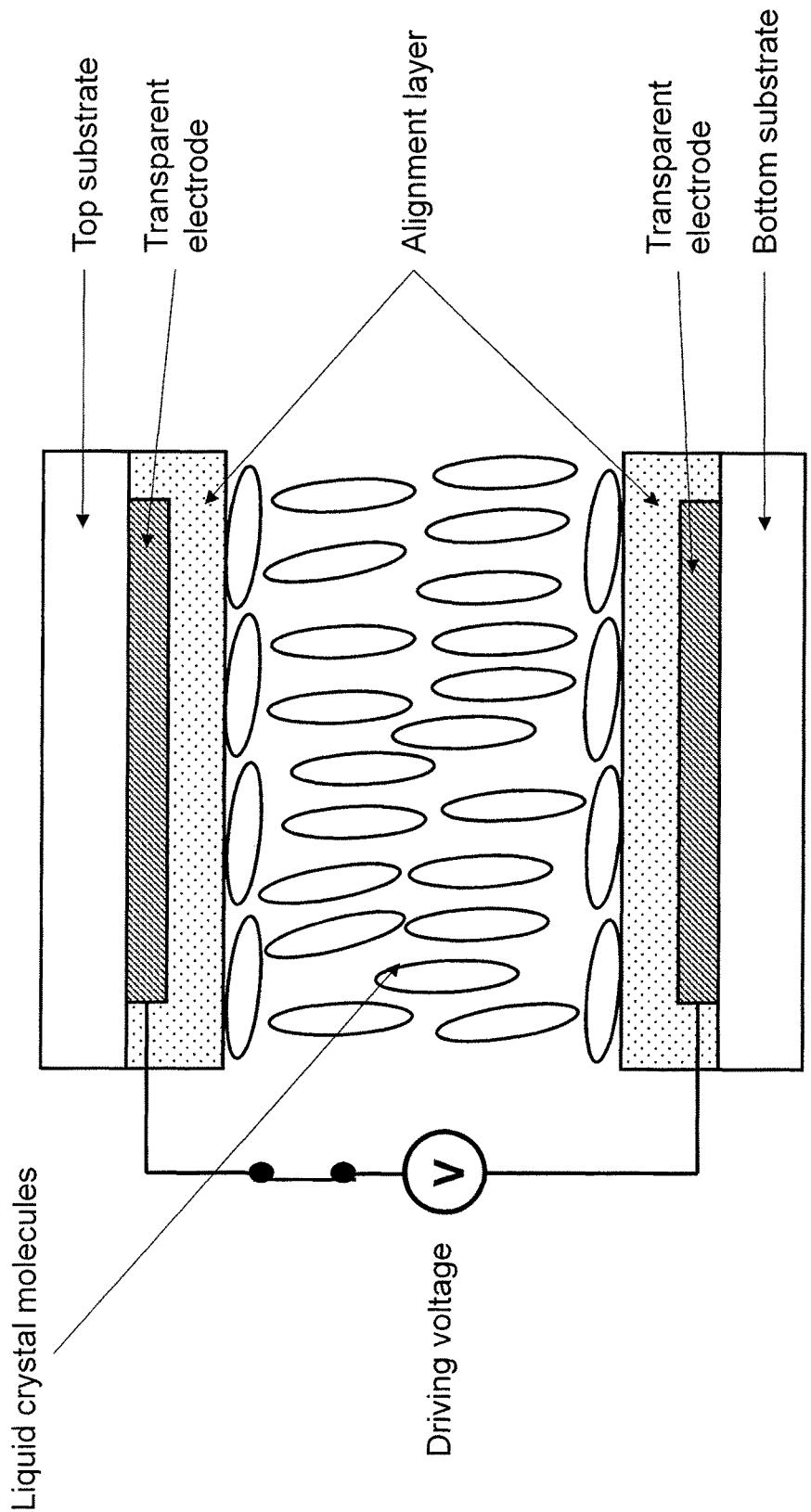
Figure 5:
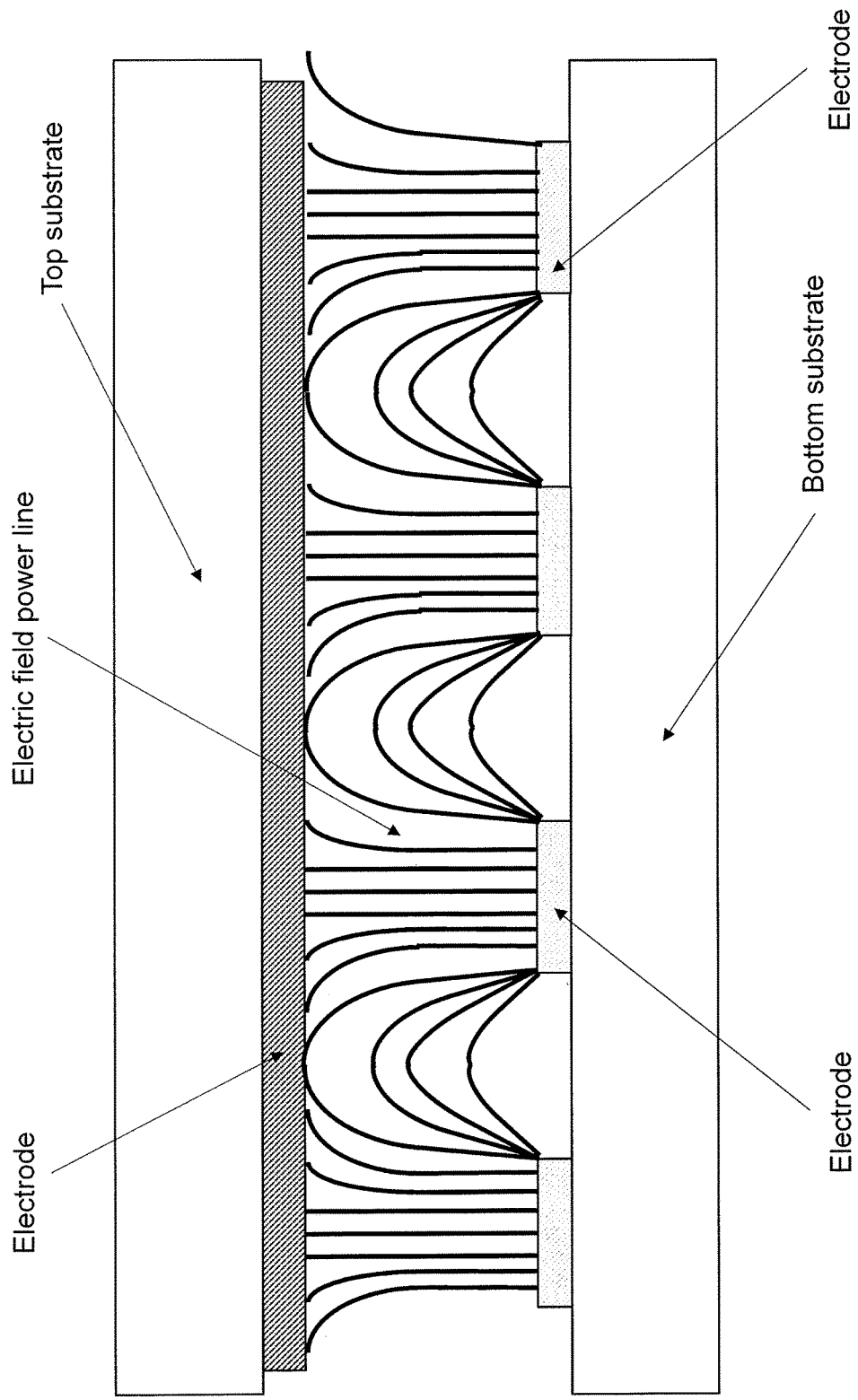
FIG. 5 illustrates the fringe field for a top and bottom electrode configuration with a fine pixel pitch pattern.
Figure 6:
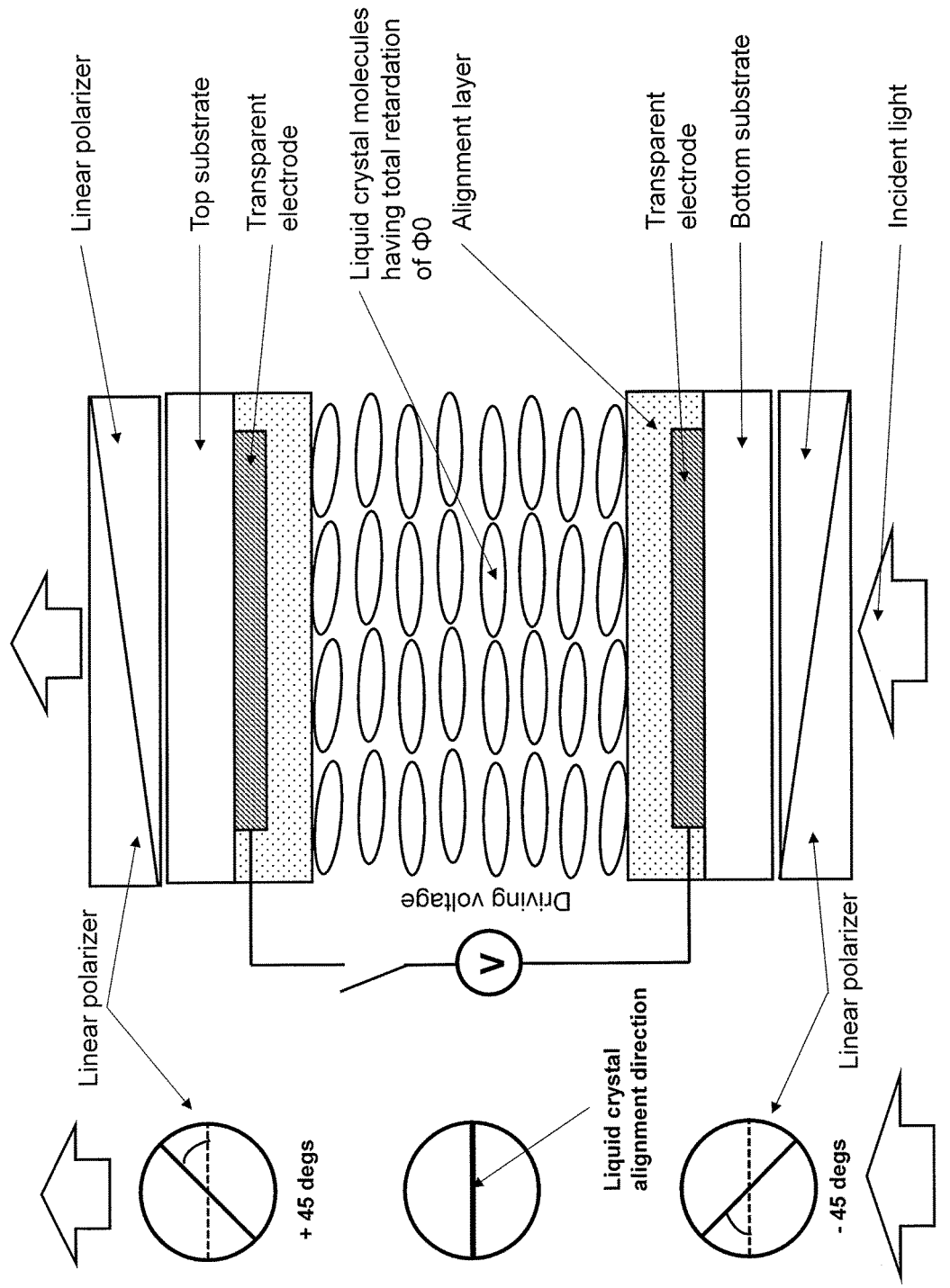
FIG. 6(a) illustrates the initial liquid crystal molecular alignment status of a planar aligned ECB panel.
FIG. 6(b) illustrates the switched liquid crystal molecular alignment status of a planar aligned ECB panel.
Figure 6:
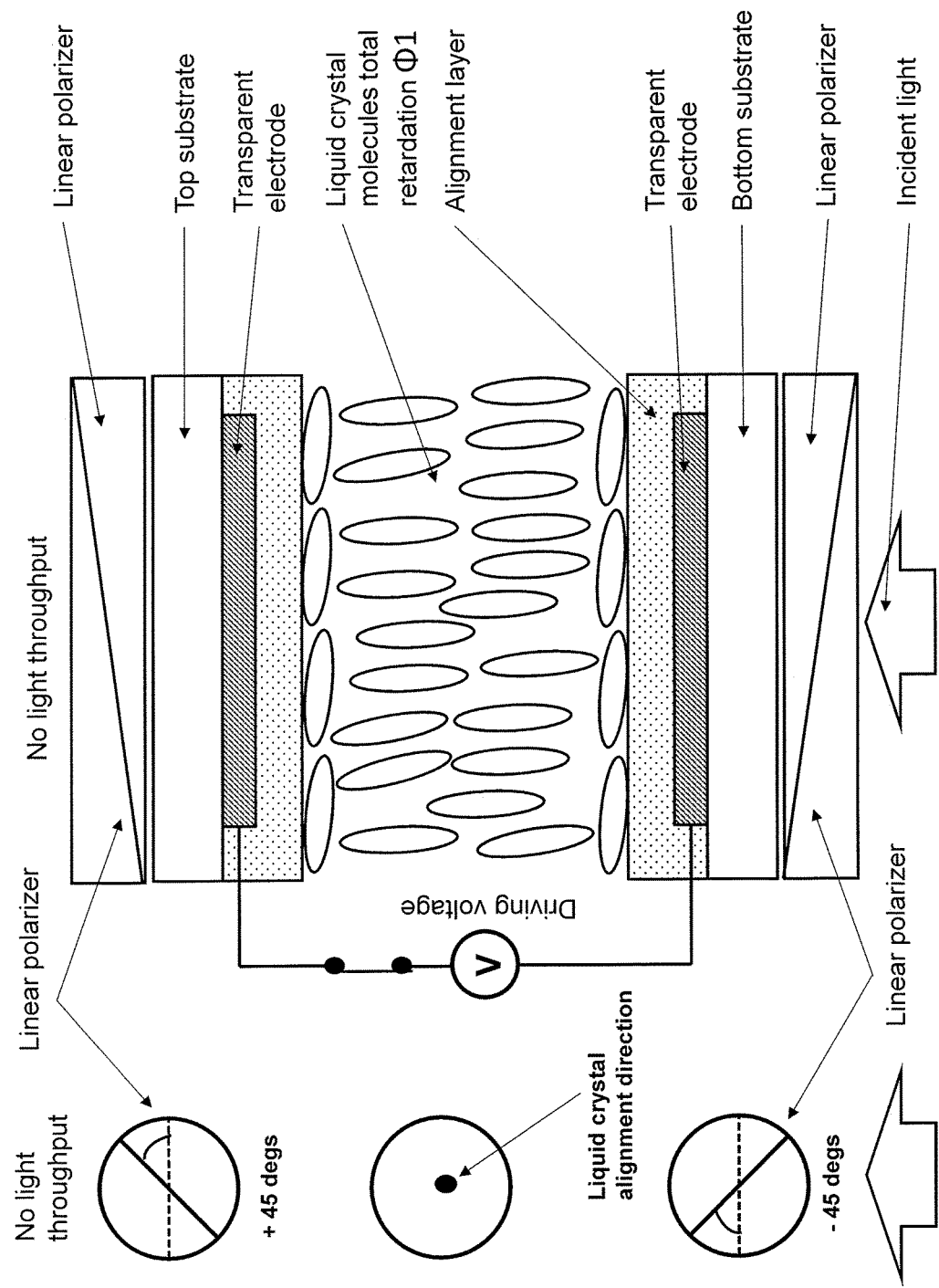

FIGS. 6(a) and 6(b) illustrate typical liquid crystal driving torque and its optical response to an externally applied voltage with planar aligned liquid crystal molecules having positive dielectric anisotropy. This configuration is widely known as electrically controlled birefringence (ECB). Such an ECB panel produces retardation switching by changing the original horizontal aligned state to a vertically aligned switched state to both the top and bottom substrates. In the original state shown in FIG. 6(a), the liquid crystal layer gives a retardation, $\chi 0$, to incident linearly polarized light. The liquid crystal layer passes the maximum light when the initial liquid crystal molecular alignment direction has 45 degrees tilted from the incident linear polarizer's absorption angle shown in FIG. 6(a). When sufficient voltage is applied to the liquid crystal layer, total retardation of the liquid crystal layer changes to $\Phi 1$, as shown in FIG. 6(b). Depending on total retardation amount, absorption angel is decided. In typical use of ECB, with electric field application, planar aligned (horizontally aligned) liquid crystal molecules start standing up, and depending on liquid crystal layer thickness and liquid crystal molecules birefringence, transparent, light absorption have multiple changes, if total retardation amount is over lambda of incident light wavelength. When voltage is applied, most liquid crystal molecules align with the externally applied electric field and −45 degree linearly polarized light passes through the liquid crystal layer, resulting in no light at the external side of the +45 degree linearly polarized polarizer, as shown in FIG. 6(b). When the difference in these two retardation values, $\Delta\Phi$, satisfies $\Delta\Phi=\Phi 1-\Phi 0=\pi/2$, the ECB panel works as a dark and bright light amplitude switching device, like a typical display device. As shown in FIGS. 6(a) and 6(b), a planar aligned ECB liquid crystal panel gives only out-of-plane retardation switching.

Figure 7:
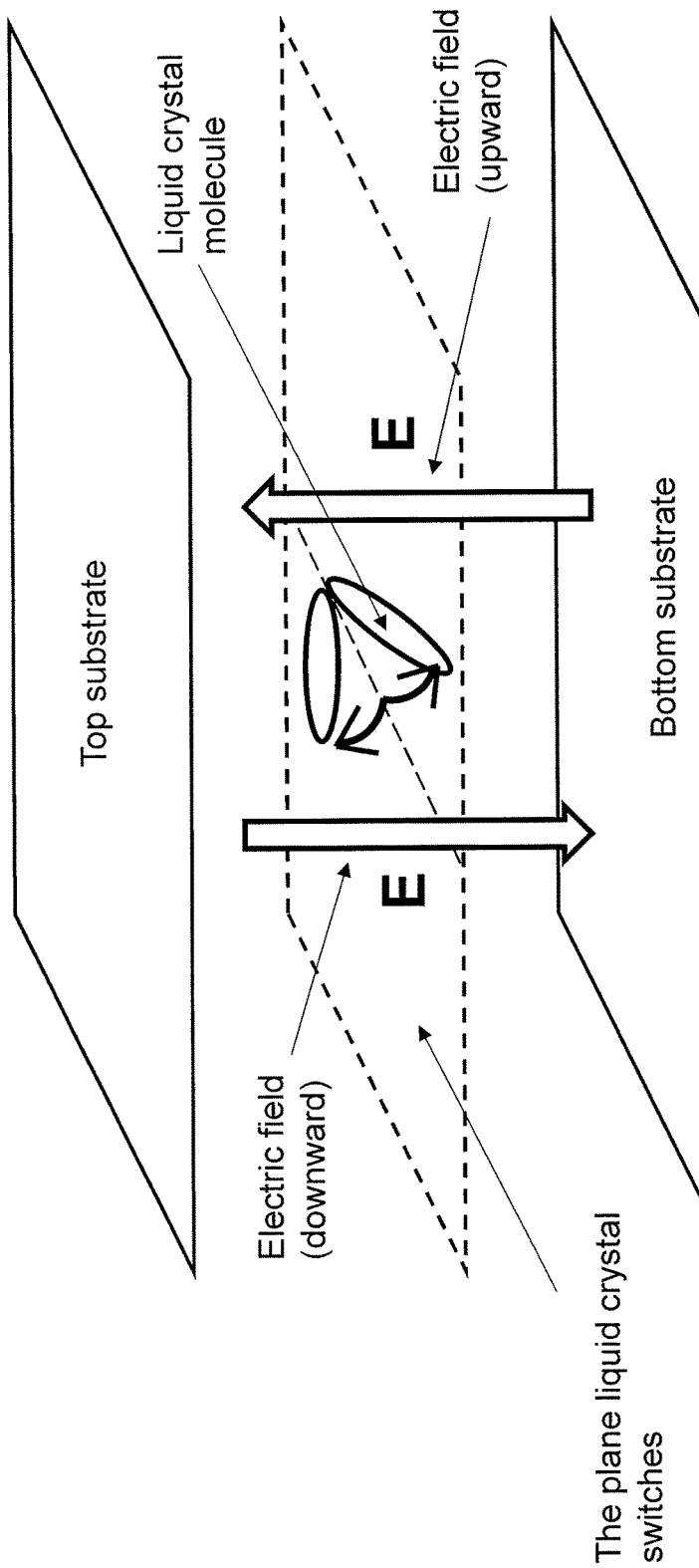
FIG. 7 illustrates in-plane liquid crystal molecular switching with a vertically applied electric field.

To have only in-plane retardation switching with top and bottom electrodes and without using inter digit electrode structures, which cause significant fringe field effects, the liquid crystal layer should have the capacity to respond to the vertically applied electric field with the liquid crystal optical axis switching only in-plane, or horizontally to both the top and bottom electrodes, as illustrated in FIG. 7. The relevant concept is in-plane only liquid crystal molecular switching with a vertically applied electric field, as illustrated in FIG. 7. With only in-plane switching with a vertically applied electric field, the liquid crystal drive mode may eliminate the use of inter digit electrodes which cause significant fringe field effect.

Figure 8:
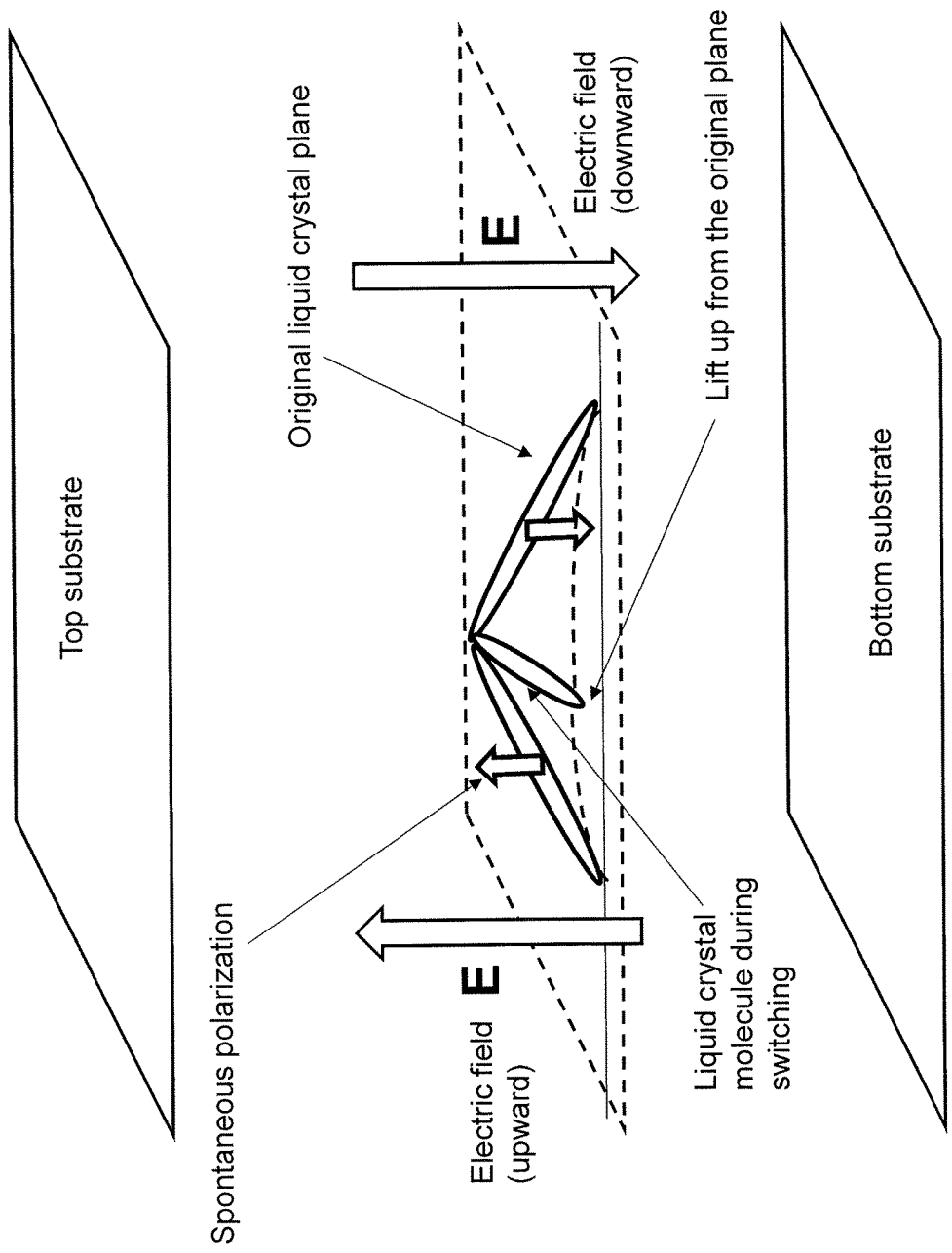
FIG. 8 illustrates PSS LCD molecular switching behavior. During switching residual spontaneous polarization lift up the liquid crystal molecule from its original plane.

Several liquid crystal drive modes have been reported that enable in-plane liquid crystal molecular switching with vertically applied electric fields. US patent application: No. 20040196428 discloses a switching device with substantially parallel liquid crystal molecules using a vertically applied electric field. This technology uses chiral smectic liquid crystal material have spontaneous polarization as a bulk liquid crystal material. Using such chiral smectic liquid crystal materials with specific initial molecular alignment, substantially parallel liquid crystal molecular switching to both the top and bottom substrates is realized. This technology with substantially parallel switching, however, still shows some lift-up of liquid crystal molecules during switching. A liquid crystal panel using chiral smectic C phase liquid crystal molecules has spontaneous polarization as a liquid crystal panel, such spontaneous polarization couples with externally applied voltage as shown in FIG. 8. With the coupling driving torque between the externally applied electric field and the spontaneous polarization of the liquid crystal molecules, the spontaneous polarization switches 180 degrees as illustrated in FIGS. 7 and 8. As shown in FIG. 8, when an externally applied electric field is upward, the spontaneous polarization of liquid crystal molecules takes its direction along the applied electric field in the upward direction. When an externally applied electric field changes to the downward direction, the spontaneous polarization of liquid crystal molecules is in the downward direction, as shown in FIG. 7. During the switching process from upward to downward of the spontaneous polarization, the liquid crystal molecules are lifted up, as shown in FIG. 7. An externally applied electric field couples with spontaneous polarization of the liquid crystal molecules. The driving torque coupled with externally applied electric field drives liquid crystal molecular axis from the initial position to the final position where both the driving torque and liquid crystal materials' elastic properties are balanced. At this movement, the spontaneous polarization needs to rotate 180 degrees from the upward to downward direction due to the switching of the applied electric field from the upward to downward direction. Although liquid crystal molecules spontaneous polarization turns 180 degrees as shown in FIG. 8, hindered rotation nature of each liquid crystal molecule does not allow each liquid crystal molecule simply rotate without changing the molecular axis position. Once, spontaneous polarization based on hindered rotation of each liquid crystal molecule and externally applied electric field couple, the liquid crystal molecular axis movement is governed by the switching direction of electric field. An externally applied electric field simply switches its direction from upward to downward as shown in FIG. 8. Spontaneous polarization follows its direction from upward to downward as shown in FIG. 8. On the other hand, liquid crystal molecular axis is not allowed to rotate 180 degrees due to hindered rotation. Therefore, only allowable liquid crystal molecular axis is lift-up during the spontaneous polarization switching from upward to downward.

Therefore, having spontaneous polarization and having some lift-up molecular movement with an applied voltage are equivalent when chiral smectic C phase type liquid crystal molecules, or tilted layered smectic phase liquid crystal molecules more specifically, are used. As shown in FIG. 8, spontaneous polarization switching lifts up the liquid crystal molecule from the original liquid crystal aligned plane. Liquid crystal molecules, typically having a rod-like shape, have rotation along their long axis with microwave frequency. According to the consensus interpretation among liquid crystal scientists, if the microwave frequency rotation along the long molecular axis is hindered or not permitted to rotate freely, such liquid crystal molecules show spontaneous polarization because of their chirality as spatial and time domain average. This is widely believed to be the cause of spontaneous polarization in chiral smectic C phase liquid crystal materials. Therefore, according to the consensus understanding of spontaneous polarization, the existence of spontaneous polarization itself provides evidence of molecular lift up during switching. Such liquid crystal molecular lift up produces an out-of-plane retardation change, even if the lift up angle is small, on the order of several degrees. If out-of-plane retardation switching occurs, mixing of both in-plane and out-of-plane retardation switching is inevitable even if the fringe field influence is negligible with the top and both electrode structures. Therefore, the technology of US patent application: No. 20040196428 does not satisfy the purpose of this concept of in-plane only retardation switching with top and bottom electrode structures, including during switching.

Figure 9:
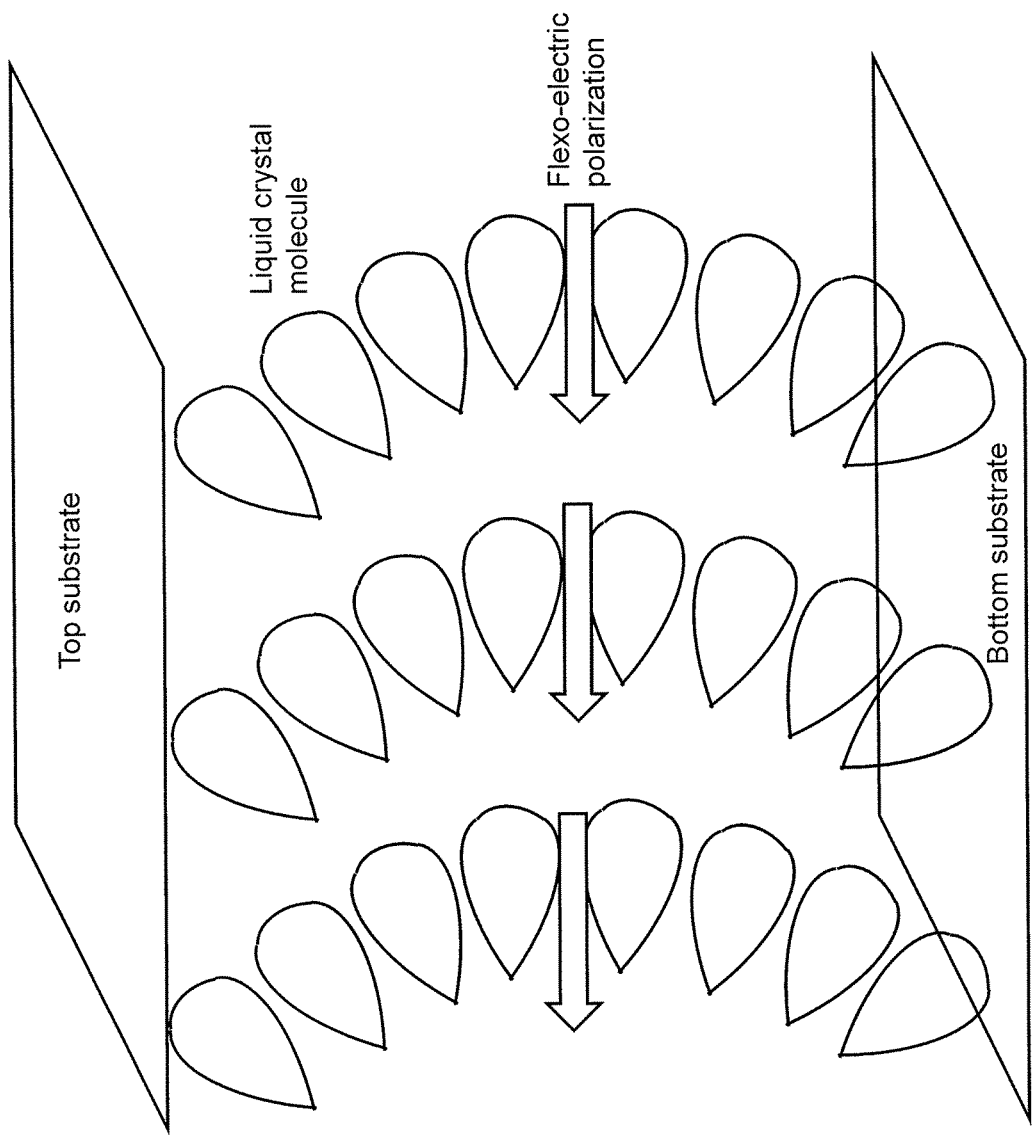
FIG. 9(a) illustrates the stacking of pear-shaped liquid crystal molecules.
FIG. 9(b) illustrates the stacking of bend-core-shaped liquid crystal molecules.
Figure 9:
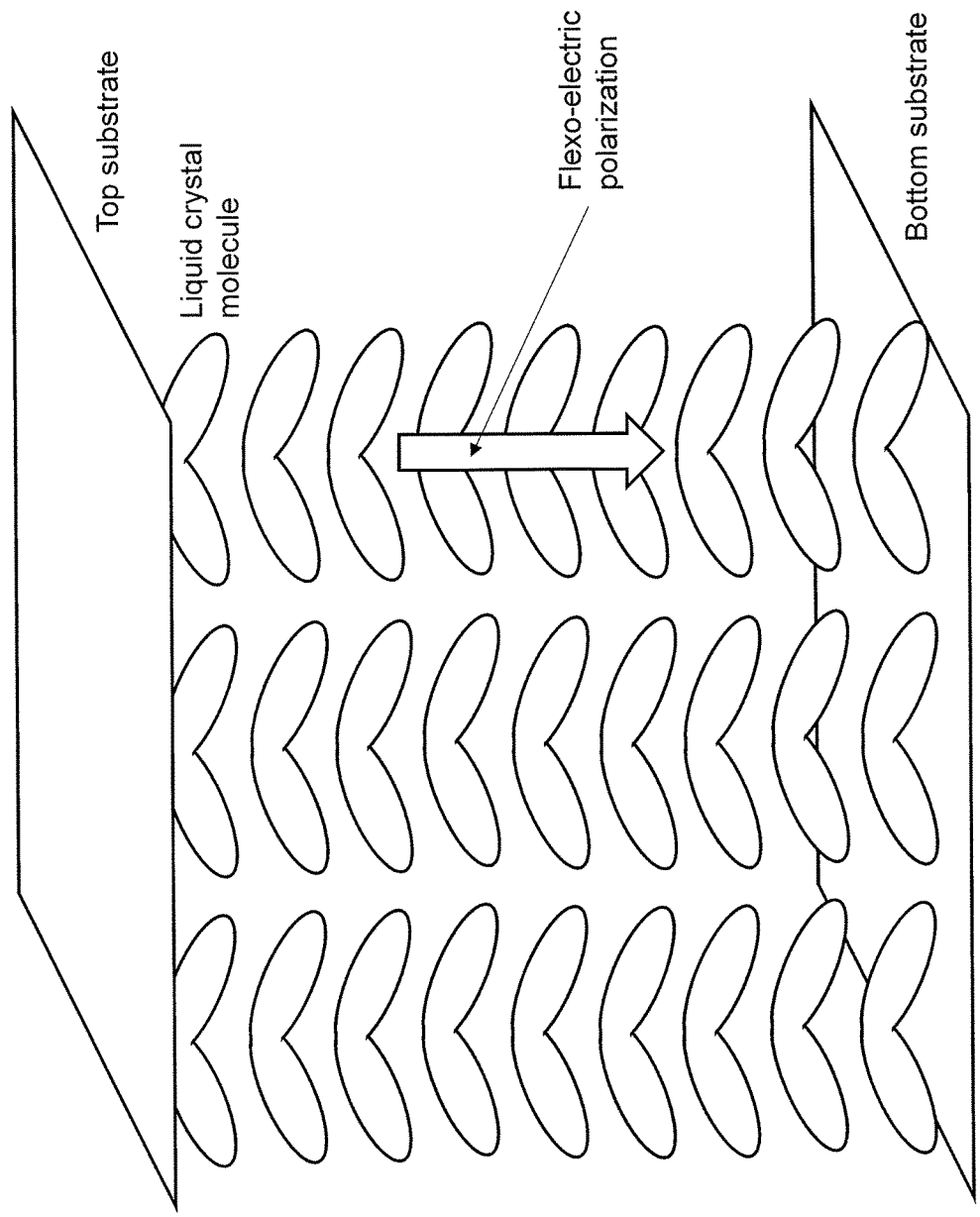

Another technology is known as flexo-electric response. Flexo-electric liquid crystal response was introduced by R. B. Meyer as "Piezoelectric effect in liquid crystals", in Physical Review Letter Vol. 22 (18), page 918-921 (1969). As shown Bob Meyer's first paper title, the technology was initially introduced as the piezo-electric effect. Since its introduction, the phenomenon has become recognized as the flexo-electric response. Additional investigation, specifically for display device applications, was published by Henry Coles, et. al. as "Ultrafast High Optical Contrast Flexoelectric Displays for Video Frame Rates", in SID (Society for Information Display) Technical Digest Paper No. 40.1, page 544 to 547 (2012). In principle, flexo-ecelctricity is generated by the distorted shape and/or spray stacking structure of liquid crystal molecules, as illustrated in FIGS. 9(a) and 9(b). FIG. 9(a) illustrates pear-shaped liquid crystal molecules. Because of the specific stacking of liquid crystal molecules due to their shape, the spray stacking structure of liquid crystal molecules creates a substantially vertical direction of polarization. This polarization may couple with externally applied electric fields, resulting in a similar effect to in-plane liquid crystal molecular switching. FIG. 9(b) illustrates a bend-core shape of liquid crystal molecules. The type of liquid crystal molecular stacking shown in FIG. 9(b) is realized with the bend-core structure of each liquid crystal molecule, resulting in polarization substantially parallel to the top and bottom substrates. The case of pear-shaped liquid crystal molecules of FIG. 9(a) has flexo-electric polarization parallel to the substrates. In this case, the applied electric field direction should be parallel to the substrates to drive the liquid crystal layer, so the top and bottom electrode providing a vertical electric field is not applicable. Conversely, the bend-core shaped liquid crystal molecules shown in FIG. 9(b) have flexo-electric polarization perpendicular to the substrates. In this case, top and bottom electrodes are applicable. However, such bend-core type of nematic liquid crystal materials are still in the research stage and a commercial level of material development may take some time. Moreover, the alignment quality of such material requires significant improvement for actual application. In addition to material selection and improvement of alignment quality, it is difficult to increase flexo-electric polarization to match current commercially available LCD driver chips. Due to these practical issues, flexo-electric response is substantially unavailable.

Figure 10:
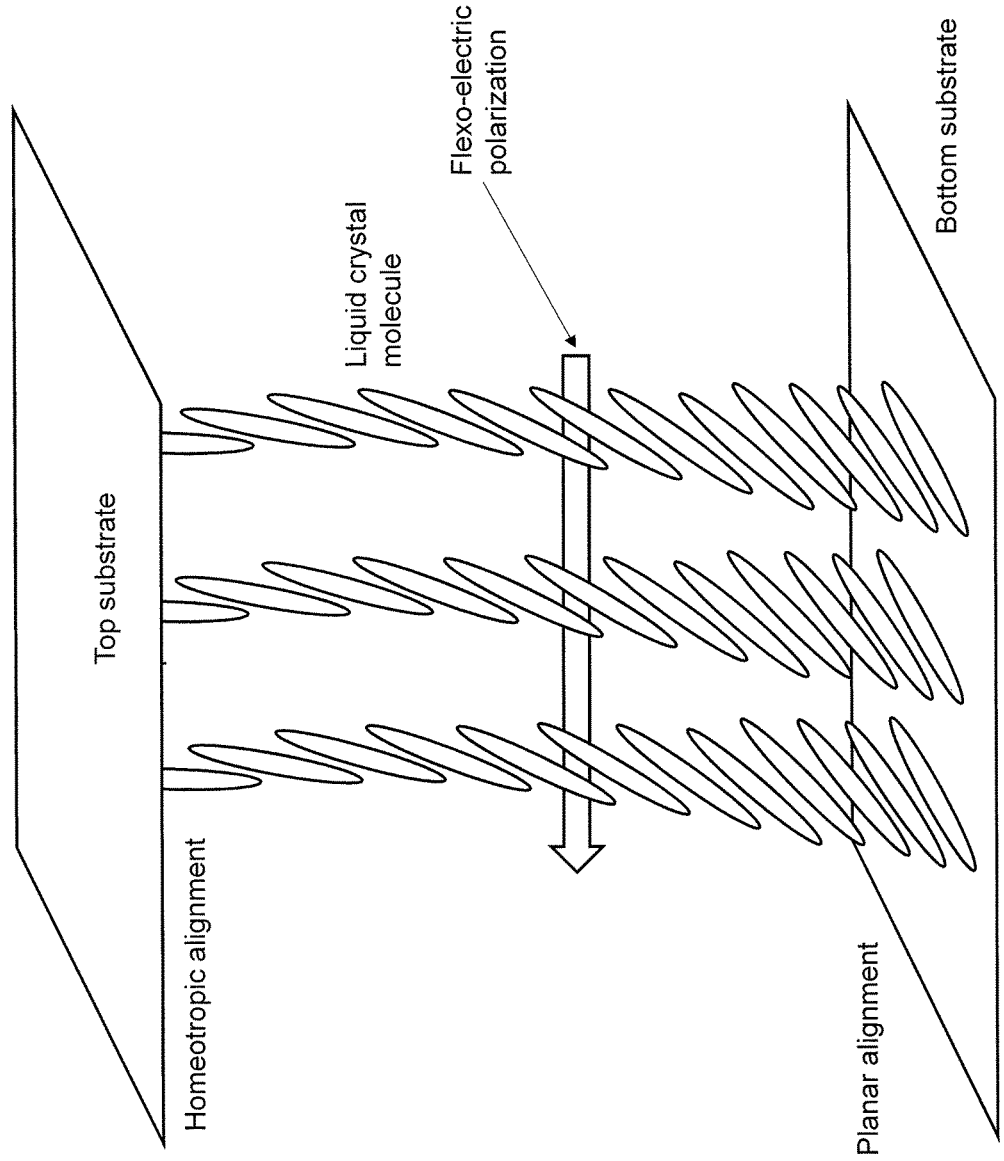
FIG. 10 illustrates a hybrid flexo-electric response liquid crystal device structure.

A so-called hybrid type of flexo-electric response device was reported by XING Hong-Yu, et. al., as "Flcxoelectric-Induced Voltage Shift in Hybrid Aligned Nematic Liquid Crystal Cell", in Journal of Communication for Theoretical Physics, Volume 56, No. 5, page 939 to 942, (2011). Unlike the two types of flexo-electric response liquid crystal materials discussed above, the hybrid type of flexo-electric crystal response uses liquid crystal structural properties. Unlike the intrinsic flexo-electric properties of the liquid crystal material such as pear- or bend-core shape, the structurally based case provides a more practical solution in terms of using flexo-electric response, as shown in FIG. 10. However, the type of flexo-electric device shown in FIG. 10 has a flexo-electric polarization substantially parallel to the substrates, requiring inter digit electrode structures. Moreover, its retardation switching includes both in-plane and out-of-plane switching clue to the hybrid alignment structure having both planar and homeotropic alignments.

Presently, no liquid crystal technologies enable only in-plane retardation switching, as described in the above analysis of currently available technologies. Therefore, a practical electrode structure free of fringe field influence and pure in-plane and/or pure out-of-plane switching device is expected to provide significant improvement of image quality in display devices and high performance in phase modulation devices.

There are two main technical challenges to solve the issues described above. The first is a new liquid crystal drive mode having driving torque to a vertically applied electric field. The second is pure in-plane or pure out-of-plane retardation switching capability. Solutions to these two technical challenges should also have fast and stable switching as well as a wide operational temperature range.

Figure 11:
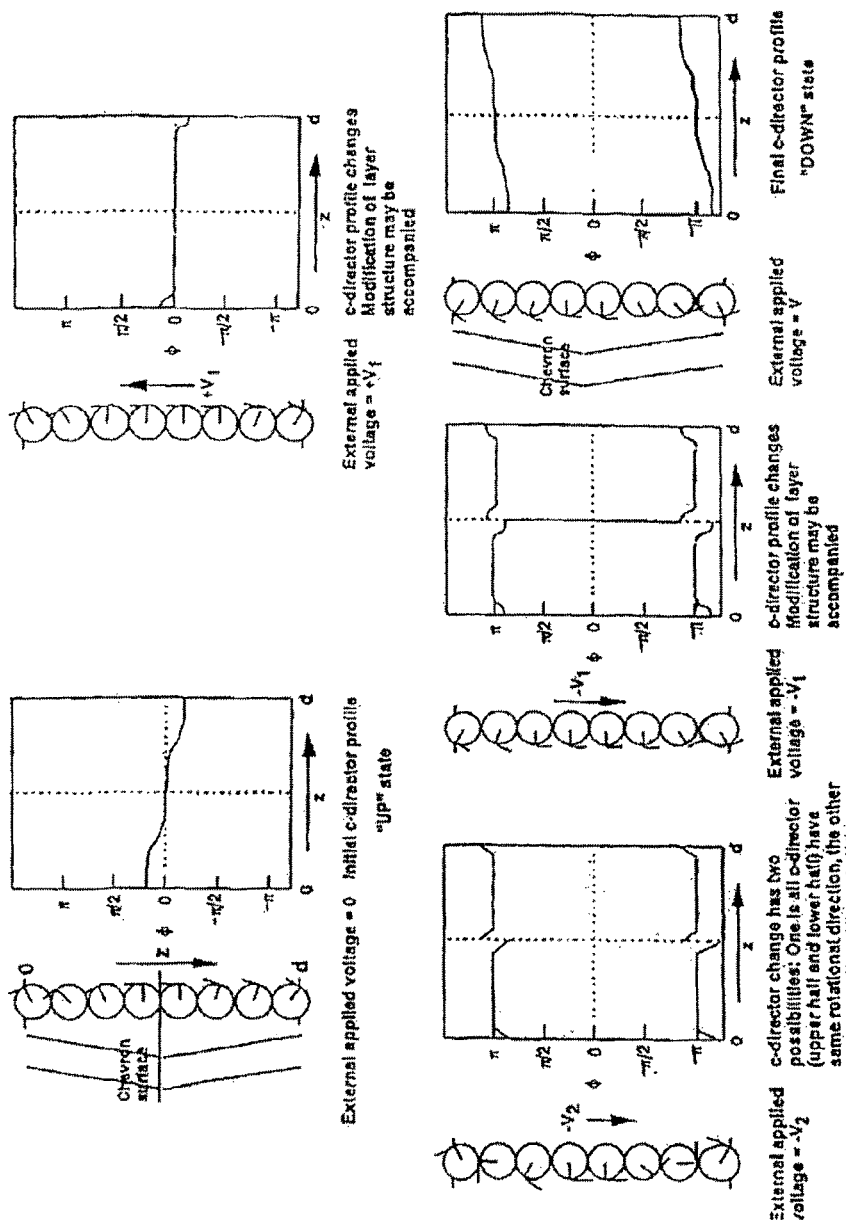
FIG. 11 illustrates the liquid crystal molecular switching behavior during optical switching of a polarization shielding chiral smectic C phase liquid crystal display.
Figure 12:
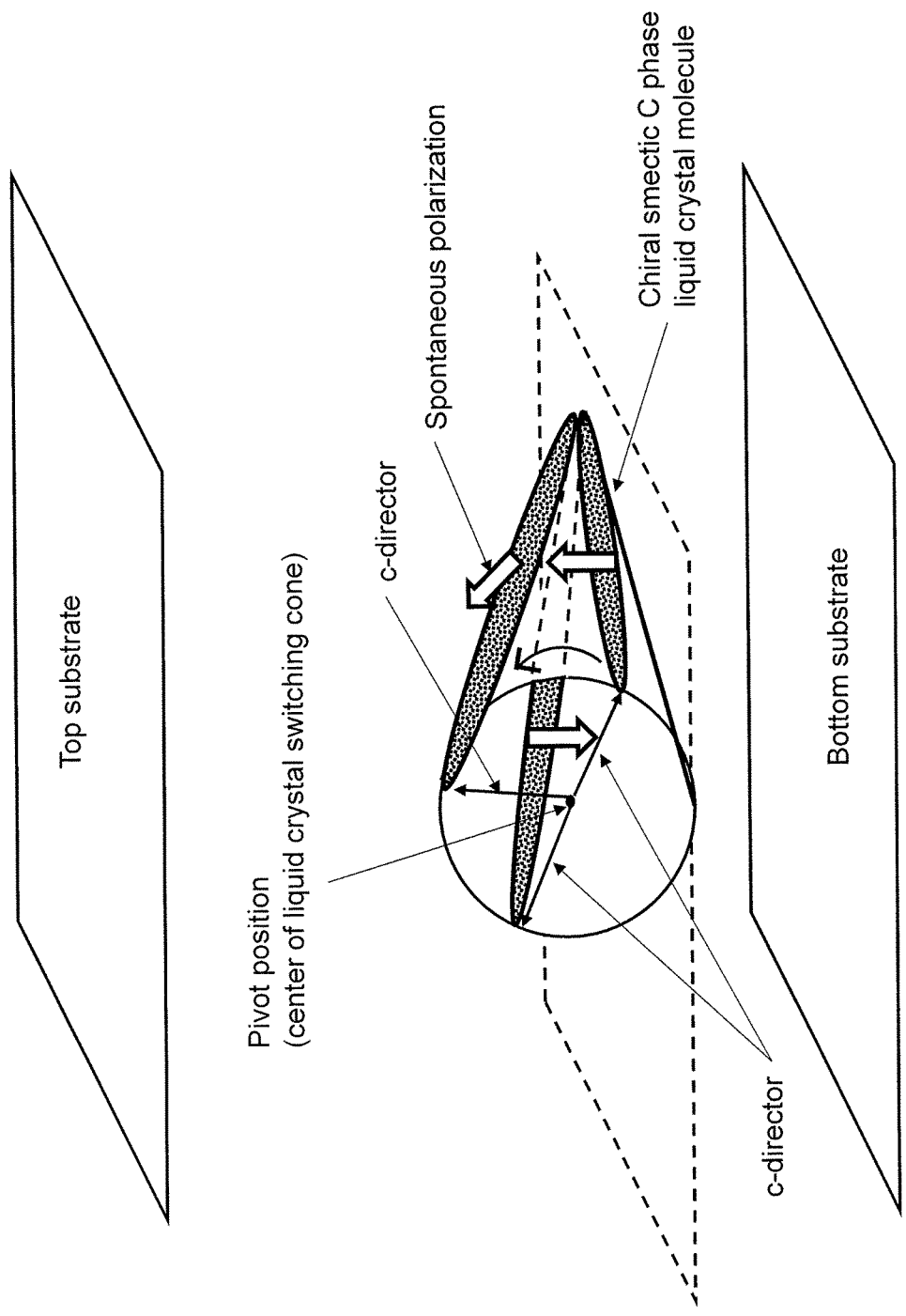
FIG. 12 illustrates the movement of a c-director liquid crystal molecule from the pivot position.

To solve the above technical challenges, the focus was on developing complete in-plane liquid crystal molecular movement during optical switching. As discussed above, the technology disclosed in US patent application: No. 20040196428 shows small lift-up of liquid crystal molecules during optical switching. Efforts were taken to analyze why the technology showed lift-up in liquid crystal molecular switching. US patent application: No. 20040196428 disclosed its liquid crystal molecular switching behavior in FIG. 14(b), shown here in FIG. 11. The figure interpreted that liquid crystal c-director as shown in the circles in FIG. 11 has continuous rotation, such as from the 2 PM direction to the 4 PM direction, of from the 10 AM direction to the 8 AM direction. The c-director is represented as the vector from the center position of a circle, shown in FIG. 11, to the edge direction of a rod-shaped liquid crystal molecule, as illustrated in FIG. 12. As shown in FIG. 11, the c-director of each liquid crystal molecule rotates along with the circle shown in FIG. 11. As shown in FIG. 12, when a rod-shaped liquid molecule moves from the original plane where the liquid crystal molecule originated to a lift-up position, the c-director moves from the right side to the top side in FIG. 12. As FIGS. 11 and 12 illustrate, lift-up from the original plane where the liquid crystal molecules originated is inevitable as long as spontaneous polarization involves liquid crystal driving torque, even if it is very small.

The consensus origin of spontaneous polarization in chiral smectic C phase liquid crystals is hindered rotation of the long axis of liquid crystal molecules as described above. It is reasonable that such liquid crystal molecules need to lift-up when spontaneous polarization rotates 180 degrees, as shown in FIG. 12. The technology of US patent application: No. 20040196428 enables small lift-up while liquid crystal molecules switch. For some display or amplitude modulation applications, the technology is valuable for its fast response and wide viewing angle. However, the fringe field influence degrades image or phase quality when this technology is applied to very fine pixel pitch devices using either amplitude or phase modulation due to the lift-up of liquid crystal molecules.

Figure 13:
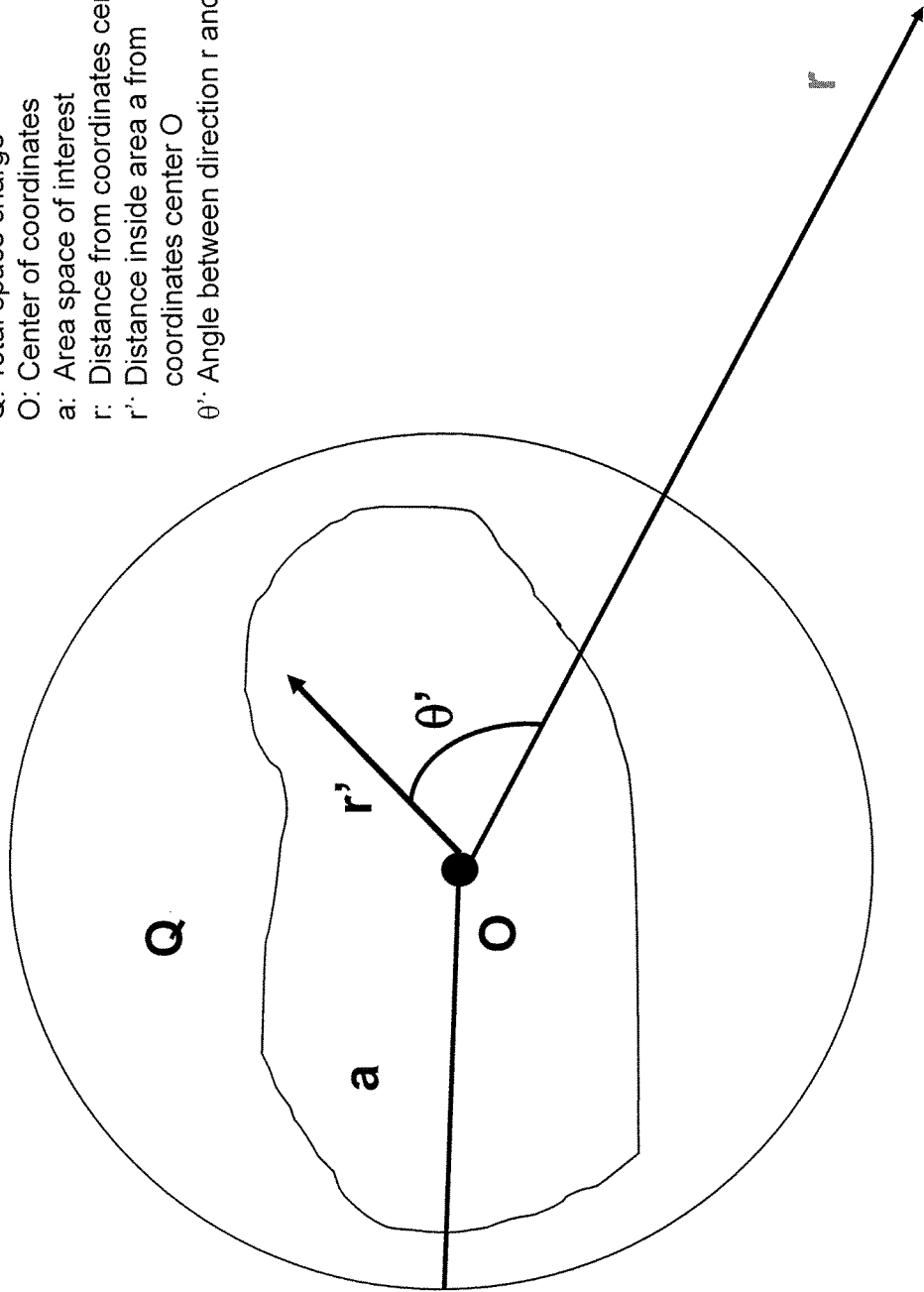
FIG. 13 illustrates the influence of space charge Q varying by distance and angle.

Based on the above analysis of US patent application: No. 20040196428, it was sought to eliminate residual spontaneous polarization from smectic C phase-based liquid crystal materials. Although the technology of US patent application: No. 20040196428 is unclear as to the origin of the driving torque to couple with the externally applied electric field, as described above, at least spontaneous polarization contributes to the driving torque. Therefore, it is assumed that eliminating spontaneous polarization would result in impractical liquid crystal switching. By analyzing the similarities and differences between the technology of US patent application: No. 20040196428 and the flexo-electric response technology described above, the influence of molecular shape on higher order permanent polarization of liquid crystal materials was considered. Practically, the most effective higher order permanent polarization in liquid crystal materials would be quadra-pole momentum. FIG. 13 illustrates the difference between dipole momentum and quadra-pole momentum. In FIG. 13, a is the area space of interest. In this embodiment, the area space of interest is some group of liquid crystal molecules. O is the coordinate center, and r and r' are mutual distances from the coordinate center with mutual angle θ'. Q is the total space charges of the system. Most nematic liquid crystal materials have dipole momentum as their primary permanent polarization. The dipole momentum can couple with externally applied electric fields, resulting in optical switching. According to FIG. 13, the electric potential at distance r from coordinate center O is shown in Equation 1.

$$\phi(r) = \frac{1}{4\pi\varepsilon_0} \int \frac{\rho(r')}{|r-r'|} dV' \quad \text{Equation 1}$$

$$\frac{1}{|r-r'|} = \frac{1}{\sqrt{r^2 + r'^2 - 2rr'\cos\theta'}} =$$

$$\frac{1}{r}\frac{1}{\sqrt{1-2\left(\frac{r'}{r}\right)\cos\theta' + (\bar{r})^2}} = \frac{1}{r}\sum_{l=0}^{\infty}\left(\frac{r'}{r}\right)^l P_l(\cos\theta')$$

$P_l(x)$: Legendre polynomial

Here, $\phi(r)$ is electric potential at distance r from the coordinate center O. $\rho$ is charge density.

When l=1, Equation 2 gives electric dipole momentum P.

$$l=1: \phi_1(r) = \frac{1}{4\pi\varepsilon_0 r^2}\int \rho(r')\cos\theta' r' dV' = \quad \text{Equation 2}$$

$$\frac{1}{4\pi\varepsilon_0 r^3} r \int r'\rho(r')dV' = \frac{1}{4\pi\varepsilon_0 r^2}\hat{r}P$$

$$P = \int r\rho(r)dV$$

When l=2, following Equation 3 gives electric quadrapole momentum.

$$l=2: \phi_2(r) = \frac{1}{4\pi\varepsilon_0}\frac{3}{2}\frac{1}{r^3}\sum_{i,j=1}^{3}Q_{ij}\hat{r}_i\hat{r}_j \quad \text{Equation 3}$$

The publication A. Mochizuki, "An Introduction to PSS-LCDs: A fast-optical-response smectic LCD", at SID (Society for Information Display), Journal of the SID Vol. 14/6, page 529 to 536 (2006) indicates contribution of quadra-pole momentum in achiral smectic liquid crystal materials. However, the publication indicates contribution of quadra-pole momentum with achiral smectic liquid crystal materials only for achiral smectic liquid crystal materials without evidence or phenomenological results. However, the article clearly indicates the possible contribution of quadra-pole momentum based driving torque in certain smectic liquid crystal material. Based on this information, efforts were made to investigate non-lift-up liquid crystal molecular switching, or pure in-plane and/or pure out-of-plane retardation switching, either for amplitude or phase modulation as a critical requirement for higher image and phase switching quality. With the above information and the information disclosed in Journal of the SID Vol. 14/6, page 529 to 536 (2006), efforts were made to investigate liquid crystal molecule shape, particularly relatively low aspect ratio smectic liquid crystal molecules, in order to enhance quadra-pole momentum as its primary driving torque. Equation 3 suggests that if the interaction between $r_i$ and $r_j$ is increased, the charge density of quadra-pole momentum charge density also increases. As shown in Equation 3 and FIG. 13, when θ' increases, quadra-pole momentum charge density also increases. This indicates that regardless of the use of chiral smectic liquid crystal materials, achiral smectic liquid crystal materials, or non-chiral smectic liquid crystal materials, such liquid crystal materials have the potential to be driven by quadra-pole momentum driving torque as long as the value of Equation 3 is sufficiently large and the value of Equation 2 is sufficiently small Since an important purpose of this invention is complete suppression of lift-up of liquid crystal molecules during switching in order to have pure in-plane or pure out-of-plane switching, the use of chiral smectic liquid crystal materials or achiral smectic liquid crystal materials was avoided. Because both chiral and achiral smectic liquid crystal materials potentially have spontaneous polarization, this invention sought to confirm non-chiral smectic liquid crystal materials. Since non-chiral smectic liquid crystal materials cannot have spontaneous polarization according to the consensus understanding of liquid crystal materials, the use of non-chiral smectic phase liquid crystal material means no spontaneous polarization involvement. As is widely known, chiral liquid crystal means having chirality in its molecule. Achiral liquid crystal means compensated chirality, such as mixture between left handed chiral material and right handed chirality material. Non-chiral is no involvement of any chiral material.

A non-chiral smectic C phase liquid crystal mixture was prepared using the mixture of liquid crystal components shown in Table 1.

TABLE 1

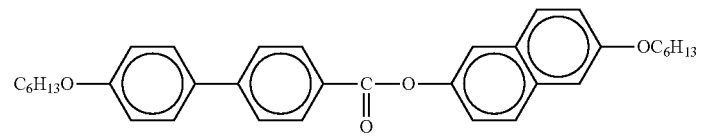

8 wt %

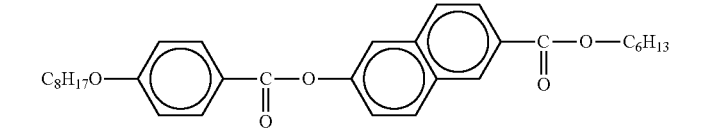

16 wt %

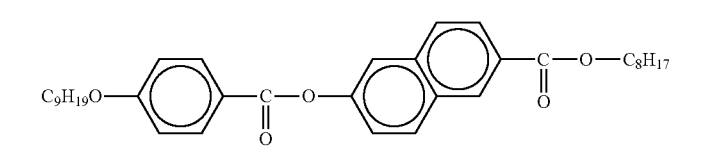

8 wt %

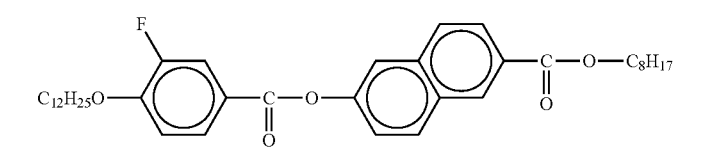

10 wt %

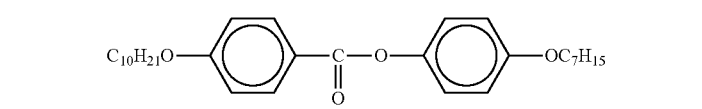

18 wt %

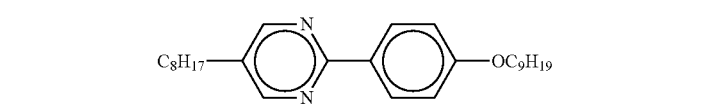

20 wt %

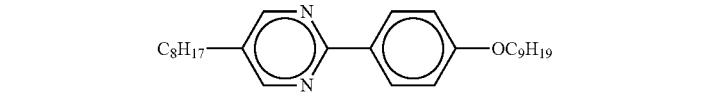

20 wt %

As shown in Table 1, all liquid crystal components were non-chiral liquid crystal materials. This mixture showed smectic C phase as a bulk state at room temperature from at least 18 degrees C. to 38 degrees C. Smectic C phases was confirmed by polarized microscope texture analysis. This mixture did not show any spontaneous polarization. A Sawer-Tower circuit with 2 micron thick planar aligned liquid crystal panel was used to measure spontaneous polarization. In-plane retardation change was empirically confirmed next as follows.

Another possible contribution of in-plane only retardation switching is liquid crystal materials' extremely large enthalpy change during phase transition between smectic A phase to smectic C phase as a bulk material. As an example, the liquid crystal mixture shown in Table 1 shows ΔH~5 J/g. This enthalpy change was measured using differential scanning calorimetry (DSC) (Mettler Toledo; Model DSC 822e) during the heat up process. Typically among smectic sub phases, transition from smectic A to smectic C is a second order phase transition. Second order phase transitions do not consume significant thermal energy, resulting in a small ΔH, less than approximately 0.1 J/g. All greater than 1 J/g is usually associated with a first order phase transition. Based on observation with a polarized microscope, the mixture of Table 1 does not show any drastic visual change in a scope. However, it consumes a large amount of thermal energy during phase transition from smectic A to smectic C. This indicates that the phase transition is more than just a phase transition between smectic sub phases, but accompanies a drastic structural change. It is assumed that if the phase transition from bulk smectic A phase to bulk smectic C phase of a mixture like that of Table 1 has a large structural, yet invisible, change, it would be a good reason of quadra-pole momentum enhancing structure. This assumption is supported by another liquid crystal mixture in which most of the components were formulated with bulky or low aspect ratio (ratio of molecular length between long and short axis length) liquid crystal molecules, as shown in Table 2

TABLE 2

| Structure | wt % |
|---|---|
| $C_{10}H_{21}O$—⬡—C≡C—⬡(F)—$OC_6H_{13}$ | 20 wt % |
| $C_8H_{17}$—⬡(N)—C≡C—⬡(F)—$OC_{10}H_{21}$ | 20 wt % |
| $C_{12}H_{25}O$—⬡(F)—C(=O)—O—⬡⬡—C(=O)—O—$C_8H_{17}$ | 4 wt % |
| $C_{10}H_{21}O$—⬡—C(=O)—C—⬡—$OC_7H_{15}$ | 6 wt % |
| $C_8H_{17}$—⬡(N,N)—⬡—$OC_{12}H_{25}$ | 10 wt % |
| $C_8H_{17}$—⬡(N,N)—⬡—$OC_9H_{19}$ | 20 wt % |
| $C_8H_{17}$—⬡(N,N)—⬡—$OC_9H_{19}$ | 20 wt % |

The liquid crystal mixture of Table 2 was used with the same liquid crystal panel preparation described above, and its retardation switching was measured as described above. This liquid crystal panel showed only in-plane retardation switching. Therefore, it is reasonably assumed that large enthalpy change between smectic A to smectic C phase transition is a required condition to have only in-plane retardation switching, and it is assumed to be due to enhancement of quadra-pole momentum in a specific panel configuration.

Figure 14:
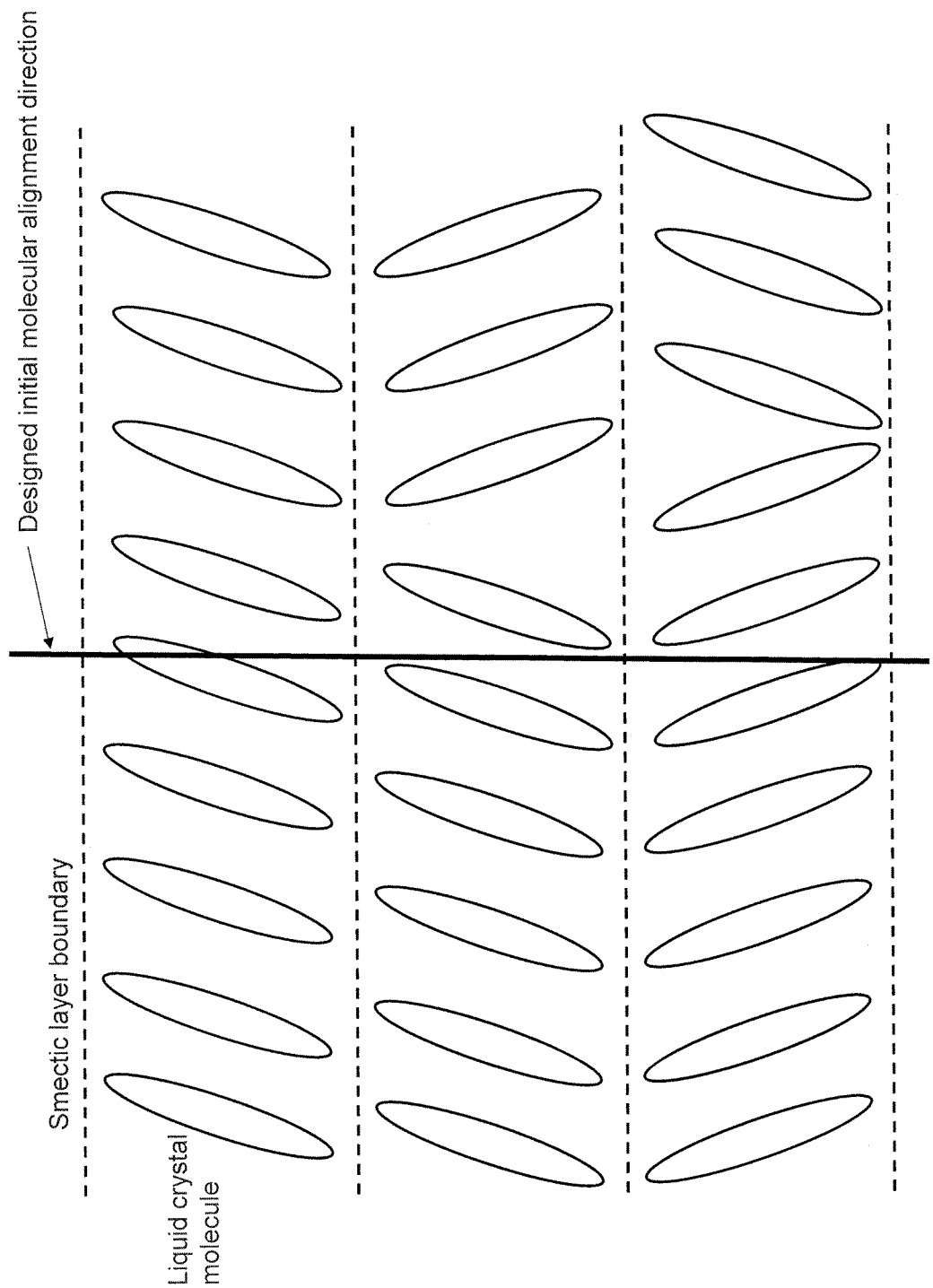
FIG. 14 illustrates a top view of a typical smectic C phase liquid crystal molecular initial alignment direction.

In-plane only retardation switching is not provided by only unique liquid crystal materials, but by total plane structure. If the initial liquid crystal molecular alignment is improper, the same liquid crystal mixture which shows only in-plane retardation switching may not show in-plane only retardation switching. Therefore, use of a specific liquid crystal material, specifically one showing a large enthalpy change between smectic A to smectic C phase transition is a necessary, but not sufficient, condition to provide in-plane only retardation switching. A typical liquid crystal molecular initial alignment (immediately after liquid crystal materials are filled in a panel and aligned in a liquid crystal panel) of bulk smectic C phase shows ~20 tilt from an artificially prepared initial liquid crystal alignment direction. This is due to the long molecular axis of the liquid crystal having some tilt angle relative to the smectic layer normal, as shown in FIG. 14. Due to rotation of the liquid crystal molecular long axis, smectic C phase liquid crystal molecules show some tilt to the smectic layer normal, as shown in FIG. 14. This natural tilt identifies smectic C phase, and a typical smectic C phase liquid crystal panel shows its extinction angle along this tilted direction due to this tilt angle. Therefore, a traditional smectic C phase liquid crystal panel does not show its extinction angle as the designed liquid crystal initial alignment direction such as the mechanical buffing angle.

Figure 15:
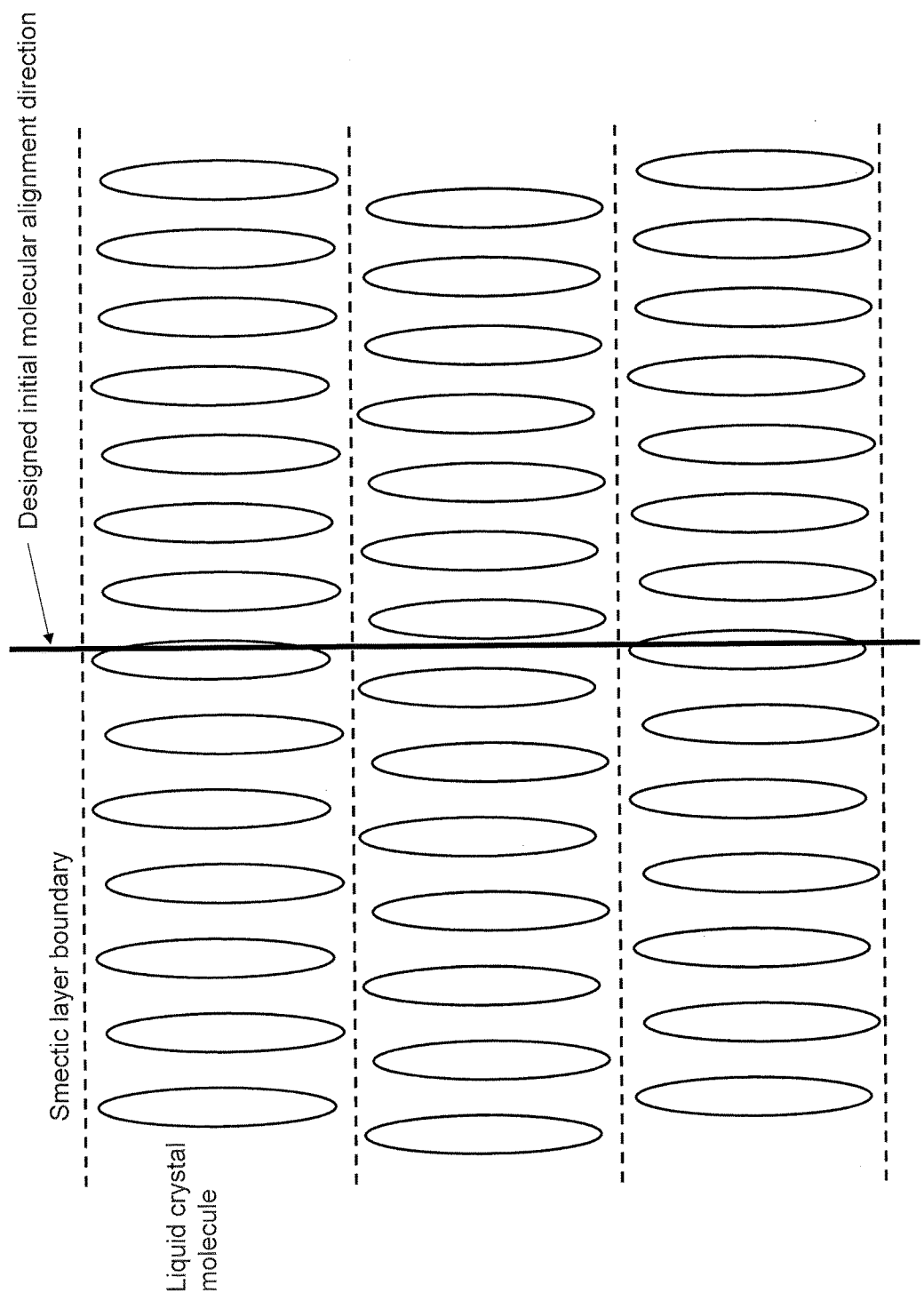
FIG. 15 illustrates the top view of the specific liquid crystal molecular initial alignment direction.

FIG. 15 illustrates an initial molecular alignment direction of an embodiment of this invention. Unlike conventional smectic C phase liquid crystal panels, this embodiment's bulk smectic C phase liquid crystal panels do not show tilt angle to the smectic later normal. This results in an extinction angle along with the designed alignment angle, or along with the mechanical buffing angle. In some cases, specifically the quadra-pole momentum enhanced liquid crystal molecular case having low aspect ratio molecules, the actual extinction angle shows some shift from the designed liquid crystal molecular alignment direction due to the biaxial nature of bulky liquid crystal. However, this is due to the difference between the liquid crystal long molecular axis and optical axis to the biaxiality of liquid crystal materials, and such a liquid crystal panel still does not show any liquid crystal long molecular axis tilt from the smectic layer normal. The initial liquid crystal molecular alignment may be considered an "artificial smectic A phase" using bulk smectic C phase liquid crystal materials. Therefore, having an "artificial smectic A phase" using bulk smectic C phase liquid crystal materials is an important requirement to have in-plane only retardation switching. Here, a "bulk" state means no boundary condition state or natural state. In other words, a bulk liquid crystal means a liquid crystal material without any wall effect. Large enthalpy change of liquid crystal materials may be important to have an "artificial smectic A phase."

In order to have the necessary and adequate conditions to provide in-plane only retardation switching, the following conditions were found to be required:
1) The phase sequence of the liquid crystal of the bulk liquid crystal material should be as follows:
    Smectic X phase—smectic C phase—smectic A phase—nematic phase—isotropic.
    Smectic X phase is optional, it may be most likely Smectic B phase, or a non-identified Smectic sub phase.
2) Liquid crystal material has large enthalpy change compared to ordinal Smectic sub phase transition. The enthalpy change expressed by ΔH between the Smectic A to Smectic C phase transition should have at least 3 J/g, preferably over 5 J/g. In terms of upper limit, it may not actually be of no influence on this specific requirement to have an artificial smectic A phase using bulk smectic C phase liquid crystal. However, from practical point of view, over 10 J/g would not be realistic even it is the first order phase transition as long as it is a phase transition in between smectic sub phases.
3) The extinction angle, which gives rise to the darkest state under cross Nicol polarizers condition, at the initial liquid crystal molecular alignment is along the initial liquid crystal long molecular axis using bulk smectic C phase liquid crystal materials.

Liquid Crystal Panel Fabrication 10 mm diameter, round-shaped transparent electrodes (with 60 nm thickness Indium Oxide layer) with patterned 25 mm×20 mm glass substrates were cleaned using high alkaline (ph 11) detergent. After being rinsed by DI water for over 15 minutes, the cleaned substrates were dried in a clean oven. Polyamide-imide solution (RN-1175: Nissan Chemical, Japan) was span coated on the cleaned substrate with a 2,500 rpm spin rate. After spin coating, the substrate was pre-cured on the hot plate at 80 C for 5 minutes, then final cured in the clean oven at 240 C for one hour. After being cured and cooled to room temperature, the coated polyamide-imide surface was buffed by a rubbing machine with 0.3 mm contact length with 2 passes. Rubbing direction of the pair substrates was in the so-called parallel direction. Silicon dioxide spherical shaped spacer balls having an average diameter of 3.5 microns were dispersed on the rubbed surface by spin coater with an iso propyl alcohol (IPA) dispersed solution. The spin coating rate was 1,200 rpm. After spin, the substrates were dried on the hot plate at 80 C for 5 minutes. Then the liquid crystal panels were laminated. The peripheral area was sealed using thermoset epoxy resin except for 3 mm single open area for liquid crystal filling. The perimeter area sealed laminate panel was put into a vacuum bag and then put in oven set at 60 C for 4 hours. After the seal cure was confirmed, the empty panel was set to vacuum liquid crystal filling system. The temperature of the mixed smectic liquid crystal material was elevated to 80 C and placed in the vacuum filing system. After the inner air was sacked off from the empty panel, the filling area was attached with the temperature elevated liquid crystal reservoir in the vacuum chamber. After it was confirmed that the open area of the peripheral glue seal was completely covered by liquid crystal material, dried nitrogen gas was inserted into the vacuum chamber. The inserted nitrogen gas pushed the liquid crystal material into the empty panel. After it was confirmed that all of the inner panel area was filled with liquid crystal material visually, the panel was picked up and the filling area was chipped off using a UV curable glue (Norland 65, USA) with spot UV exposure.

In-Plane Retardation Switching Measurement

Figure 16:
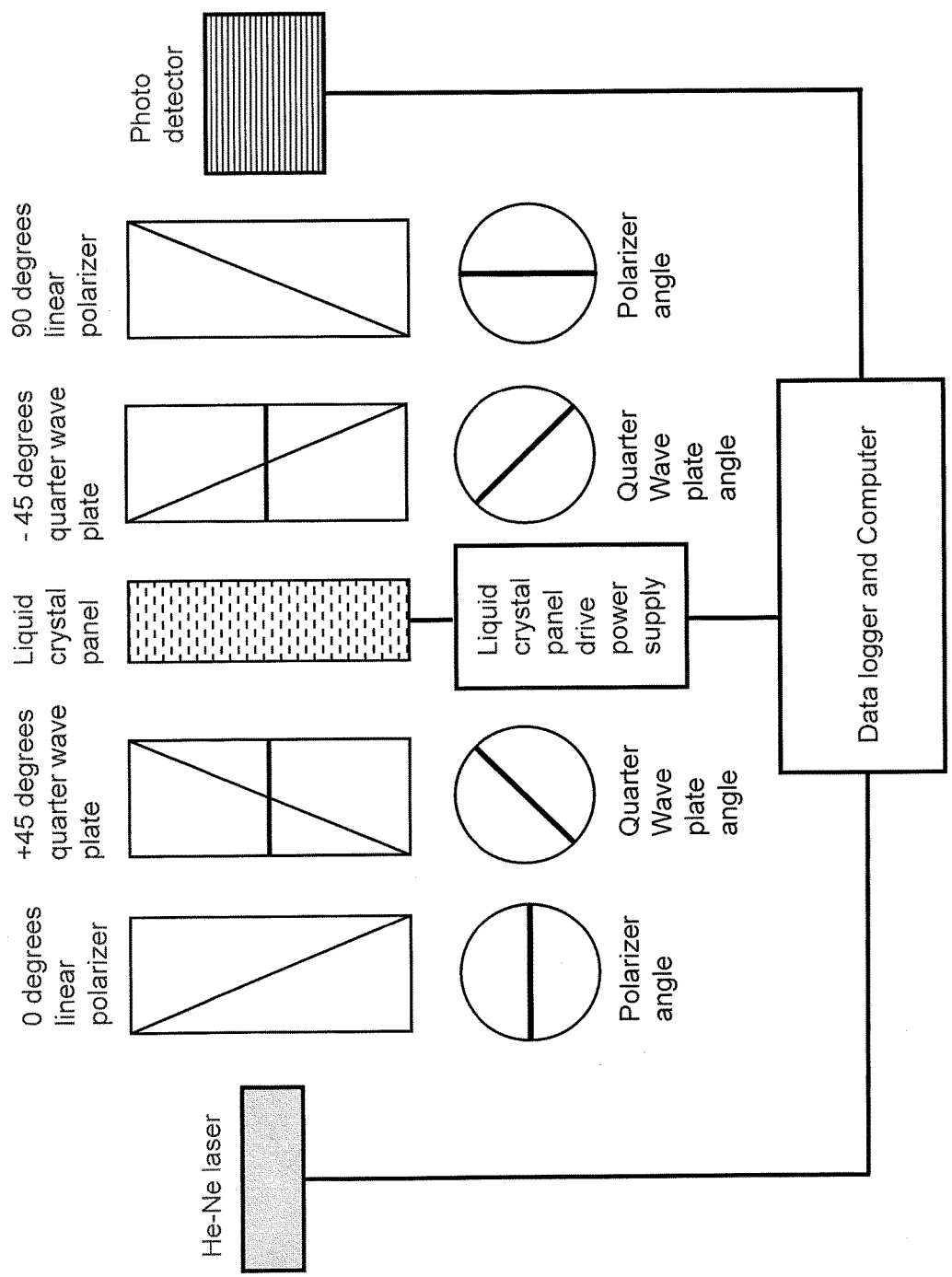
FIG. 16 illustrates a light throughput measurement set up with circularly polarized light.
Figure 17:
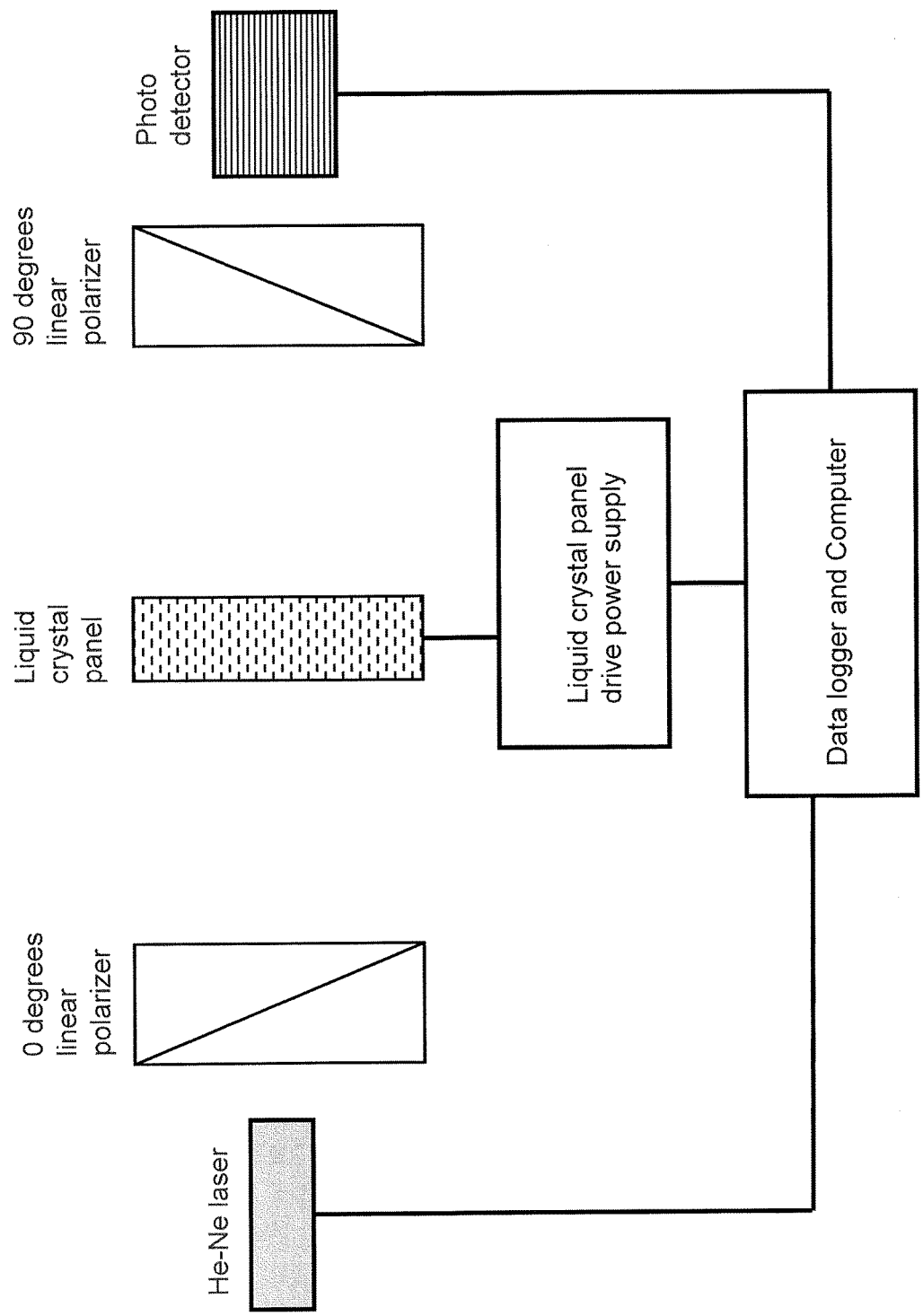
FIG. 17 illustrates a light throughput measurement set up with linearly polarized light.
Figure 34:
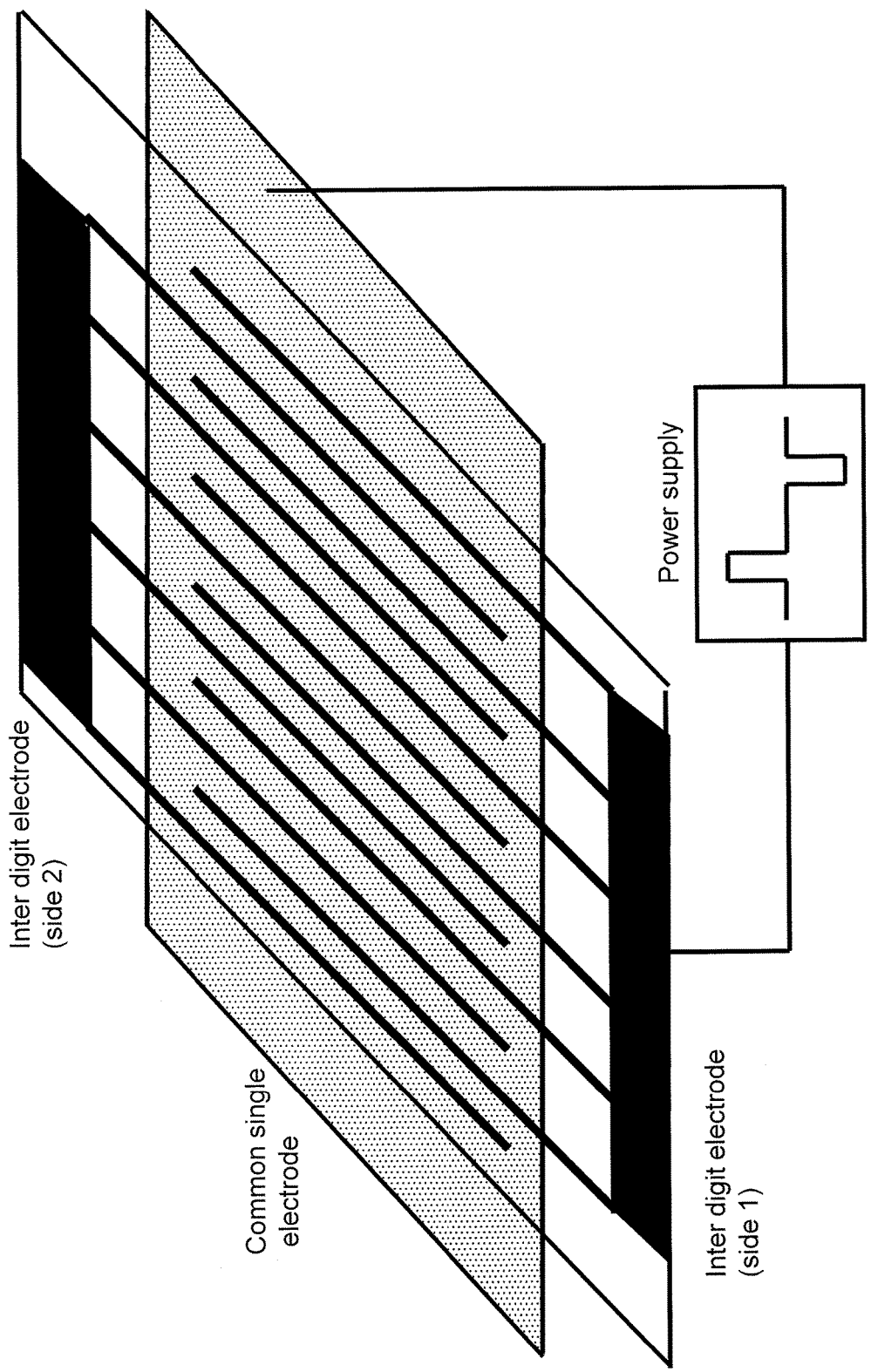
FIG. 34 illustrates a drive voltage application configuration for one-side connected inter digit electrodes and a counter single large electrode. The other side of the inter digit electrodes are left at floating potentials.

To confirm in-plane and out-of-plane switching of the liquid crystal panel prepared by the above process, the set ups of FIGS. 16 and 17 were prepared. FIG. 34 shows two pairs of linear polarizers and quarter wave plates. Incident light was a He—Ne laser light source have a wavelength of 0.633 μm (Newport R-30990). The photo detector was a photo-sensor module unit (Hamamatsu H7422-50).

Figure 36:
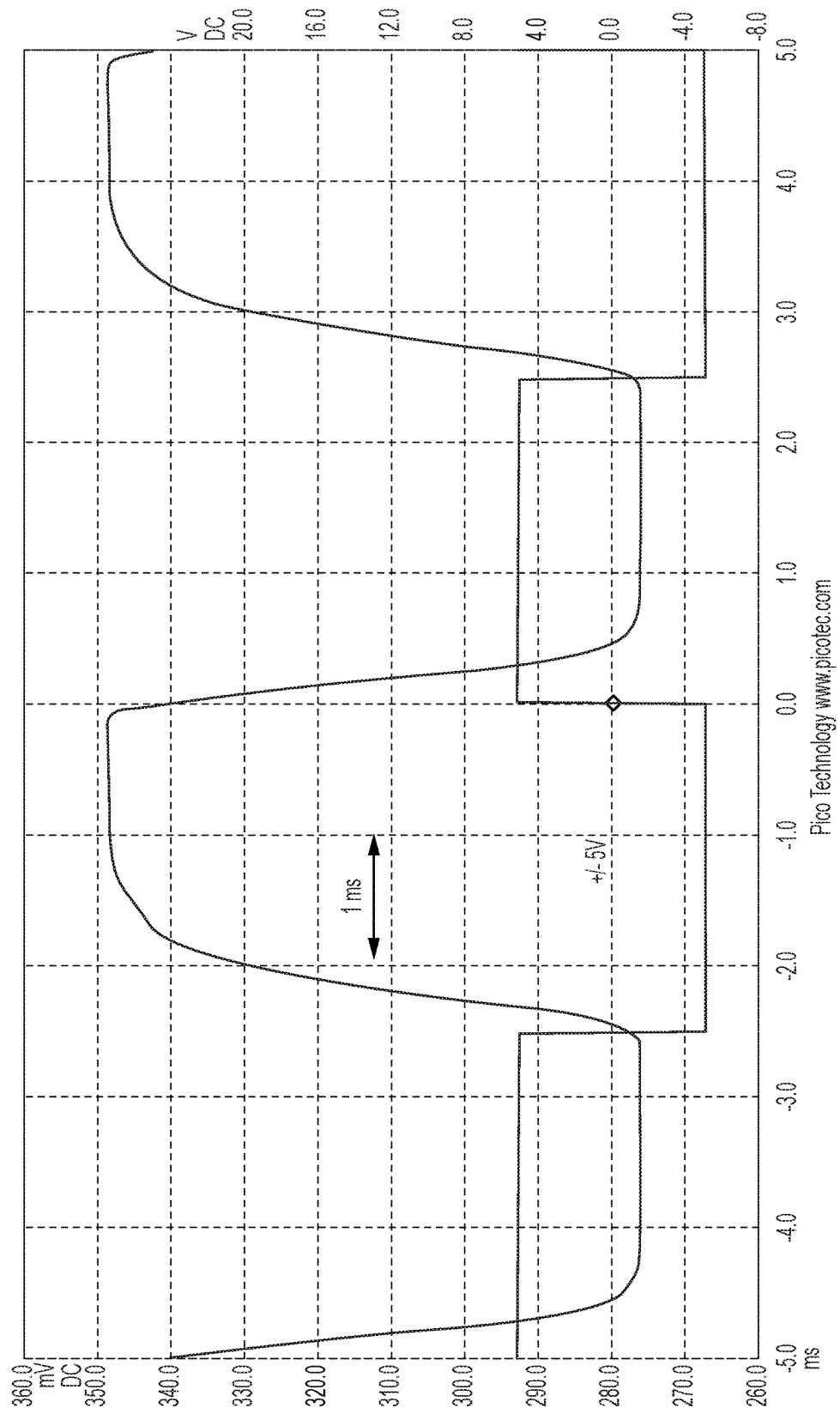
FIG. 36 illustrates a double panel having opposite liquid crystal swing direction measurement result using the light throughput measurement set up of FIG. 17 using a +/−5 V bipolar pulse having a frequency of 200 Hz.

To make the incident light polarized, the incident side of the linear polarizer was set in the same direction as that of the liquid crystal initial molecule alignment direction, defined as a zero degree angle, as shown in FIG. 36. The incident side of the first quarter wave plate for the 0.633 μm wavelength light was set at 45 degrees clockwise from the zero degree line set by the linear polarizer, and was defined as +45 degrees. The second quarter wave plate incident light passed through the liquid crystal sample was set at −45 degrees from the liquid crystal molecular initial angle so that the quarter wave plates had a 90 degree angle between them with the center angle of the initial liquid crystal molecular alignment angle. The absorption angle of the second linear polarizer was set to have 90 degrees from the incident side of the linear polarizer, so that the two linear polarizers formed cross Nicol, as shown in FIG. 16. The total data logging and processing system used was LabPro2 (Science and Engineering Instrument, USA). Using the setup of FIG. 16, incident light to the liquid crystal panel was circularly polarized and the detecting side also had circularly polarized light. If the liquid crystal panel had only in-plane retardation switching with no out-of-plane retardation switching, the detected light, after passing through both quarter wave plates and linear polarizers should have no change in light throughput. If the initial setup of the liquid crystal panel did not show light throughput at the detector side, only in-plane retardation switching shows no light throughput. Conversely, if the liquid crystal panel has any out-of-plane retardation switching from either the left or right side of FIG. 16, the out-of-plane retardation switching creates some light throughput.

When the incident light has linear polarized light and the detecting side of the light also has linear polarized light as shown in the measurement set up in FIG. 17, the light throughput status is different from that of FIG. 16. If the measurement liquid crystal panel has only in-plane retardation change, the light throughput situation is dependent on the switching status of the liquid crystal panel. When the maximum retardation is set as half lambda for the visible wavelength (560 nm/2=280 nm), with switching of the liquid crystal panel, the detecting light throughput changes from black to bright or bright to black, depending on the initial liquid crystal alignment set up. Under the Cross Nicol linear polarizer condition, the initial liquid crystal alignment direction is set along with the incident side of the polarization absorption angle, and no application of voltage produces a black state. When sufficient voltage is applied to the liquid crystal panel, the photo detector shows bright light. In regard to the above light throughput change, using the set up of FIG. 17 and any of in-plane only, out-of-plane only, or mixing both in plane and out-of-plane retardation changes, FIG. 17 measurement set up gives light throughput changes. On the other hand, the set up of FIG. 16 gives light throughput change only when the liquid crystal has an out-of-plane retardation change.

Figure 18:
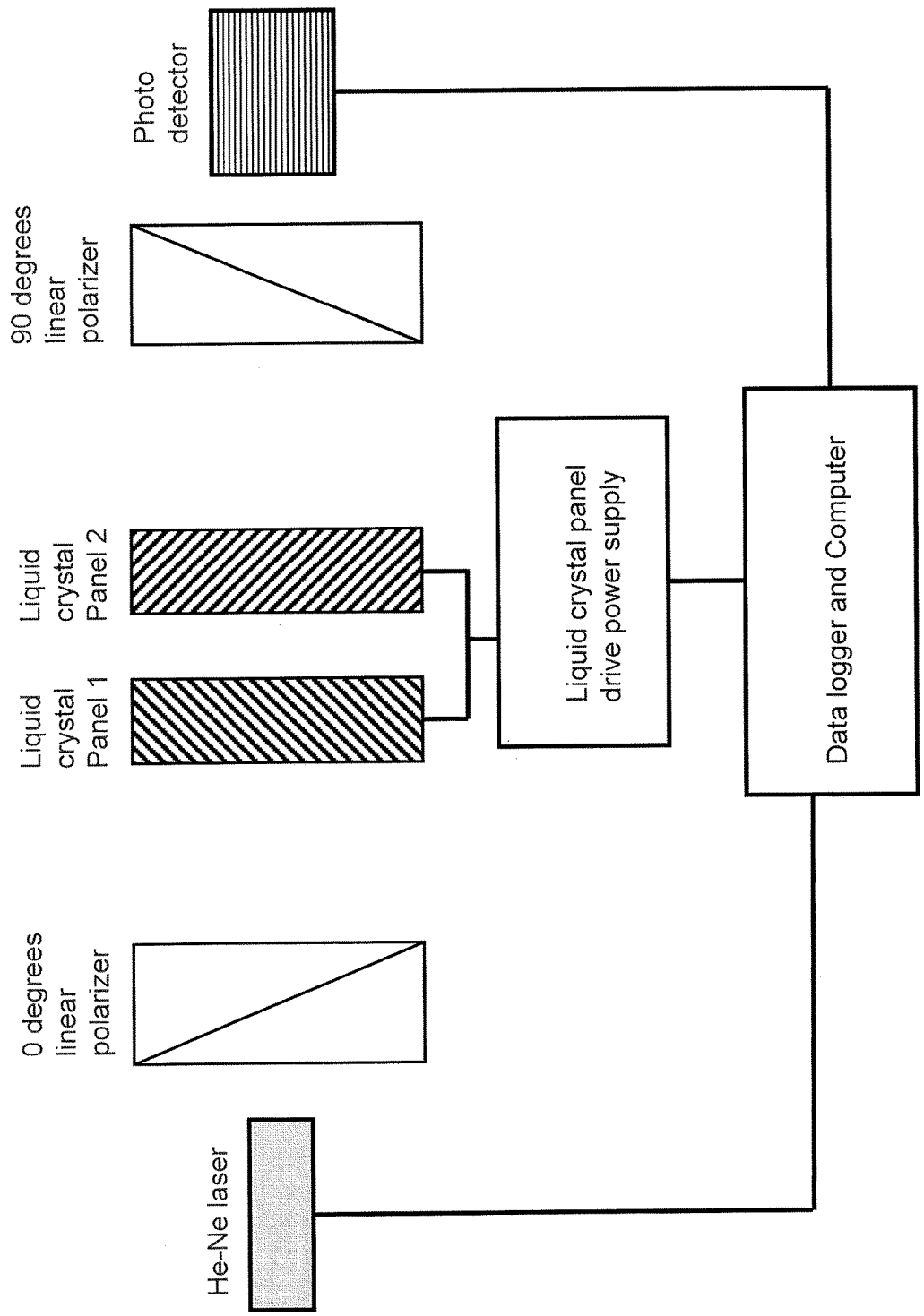
FIG. 18 illustrates a light throughput measurement set up with linearly polarized light for double stacked liquid crystal panels.
Figure 19:
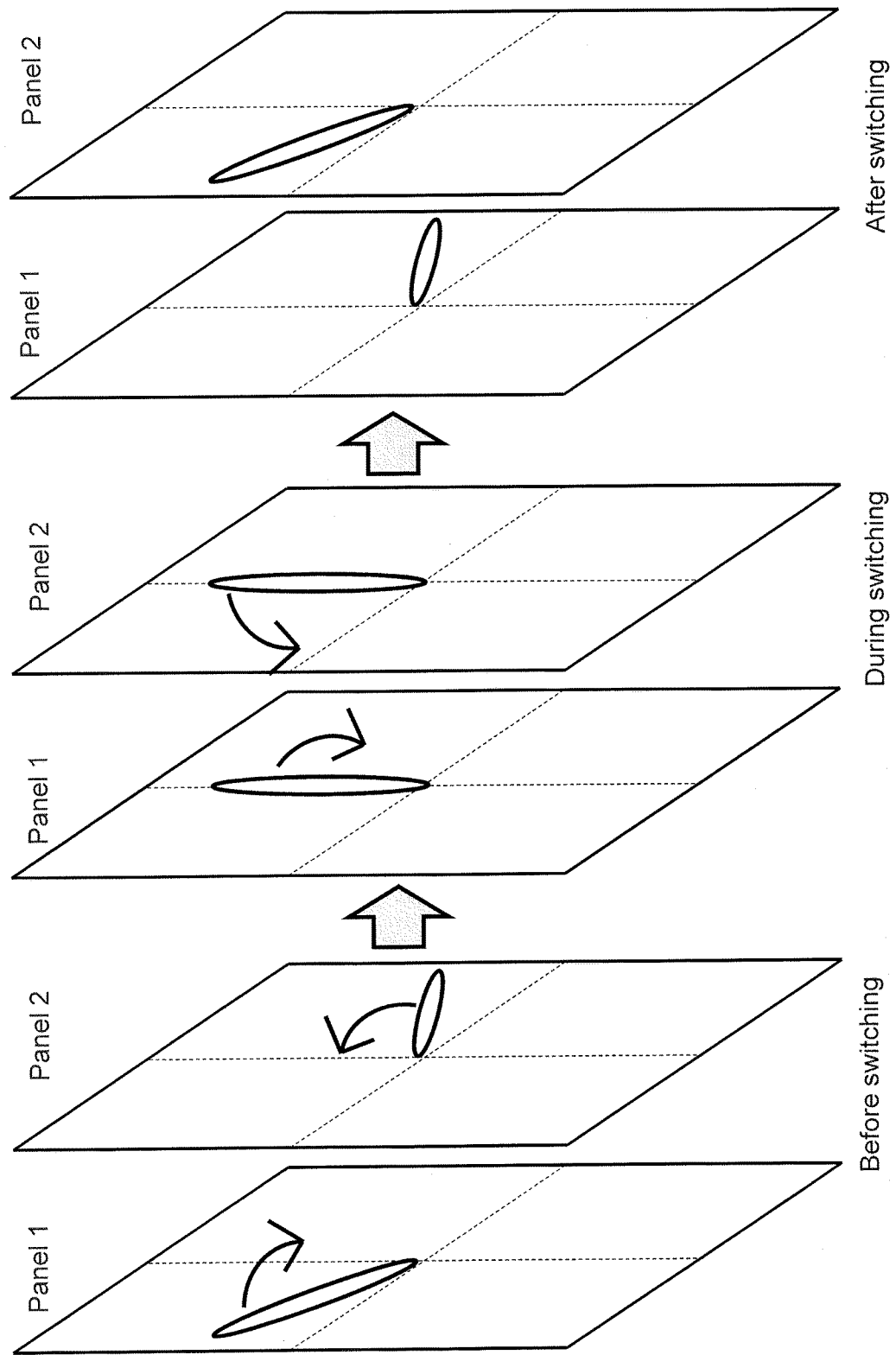
FIG. 19 illustrates double stacked liquid crystal panels having in-plane only liquid crystal molecular switching in opposite directions.
Figure 20:
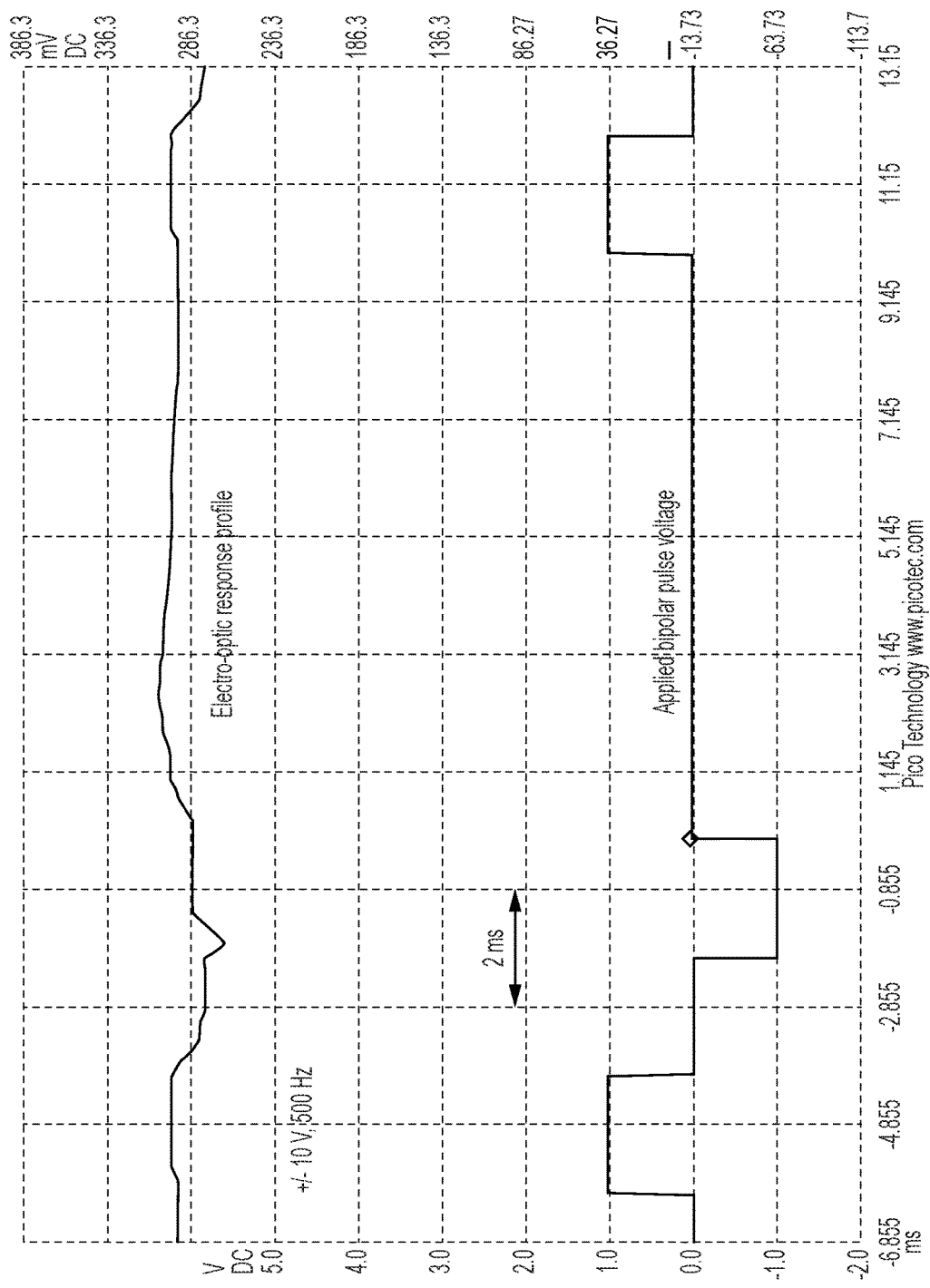
FIG. 20 illustrates a measurement result for double stacked liquid crystal panels having in-plane only liquid crystal molecular switching in opposite directions.
Figure 21:
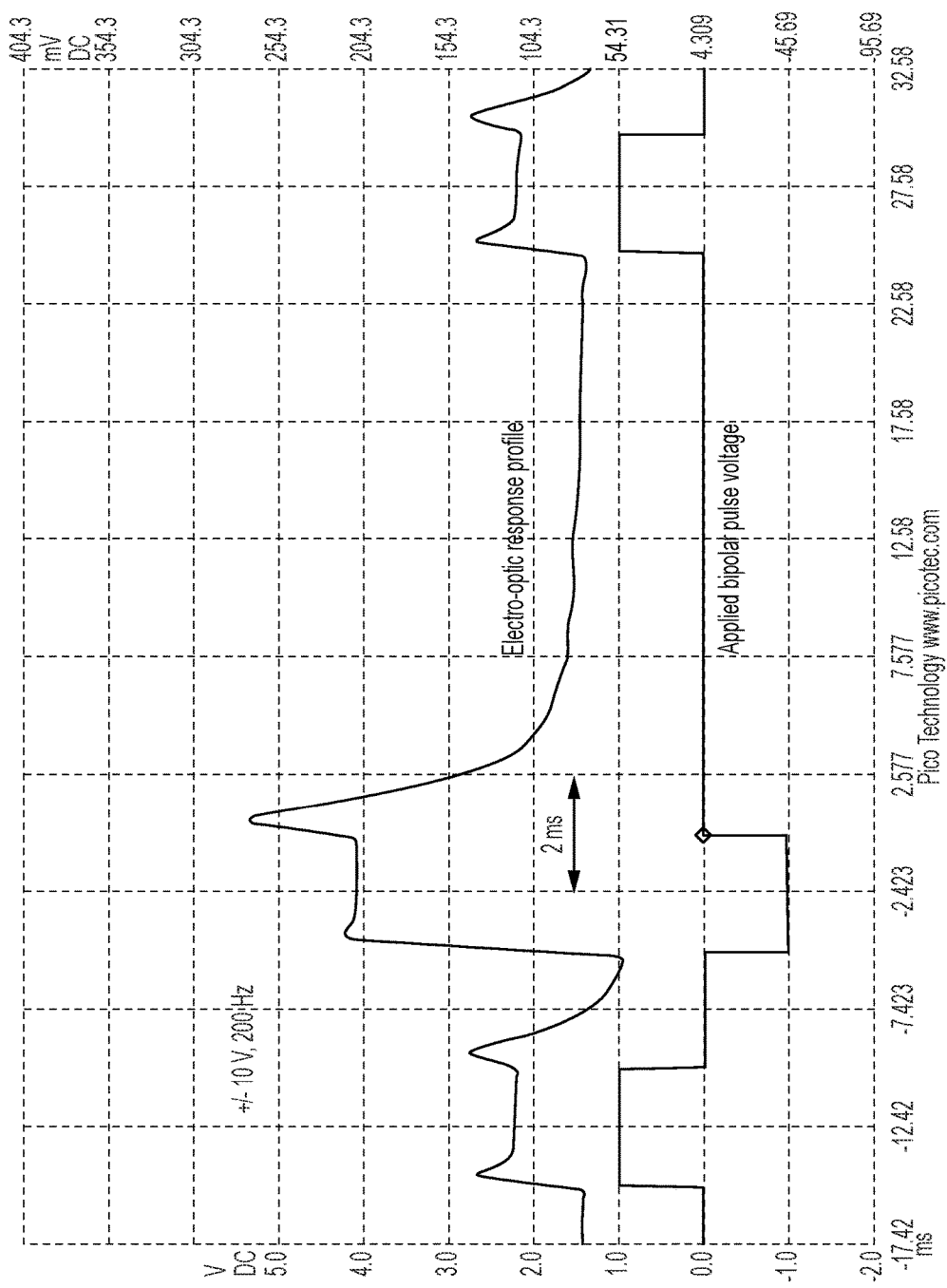
FIG. 21 illustrates a measurement result for double stacked liquid crystal panels having in-plane only with each panel rotated 45 degrees from the other.

The set up of FIG. 18 was used for in depth investigation of in-plane only retardation change. If a liquid crystal panel has only in-plane retardation change, and liquid crystal molecules swing in a single plane, depending on swing angle, FIG. 18 set-up gives light throughput change as discussed above. When two liquid crystal panels having the same configuration are stacked with their swing direction opposite each other by flipping each panel as shown in FIG. 19, and both panels are driven with the same drive voltage, the measurement set up of FIG. 18 should have no particular light throughput change, because the two stacked panels compensate in-plane retardation for each other as shown in FIG. 19. Using above described two liquid crystal panels having the same configuration with the liquid crystal mixture described in Table 1, the electro-optic profile was measured by applying a 10 V, 500 Hz bipolar waveform voltage using the set up of FIG. 18. FIG. 20 shows the measurement results. When two identical liquid crystal panels were stacked and flipped with respect to each other, each panel's liquid crystal molecules move in the same plane at each panel, as shown in FIG. 19, and these two liquid crystal swing planes are parallel to each other, resulting in the cancellation of all of retardation switching. As shown in FIG. 20, these flipped stacking panels show substantially flat light throughput with the measurement set up of FIG. 18. A slight change of voltage pulse is applied due to imperfect adjustment of each panel's initial liquid crystal alignment direction. Although there was slight difference in the liquid crystal molecular initial alignment direction between the two panels, taking into account its signal level, such a bump signal is small enough to conclude cancellation of in-plane retardation change in light of its signal level. On the contrary, when using the same two panels used to obtain the result of FIG. 20, when each panel's stacking direction was rotated 45 degrees from the first panel to the second panel and a 10 V, 200 Hz bipolar pulse voltage was applied, such a configuration gave the result shown in FIG. 21 result with the measurement set up of FIG. 19. Comparison of FIGS. 20 and 21 shows that despite identical movement of liquid crystal molecules at each stacked panel, total retardation switching is different depending on the stacking direction and angle of each panel. When two panels are stacked and flipped relative to each other, FIG. 20 shows that the retardation switching of the two panels is almost entirely cancelled. On the other hand, when two panels were stacked and flipped, but rotated by 45, then the total retardation change shows strong signal. As discussed in four different cases above, the results of both FIGS. 20 and 21 are only possible when each liquid crystal panel's retardation change is completely in-plane and no out-of-plane retardation switching exists.

Figure 22:
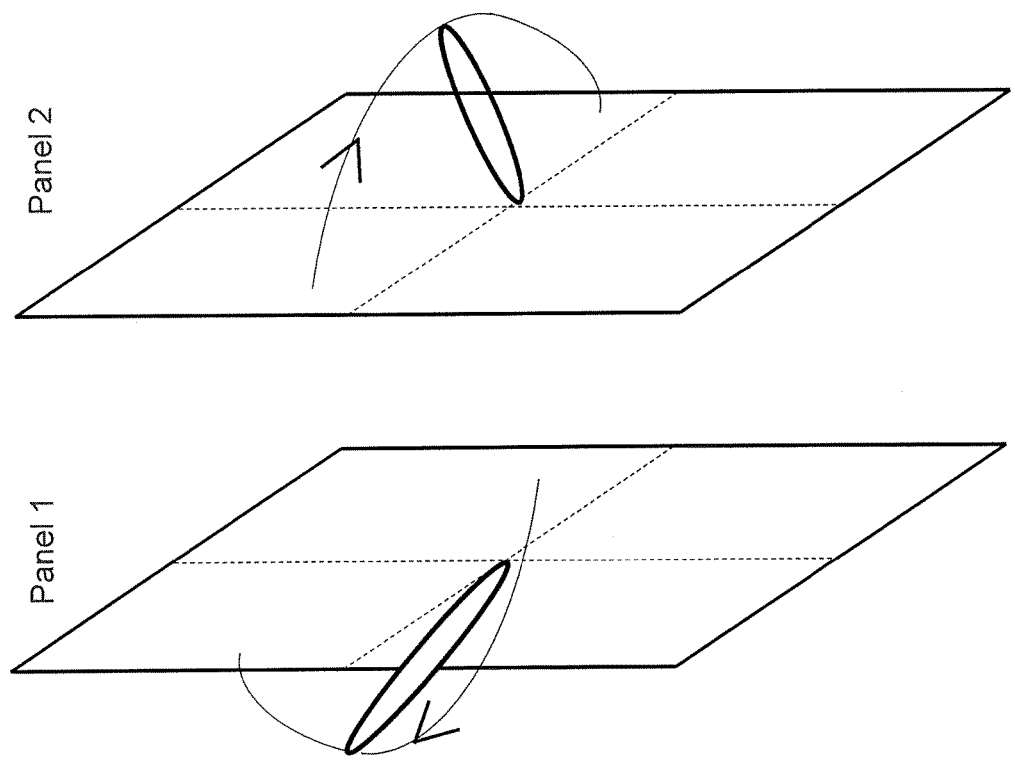
FIG. 22 illustrates double stacked liquid crystal panels having both in-plane and out-of-plane switching and opposite molecular switching directions. Each panel has a different plane side of out-of-plane switching.

When a liquid crystal panel has both in-plane and out-of-plane retardation changes, and two such panels are stacked with their liquid crystal moving direction set opposite as shown in FIG. 22, these stacked panels show light throughput change with the measurement set up of FIG. 18. Even when each liquid crystal panel's liquid crystal molecular movement is exactly opposite direction and the in-plane retardation element is cancelled, out-of-plane retardation is not cancelled, and even magnified each out-of-plane retardation change. Therefore, the measurement set up of FIG. 18 is effective to determine if a liquid crystal panel has either in-plane only or out-of-plane retardation change.

Figure 23:
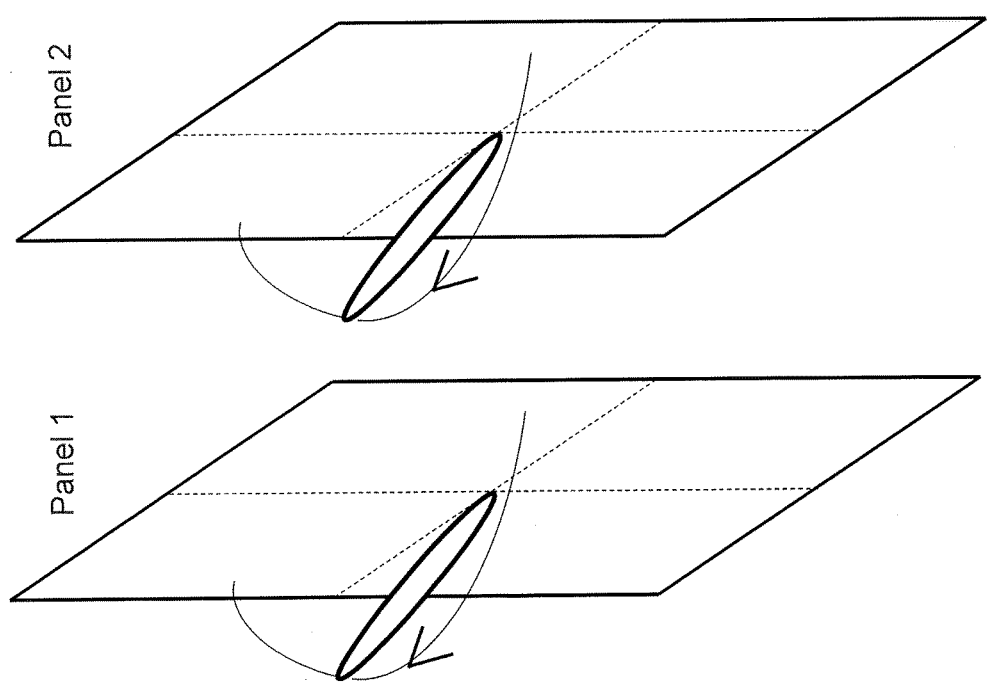
FIG. 23 illustrates double stacked liquid crystal panels having both in-plane and out-of-plane switching and the same molecular switching direction. Each panel has the same plane side of out-of-plane switching.
Figure 24:
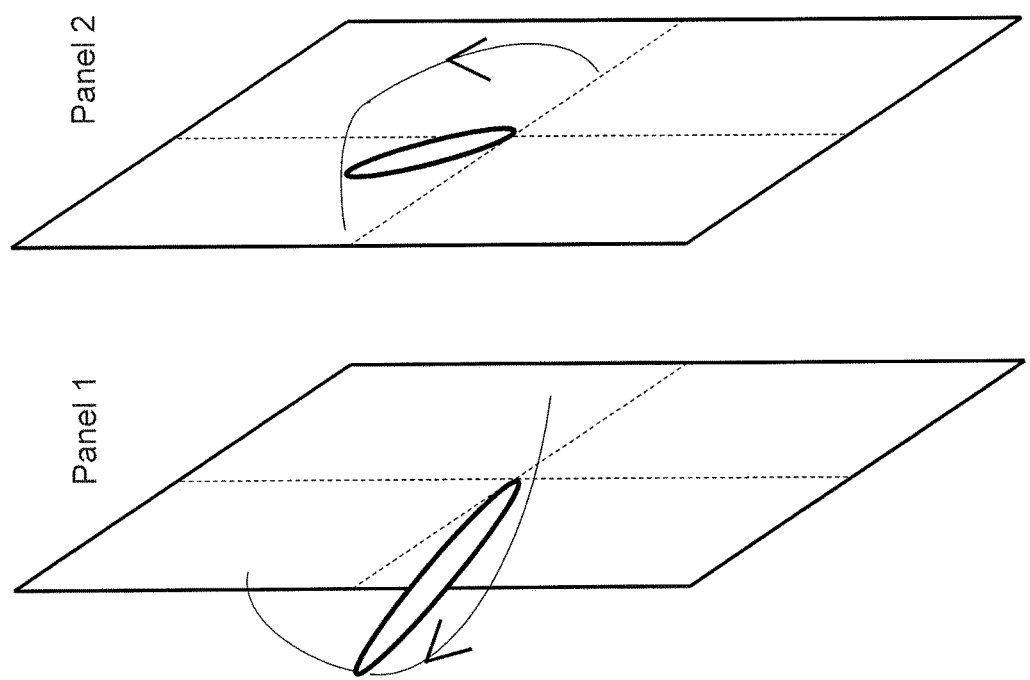
FIG. 24 illustrates double stacked liquid crystal panels having both in-plane and out-of-plane switching and different molecular switching directions. Each panel has a different plane side of out-of-plane switching.
Figure 25:
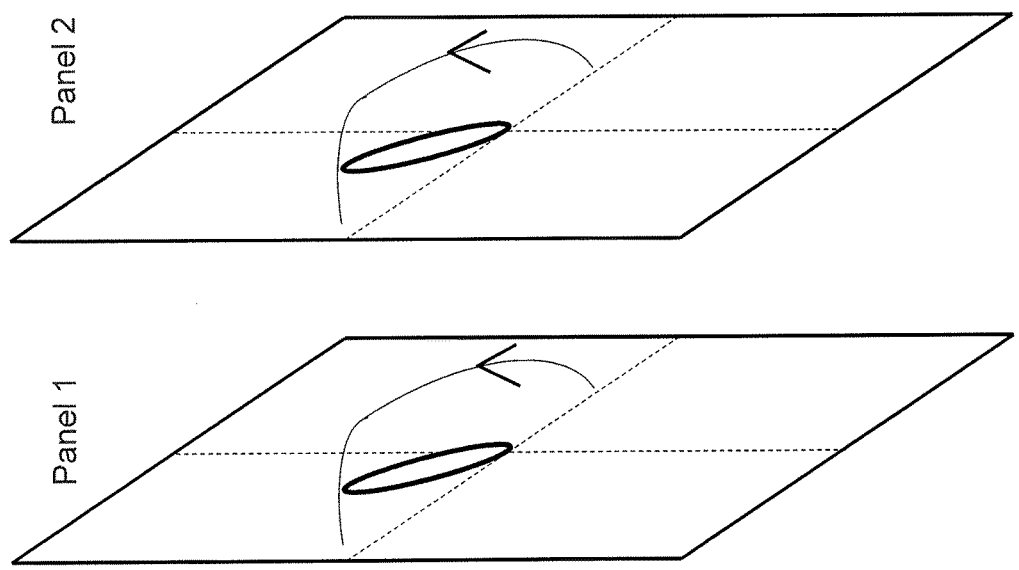
FIG. 25 illustrates double stacked liquid crystal panels having both in-plane and out-of-plane switching and the same molecular switching direction. Each panel has the same plane side of out-of-plane switching.

Mixing in plane and out-of-plane retardation change with two stacked panels produces four combinations, as shown in FIGS. 22 to 25. FIG. 20 shows the stacking of panels, each panel having flipped opposite liquid crystal molecular movements. FIG. 23 shows the stacking of panels, each panel having the same direction and same liquid crystal molecular movements. FIG. 24 shows the stacking of panels, each panel having flipped and same direction of liquid crystal molecular movements. FIG. 25 shows the stacking of panels, each panel having the same direction and same liquid crystal molecular movements. In each of the four cases shown in FIGS. 22 to 25, such a panel shows light throughput change with the measurement set up of FIG. 18 as long as a liquid crystal panel has out-of-plane switching.

Figure 26:
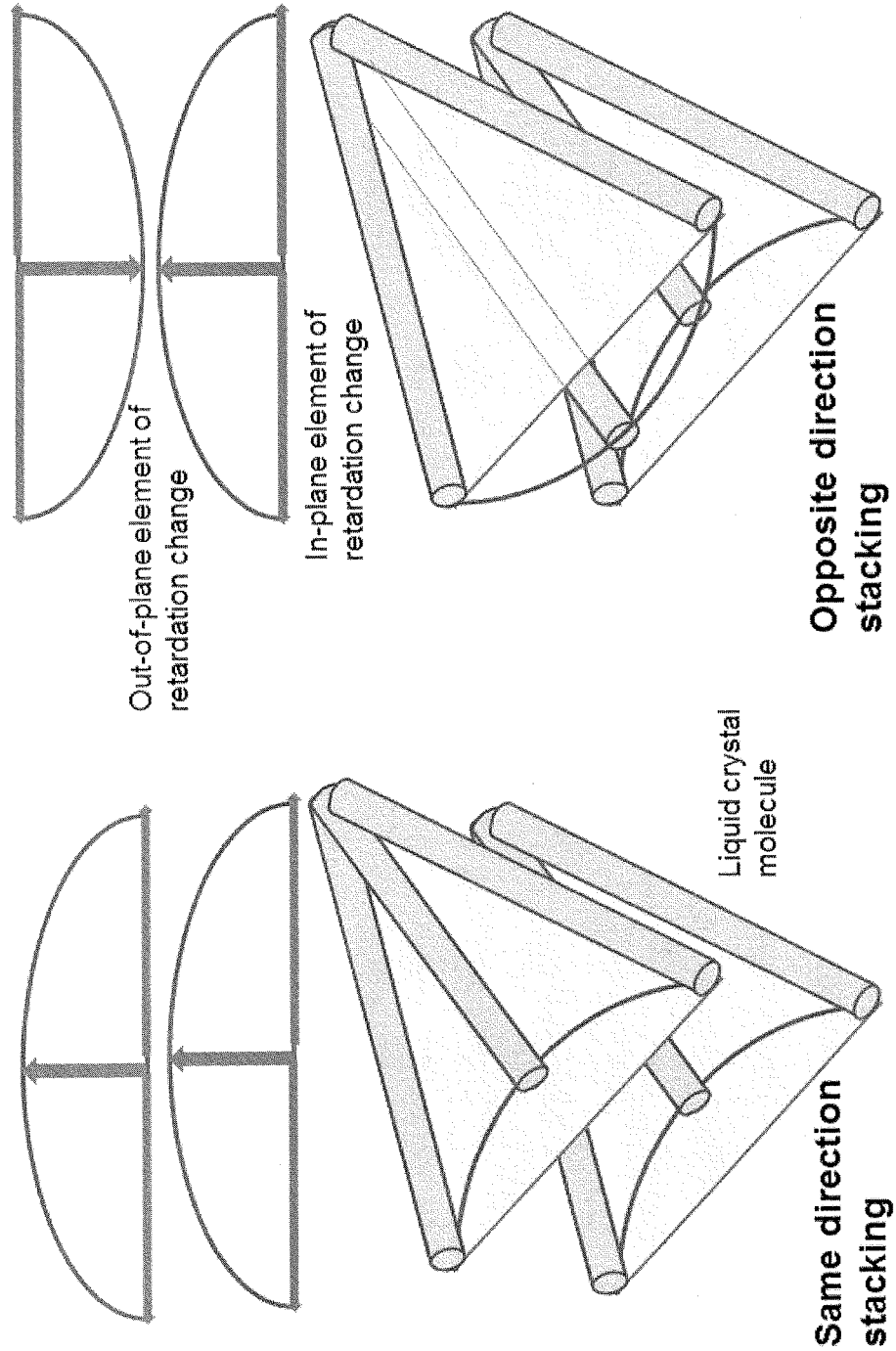
FIG. 26 illustrates two cases of double stacked liquid crystal panels having both in-plane and out-of-plane switching. In one case, each panel has a different out-of-plane side. In the second case, each panel has the same out-of-plane side.
Figure 27:
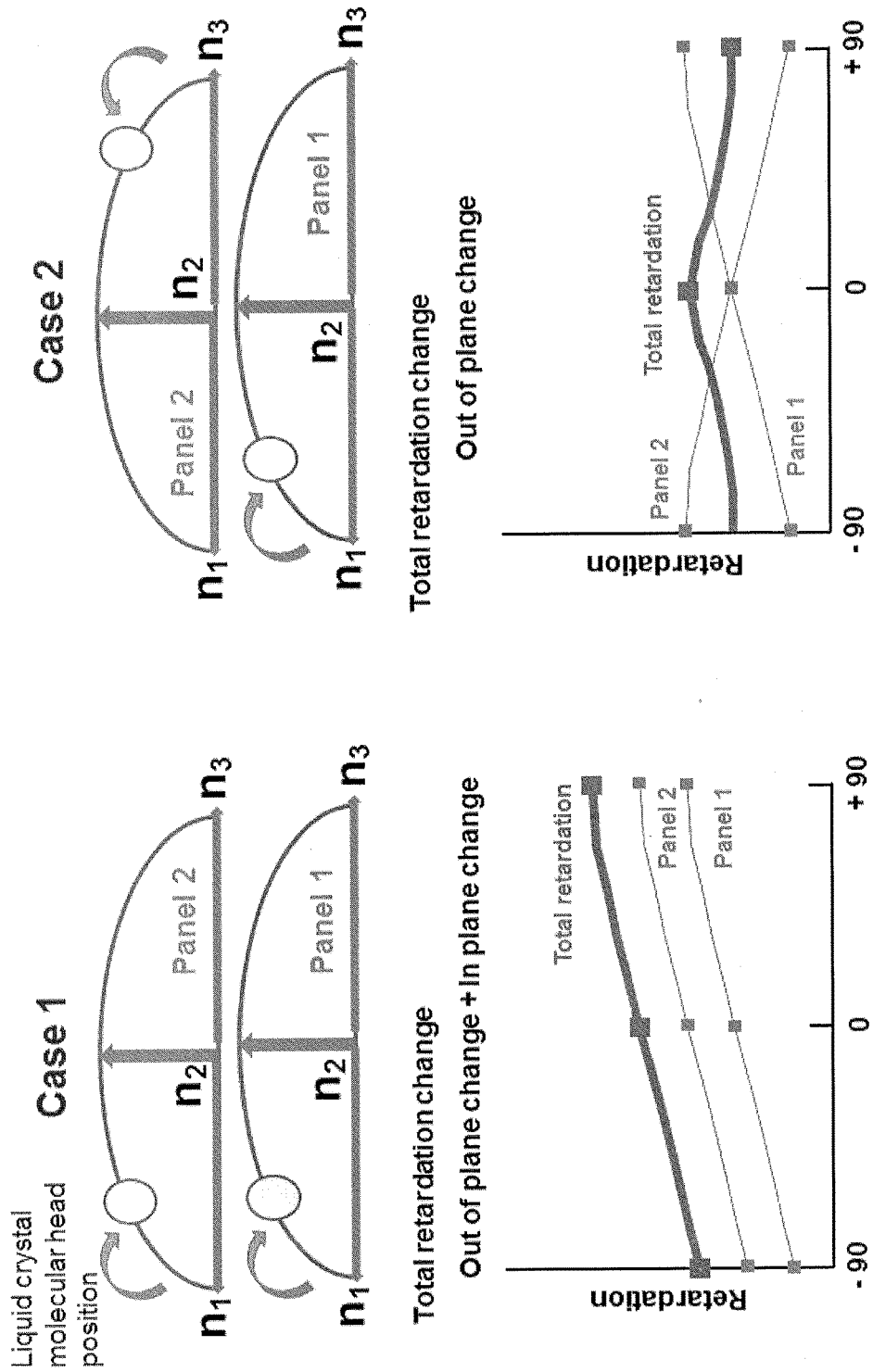
FIG. 27 illustrates two cases of double stacked liquid crystal panels. In Case 1, the panels have the same in-plane retardation switching direction. In Case 2, the panels have opposite in-plane retardation switching directions.
Figure 28:
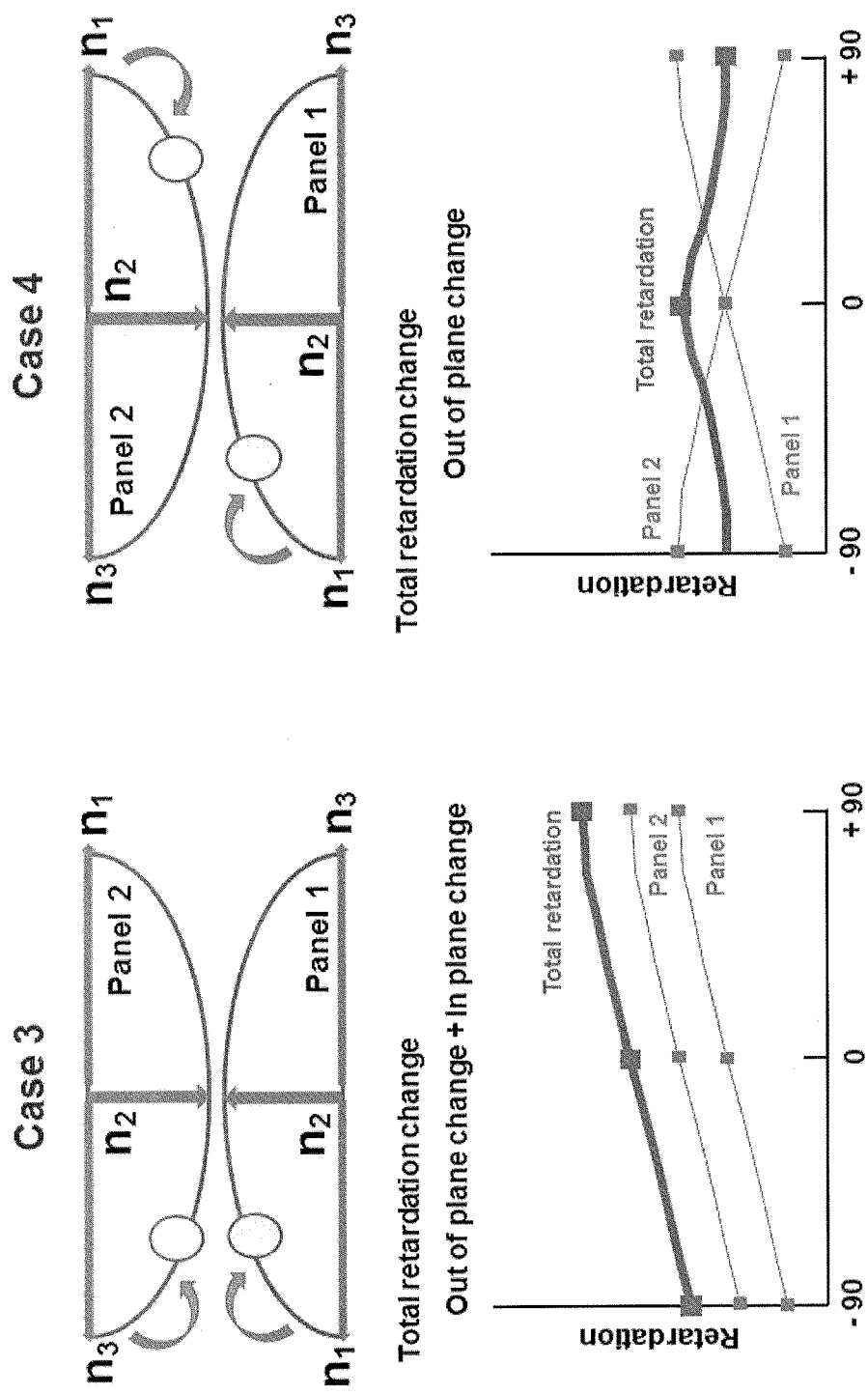
FIG. 28 illustrates two cases of double stacked liquid crystal panels. In Case 3, the panels have the same in-plane retardation switching direction and opposite out-of-plane retardation switching direction. In Case 4, the panels have the opposite in-plane retardation switching direction and opposite out-of-plane retardation switching direction.

FIG. 26 illustrates both in-plane and out-of-plane retardation switching. In this case, there are two stacking configurations. In one case, both panels have the same direction of stacking, and the out-of-plane switching is in the same direction. In a second case, the panels are stacked in an opposite direction, and the out-of-plane switching is in opposite directions. Both configurations permit two cases of in-plane switching. In one case, the panels are stacked in the same direction, and the in-plane retardation switching is also in the same direction. In a second case, the panels are stacked in the same direction, but the in-plane retardation switching is in opposite directions, as shown in FIG. 27. Case 1 of FIG. 28 shows both in-plane and out-of-plane retardation switching is in the same direction and shows an accumulated and monotonically increasing retardation change with the measurement set up of FIG. 18. In the Case 2 of FIG. 27, the panels have the same out-of-plane retardation switching direction but opposing in-plane retardation switching direction and shows a peak-shaped retardation change in terms of liquid crystal molecule switching. FIG. 28 illustrates two additional cases. In Case 3 of FIG. 28, the panels have the same in-plane retardation switching direction but opposing out-of-plane retardation switching directions. In Case 4 of FIG. 28, the panels have opposing directions of both in-plane and out-of-plane retardation switching. Cases 3 and 4 of FIG. 28 produce the same results as Cases 1 and 2 of FIG. 27, respectively.

Figure 29:
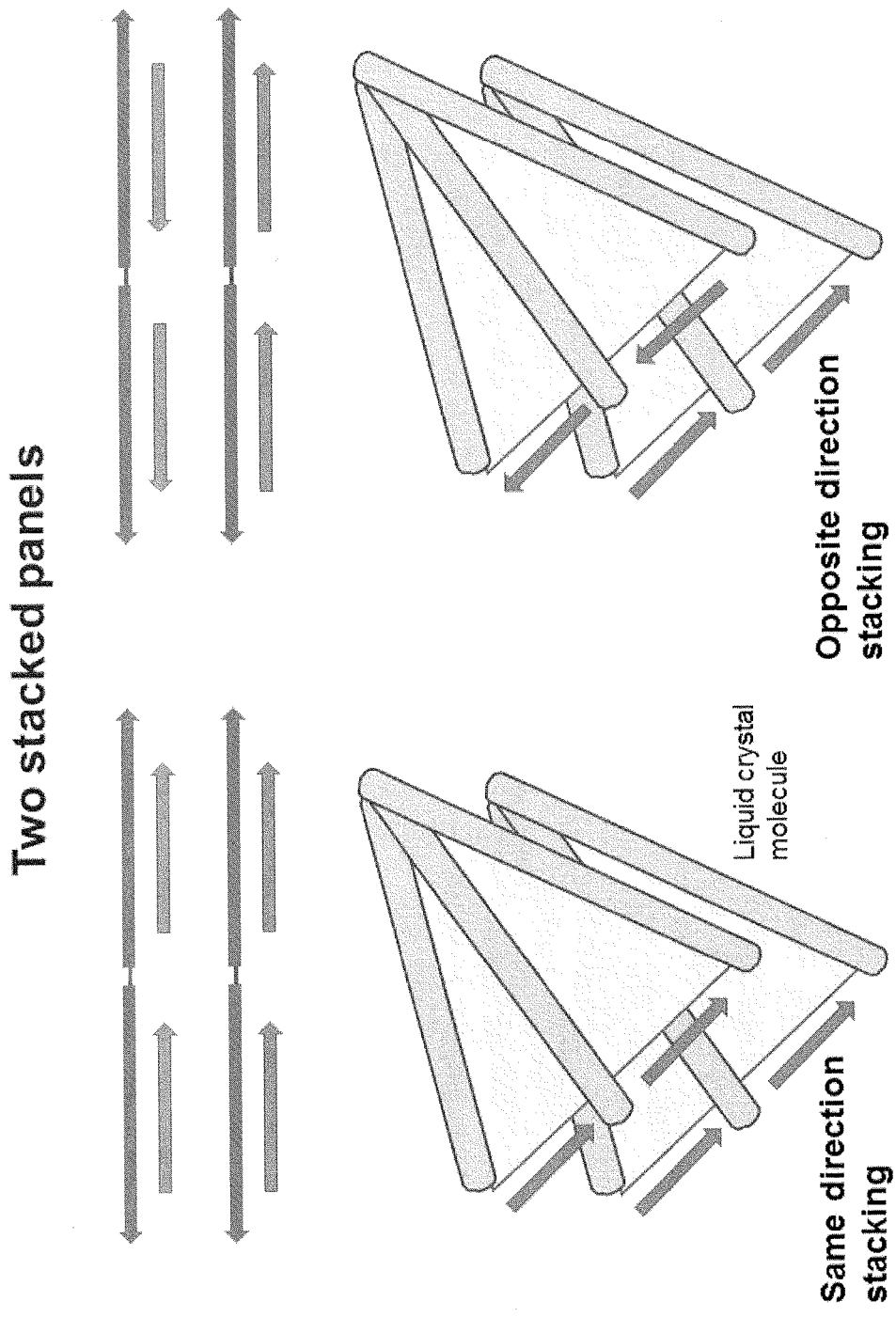
FIG. 29 illustrates two cases of double stacked liquid crystal panels having in-plane only switching, in which both panels have the same in-plane movement in the first case, and the panels have opposite in-plane movement in the second case.
Figure 30:
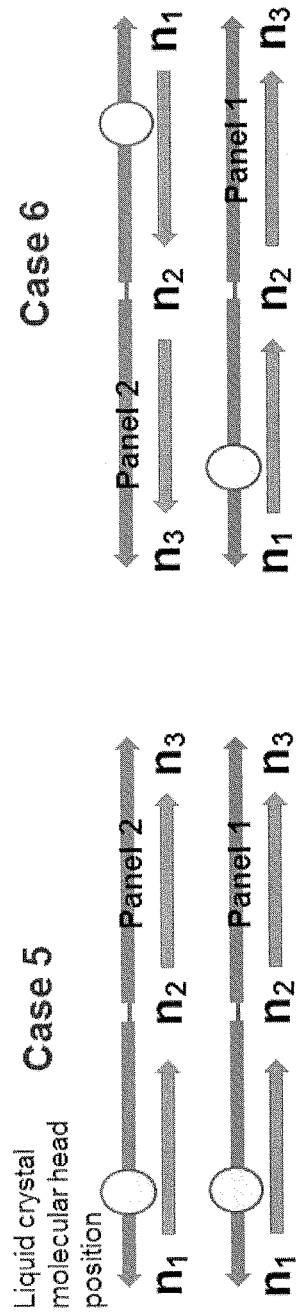
FIG. 30 illustrates two cases of double stacked liquid crystal panels. In Case 5, the panels have the same in-plane retardation switching direction. In Case 6, the panels have the opposite in-plane retardation switching direction.
Figure 30:
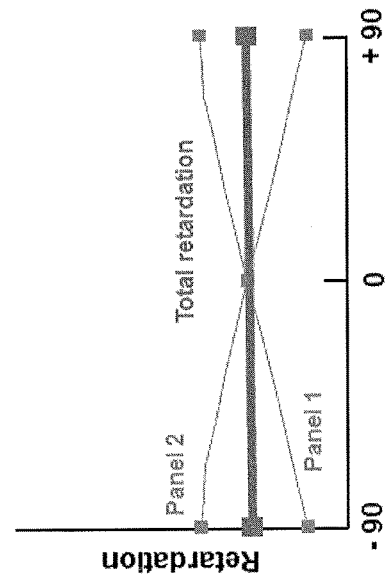
Figure 30:
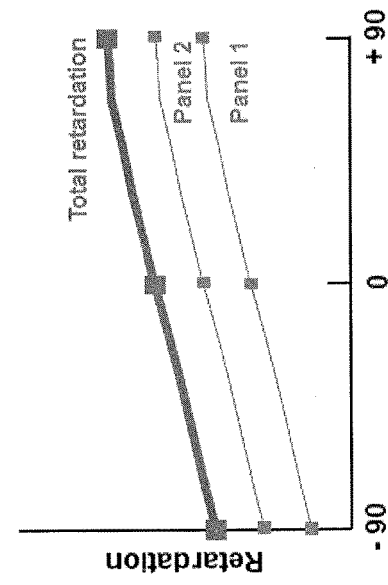

When a liquid crystal panel has only in-plane retardation switching, there are two panel stacking configurations, as shown in FIG. 29. In the first configuration, the direction of in-plane retardation switching is the same for both panels. In the second configuration, the direction of in-plane retardation switching for the two panels are opposite each other. The retardation switching behavior of the two configurations is shown in FIG. 30. In Case 5 of FIG. 30, the in-plane retardation switching has the same direction for both panels, resulting in larger retardation switching that for a single panel with only in-plane retardation switching. In Case 6 of FIG. 30, the in-plane retardation switching has the opposite direction for each panel, and the in-plane retardation switching is cancelled.

Based on modelling and empirical measurement results, it is demonstrated that the liquid crystal panel prepared by the above procedure has only in-plane retardation switching.

Example 1 (An Embodiment of the Invention)

10 mm diameter, round-shaped transparent electrodes (with 60 nm thickness Indium Oxide layer) with patterned 25 mm×20 mm glass substrates were cleaned using high alkaline (ph 11) detergent. After being rinsed by DI water for over 15 minutes, the cleaned substrates were dried in a clean oven. Polyamide-imide solution (RN-1175: Nissan Chemical, Japan) was span coated on the cleaned substrate with a 2,500 rpm spin rate. After spin coating, the substrate was pre-cured on the hot plate at 80 C for 5 minutes, then final cured in the clean oven at 240 C for one hour. After being cured and cooled to room temperature, the coated polyamide-imide surface was buffed by a rubbing machine with 0.3 mm contact length with 2 passes. Rubbing direction of the pair substrates was in the so-called parallel direction. Silicon dioxide spherical shaped spacer balls having an average diameter of 4.2 microns were dispersed on the rubbed surface by spin coater with an iso propyl alcohol (IPA) dispersed solution. The spin coating rate was 1,200 rpm. After spin, the substrates were dried on the hot plate at 80 C for 5 minutes. Then the liquid crystal panels were laminated. The peripheral area was sealed using thermoset epoxy resin except for 3 mm single open area for liquid crystal filling. The perimeter area sealed laminate panel was put into a vacuum bag and then put in oven set at 60 C for 4 hours. After the seal cure was confirmed, the empty panel was set to vacuum liquid crystal filling system. The temperature of the mixed smectic liquid crystal material shown in Table 3 was elevated to 90 C and placed in the vacuum filing system. The smectic C phase of the liquid crystal mixture of Table 3 was confirmed both by differential scanning calorimetry (DSC) and polarized microscope texture observation. After the inner air was sacked off from the empty panel, the filling area was attached with the temperature elevated liquid crystal reservoir in the vacuum chamber. After it was confirmed that the open area of the peripheral glue seal was completely covered by liquid crystal material, dried nitrogen gas was inserted into the vacuum chamber. The inserted nitrogen gas pushed the liquid crystal material into the empty panel. After it was confirmed that all of the inner panel area was filled with liquid crystal material visually, the panel was picked up and the filling area was chipped off using a UV curable glue (Norland 65, USA) with spot UV exposure.

TABLE 3

Figure 31:
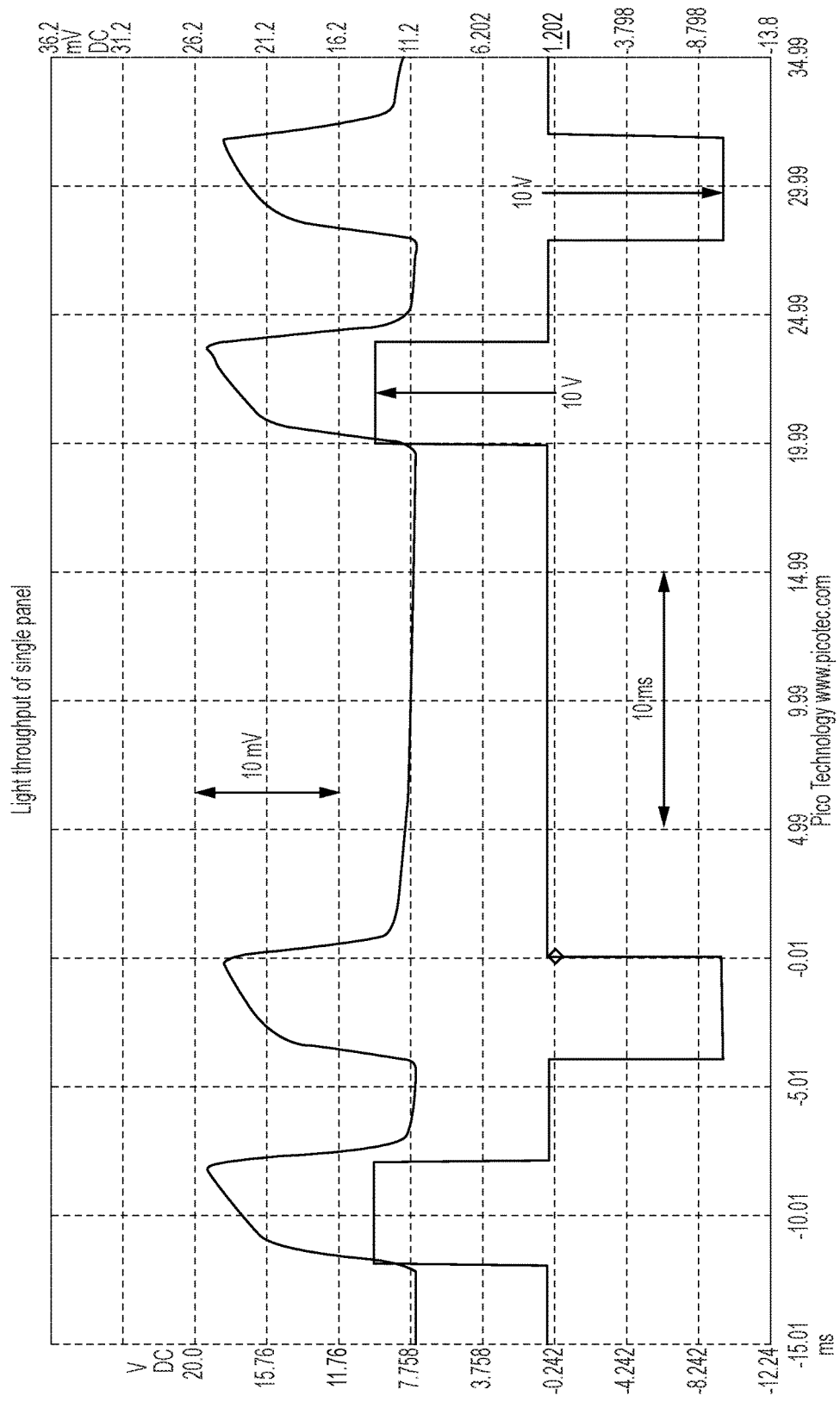
FIG. 31 illustrates a single panel measurement result using the light throughout measurement set up of FIG. 17 using a +/−10 V bipolar pulse having a frequency of 250 Hz.
Figure 32:
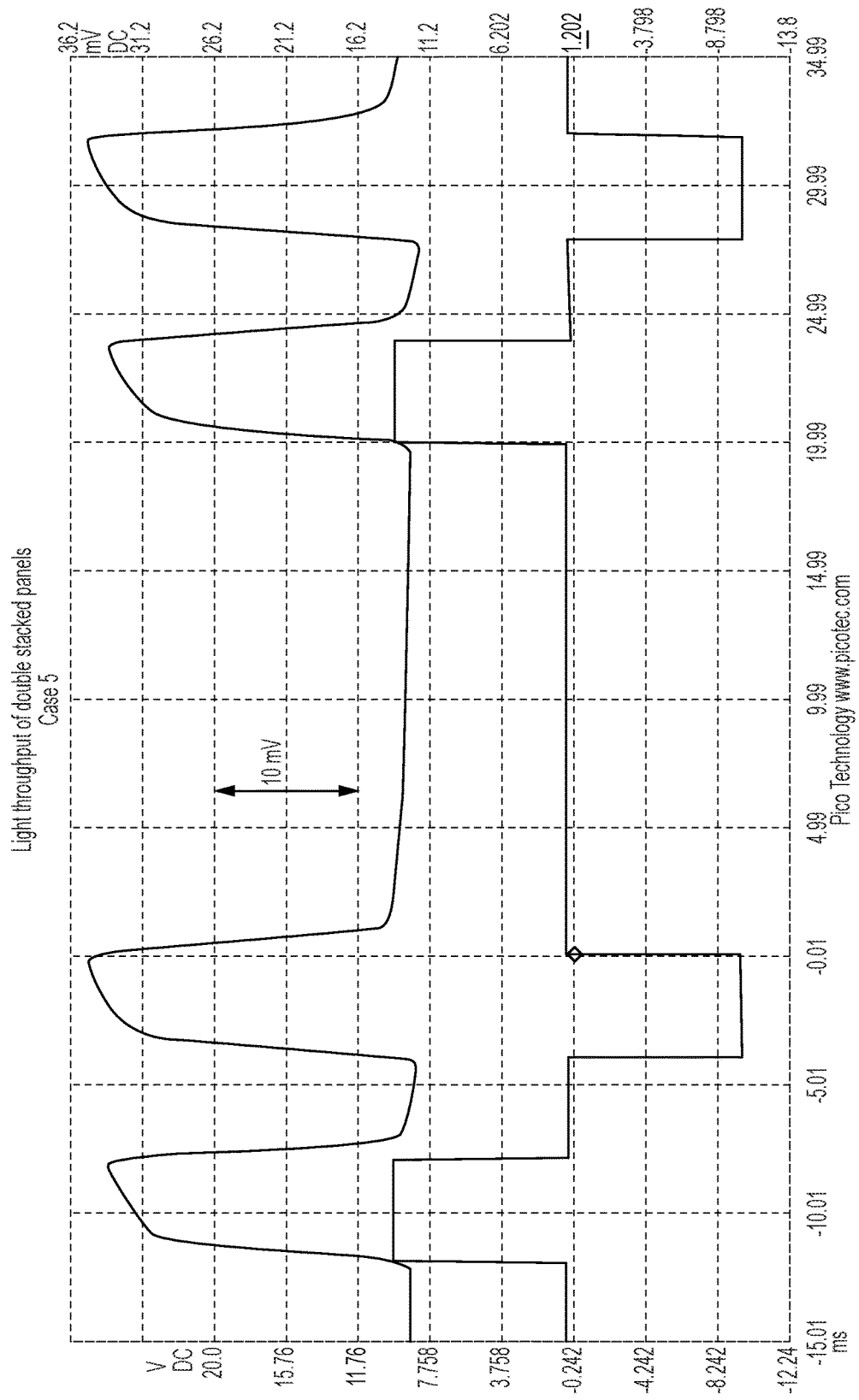
FIG. 32 illustrates a double panel having the same liquid crystal swing direction measurement result using the light throughput measurement set up of FIG. 17 using a +/−10 V bipolar pulse having a frequency of 250 Hz.

Two of the above liquid crystal panels were fabricated for the two-panel stacking measurement set up illustrated in FIG. 16. As the initial setting, without applying a drive voltage, the measured light throughput was adjusted as the minimum level. This set up was the so called extinction angle set up. The actual stacked panel angle to the incident linear polarized light was shifted clockwise by six degrees. First, only one panel was measured. The applied voltage was a bipolar pulse voltage having a frequency of 250 Hz and amplitude of +/−10 V. The measurement result is shown in FIG. 31. Regardless of the polarity of the applied voltage, the smectic liquid crystal panel is supposed to be driven by quadra-pole momentum torque so that linearly polarized light changes is polarization angle every time the pulse voltage is applied, resulting in the response shown in FIG. 31. The second measurement used a two panel stacking configuration with the same liquid crystal molecule switching direction as shown in Case 3 of FIG. 28. The result of the second measurement is shown in FIG. 32. The result of FIG. 32 shows the same peak response tendency with a signal level approximately twice as strong as that of FIG. 31. A comparison of FIGS. 31 and 32 provides support for the above discussion of the technical issues to be solved in the Background section.

Figure 33:
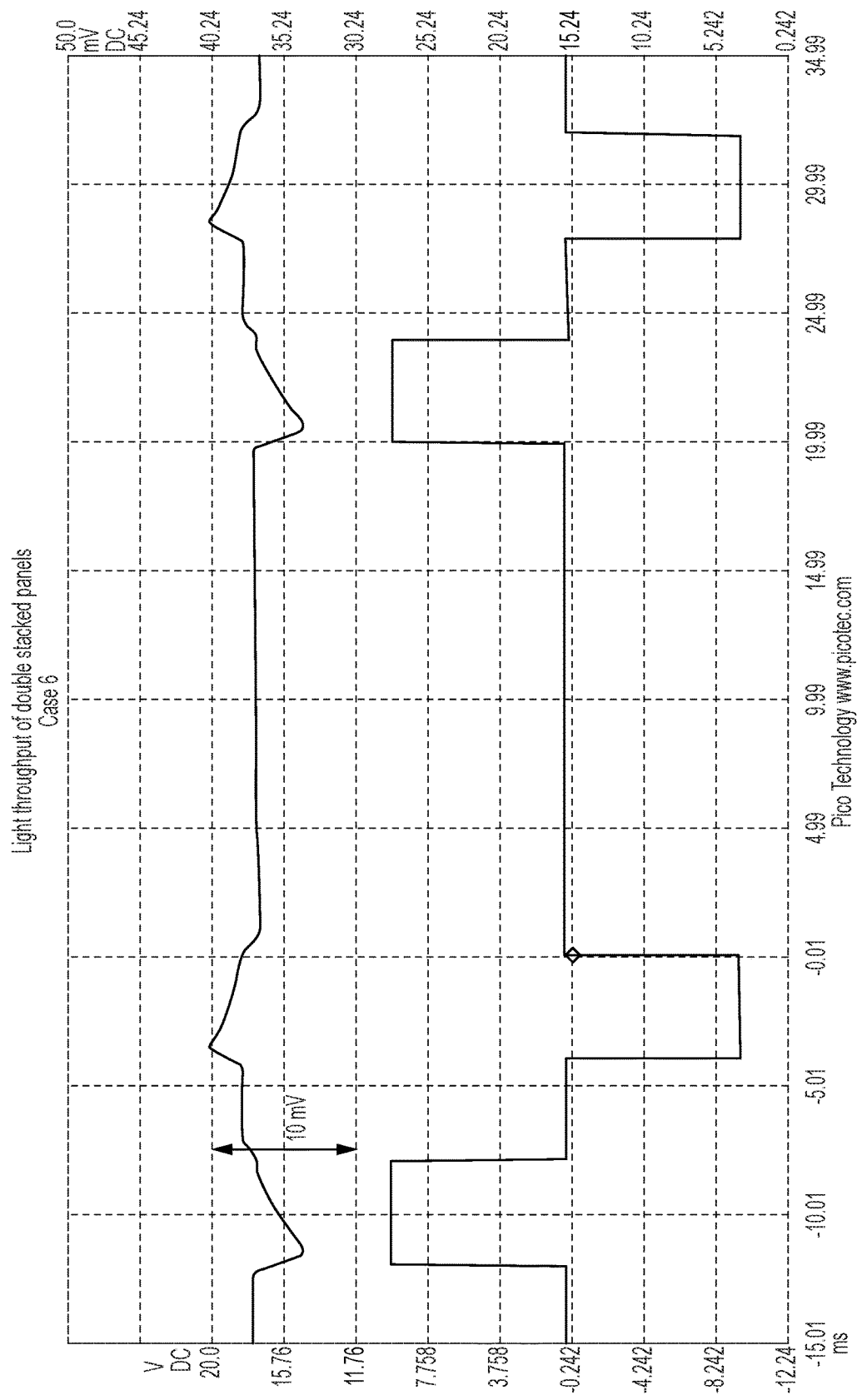
FIG. 33 illustrates a double panel having opposite liquid crystal swing direction measurement result using the light throughput measurement set up of FIG. 17 using a +/−10 V bipolar pulse having a frequency of 250 Hz.

The third measurement used two panel stacking where the liquid crystal swing direction of each panel was opposite, as shown in Case 6 of FIG. 30. The measurement result is shown in FIG. 33. In this case, the opposing in-plane molecular swing behavior cancels total panel retardation, resulting in almost no signal.

Example 2 (An Embodiment of the Invention)

After confirmation of in-plane only retardation switching, fast optical response was confirmed as follows.

Instead of using a single round electrode as described above, inter digit electrodes having four micron line width, four micron electrode gap substrate, and common non-patterned electrode substrate were used. Using the same substrate cleaning and liquid crystal alignment and lamination processes, a four micron gap panel was prepared with the liquid crystal material shown in Table 3.

Figure 35:
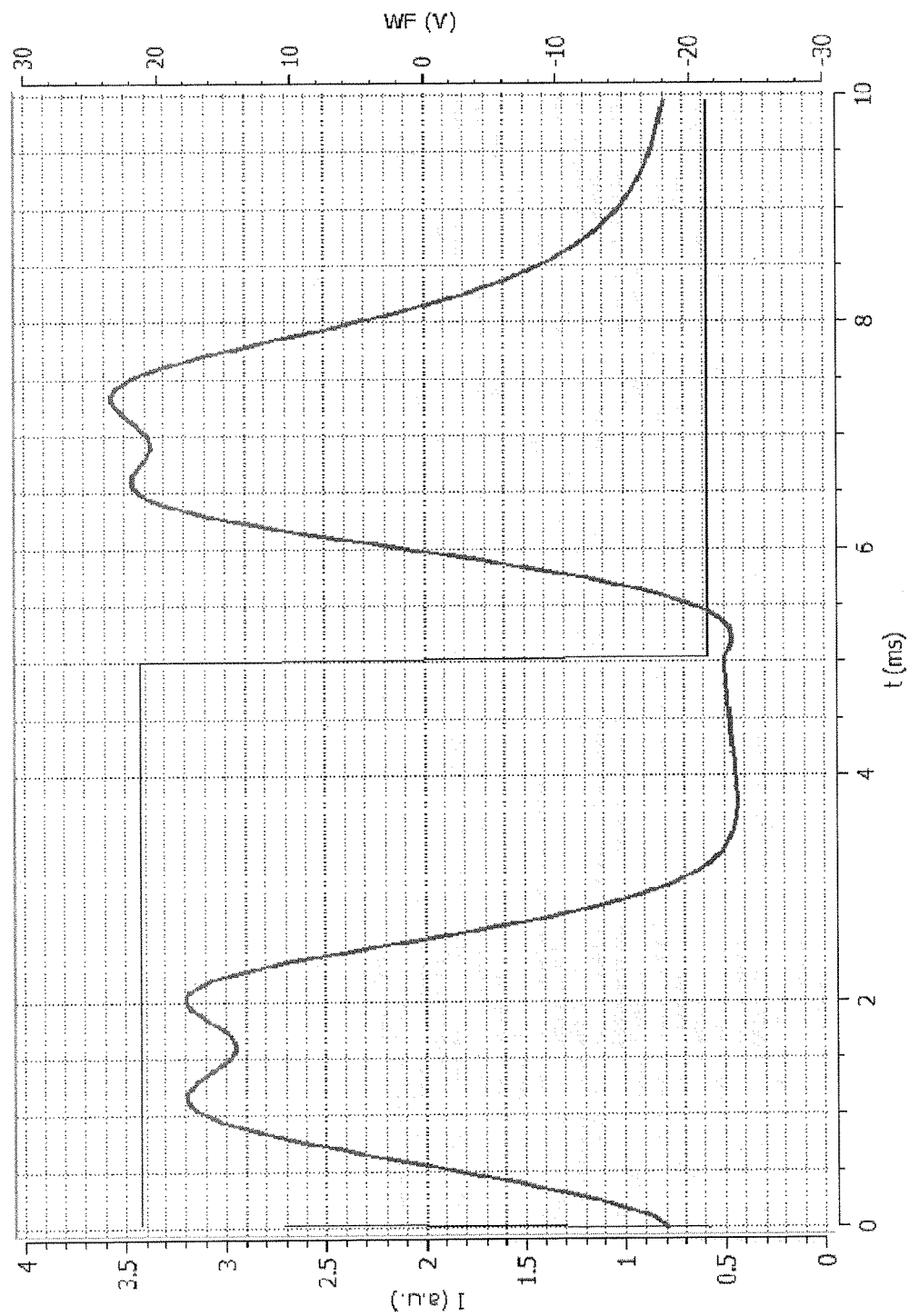
FIG. 35 illustrates the electro-optic response time of the one-side connected inter digit electrodes panel.

The panel was connected to driver electronics as shown in FIG. 34. As illustrated in FIG. 34, one side of the inter digit electrodes was kept at the same potential by connected one side of each inter digit electrode. The other side of the inter digit electrodes are kept open as floating electrodes. As shown in FIG. 34, the driving voltage was applied between one side of the inter digit electrodes and the common single large electrode. By keeping the other side of the inter digit electrodes floating, the fringe field effect between activated inter digit electrodes and non-activated inter digit electrodes was more significant compared to all active inter digit electrodes when voltage was applied between one side of the inter digit electrodes and the single large electrode. FIG. 35 shows the optical response profile of the above prepared panel. FIG. 35 was obtained by applied a +/−20 V, 100 Hz rectangular wave voltage. With 4 μm/4 μm line and space fine pitch inter digit electrode (pitch is 8 μm) and one side floating, causing a severe fringe field influence condition, FIG. 35 shows a fast optical response time with a rise time of approximately 1 ms and a decay time of approximately 1 ms. Since the 4.2 μm panel gap with the liquid crystal material shown in Table 3 provides a full one lambda retardation change, unlike typical displays that use a half lambda retardation change as shown in FIG. 35, a 1 ms response time for full one lambda retardation switching is very fast. Conventional liquid crystal panels having full one lambda retardation change have at least a 10 ms rise time with the same applied electric field strength, and a decay time of at least 50 ms with a 4 μm/4 μm line and space inter digit electrode structure. As shown in FIG. 35, the two large peaks show one dent at each large peak. This dent is due to the greater than 45 degree swing angle of liquid crystal molecules in a single plane under crossed Nicol optical condition.

Example 3 (Comparative Example)

To confirm the mixture of both in-plane and out-of-plane retardation switching without the technology of the embodiments above, a liquid crystal panel was prepared by the following procedure.

10 mm diameter, round-shaped transparent electrodes (with 60 nm thickness Indium Oxide layer) with patterned 25 mm×20 mm glass substrates were cleaned using high alkaline (ph 11) detergent. After being rinsed by DI water for over 15 minutes, the cleaned substrates were dried in a clean oven. Polyamide-imide solution (RN-1175: Nissan Chemical, Japan) was span coated on the cleaned substrate with a 2,500 rpm spin rate. After spin coating, the substrate was pre-cured on the hot plate at 80 C for 5 minutes, then final cured in the clean oven at 240 C for one hour. After being cured and cooled to room temperature, the coated polyamide-imide surface was buffed by a rubbing machine with 0.3 mm contact length with two passes. The rubbing direction of the pair substrates was in the so-called parallel direction. Silicon dioxide spherical shaped spacer balls having an average diameter of 4.2 microns were dispersed on the rubbed surface by spin coater with an iso propyl alcohol (IPA) dispersed solution. The spin coating rate was 1,200 rpm. After spin, the substrates were dried on the hot plate at 80 C for 5 minutes. Then the liquid crystal panels were laminated. The peripheral area was sealed using thermoset epoxy resin except for a 3 mm single open area for liquid crystal filling. The perimeter area sealed laminate panel was put into a vacuum bag and then put in oven set at 60 C for 4 hours. After the seal cure was confirmed, the empty panel was set to vacuum liquid crystal filling system. A chiral smectic C phase liquid crystal mixture ZLI-4851-100 (Merck) was filled in this prepared panel at an isotropic phase temperature of 85 C using the same vacuum filling system. After the inner air was sacked off from the empty panel, the filling area was attached with the temperature elevated liquid crystal reservoir in the vacuum chamber. After it was confirmed that the open area of the peripheral glue seal was completely covered by liquid crystal material, dried nitrogen gas was inserted into the vacuum chamber. The inserted nitrogen gas pushed the liquid crystal material into the empty panel. After it was confirmed that all of the inner panel area was filled with liquid crystal material visually, the panel was picked up and the filling area was chipped off using a UV curable glue (Norland 65, USA) with spot UV exposure.

Two smectic liquid crystal panels prepared as above were fabricated for the two panel stacking configuration using the measurement set up of FIG. 16. As the initial setting, without applying a drive voltage, the measured light throughput was adjusted as the minimum level. This set up was the so called extinction angle set up. The actual stacked panel angle to the incident linear polarized light was shifted clockwise by 24 degrees. The two panels were flipped such that the liquid crystal molecular movement of each of the panels were opposite one another. The electo-optic response was then measured. In this case, since extinction angle was not the same with the designed alignment angle, the extinction angle was set at the positive (+5 V) voltage was applied. When +5V was applied, the liquid crystal molecular long axis or optical axis was aligned to one of the tilted directions where the initial liquid crystal long molecular axis was aligned, as shown in FIG. 14.

The applied voltage was a rectangular waveform having a frequency of 200 Hz and amplitude of +/−5 V. The results are shown in FIG. 36. FIG. 36 shows mixing of both in-plane and out-of-plane retardation switching in accordance with the above discussion.

Example 4 (An Embodiment of the Invention)

To confirm in-plane only retardation switching with a different liquid crystal material, a liquid crystal panel was prepared by the following procedure.

10 mm diameter, round-shaped transparent electrodes (with 60 nm thickness Indium Oxide layer) with patterned 25 mm×20 mm glass substrates were cleaned using high alkaline (ph 11) detergent. After being rinsed by DI water for over 15 minutes, the cleaned substrates were dried in a clean oven. Polyamide-imide solution (RN-1175: Nissan Chemical, Japan) was span coated on the cleaned substrate with a 2,500 rpm spin rate. After spin coating, the substrate was pre-cured on the hot plate at 80 C for 5 minutes, then final cured in the clean oven at 240 C for one hour. After being cured and cooled to room temperature, the coated polyamide-imide surface was buffed by a rubbing machine with 0.3 mm contact length with two passes. The rubbing direction of the pair substrates was in the so-called parallel direction. Silicon dioxide spherical shaped spacer balls having an average diameter of 4.2 microns were dispersed on the rubbed surface by spin coater with an iso propyl alcohol (IPA) dispersed solution. The spin coating rate was 1,200 rpm. After spin, the substrates were dried on the hot plate at 80 C for 5 minutes. Then the liquid crystal panels were laminated. The peripheral area was sealed using thermoset epoxy resin except for a 3 mm single open area for liquid crystal filling. The perimeter area sealed laminate panel was put into a vacuum bag and then put in oven set at 60 C for 4 hours. After the seal cure was confirmed, the empty panel was set to vacuum liquid crystal filling system. The mixed smectic liquid crystal material shown in Table 4 was elevated to a temperature of 110 C and placed in the vacuum filling system. The smectic C phase of the liquid crystal mixture of Table 4 was confirmed both by differential scanning calorimetry (DSC) and polarized microscope texture observation. After the inner air was sacked off from the empty panel, the filling area was attached with the temperature elevated liquid crystal reservoir in the vacuum chamber. After it was confirmed that the open area of the peripheral glue seal was completely covered by liquid crystal material, dried nitrogen gas was inserted into the vacuum chamber. The inserted nitrogen gas pushed the liquid crystal material into the empty panel. After it was confirmed that all of the inner panel area was filled with liquid crystal material visually, the panel was picked up and the filling area was chipped off using a UV curable glue (Norland 65, USA) with spot UV exposure.

TABLE 4

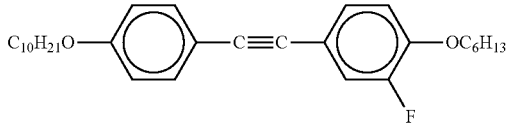

20 wt %

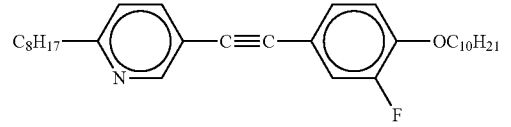

20 wt %

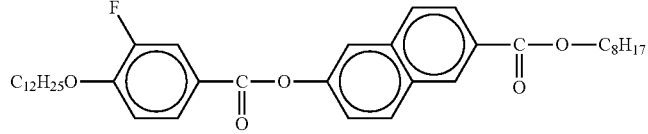

4 wt %

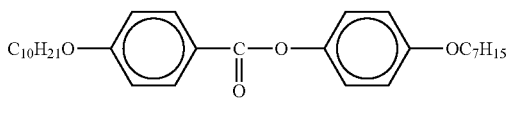

6 wt %

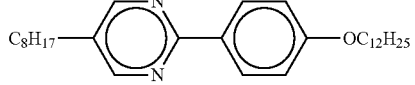

10 wt %

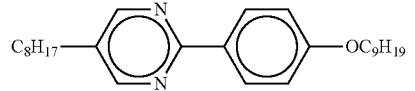

20 wt %

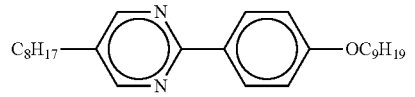

20 wt %

Two smectic liquid crystal panels prepared as above were fabricated for the two panel stacking configuration using the measurement set up of FIG. 16. As the initial setting, without applying a drive voltage, the measured light throughput was adjusted as the minimum level. This set up was the so called extinction angle set up. The actual stacked panel angle to the incident linear polarized light was shifted clockwise by 4 degrees. The applied voltage was a bipolar pulse have a frequency of 250 Hz and amplitude of +/−10 V, applied to both panels simultaneously. The liquid crystal swing direction of each panel was opposite, as shown in Case 6 of FIG. 30. The result showed that the two opposite in-plane molecular swing behaviors cancel total plane retardation, resulting in almost no signal.

Based on the above analysis and insight, this series of measurements confirmed the in-plane only retardation switching of this type of smectic liquid crystal panel.

Example 5 (Comparative Example)

To confirm the mixture of both in-plane and out-of-plane retardation switching without the technology of the embodiments above, a liquid crystal panel using an inter digit electrode structure was prepared by the following procedure. A 30 mm×30 mm glass substrate having 4 micron ITO line width and 4 micron electrode gap substrates were used for confirmation of retardation switching. The overall electrode structure used for this example is shown in FIG. 35. As shown in FIG. 35, the electrode pattern is an inter digit structure widely used for so called in-plane switching (IPS) LCDs. By the same process as described in the above examples, a 3 micron panel gap,m or so called IPS empty panel, was prepared. The liquid crystal molecular initial alignment direction was set for 20 degrees titled from the longer direction of the inter digit electrode by mechanical buffing. Nematic liquid crystal mixture MDA-10-3736 (Merck, Germany) was filled into the empty panel using the same vacuum filling process described above examples. The panels were stacked with each liquid crystal panel's liquid crystal molecular movement in the same direction.

Figure 37:
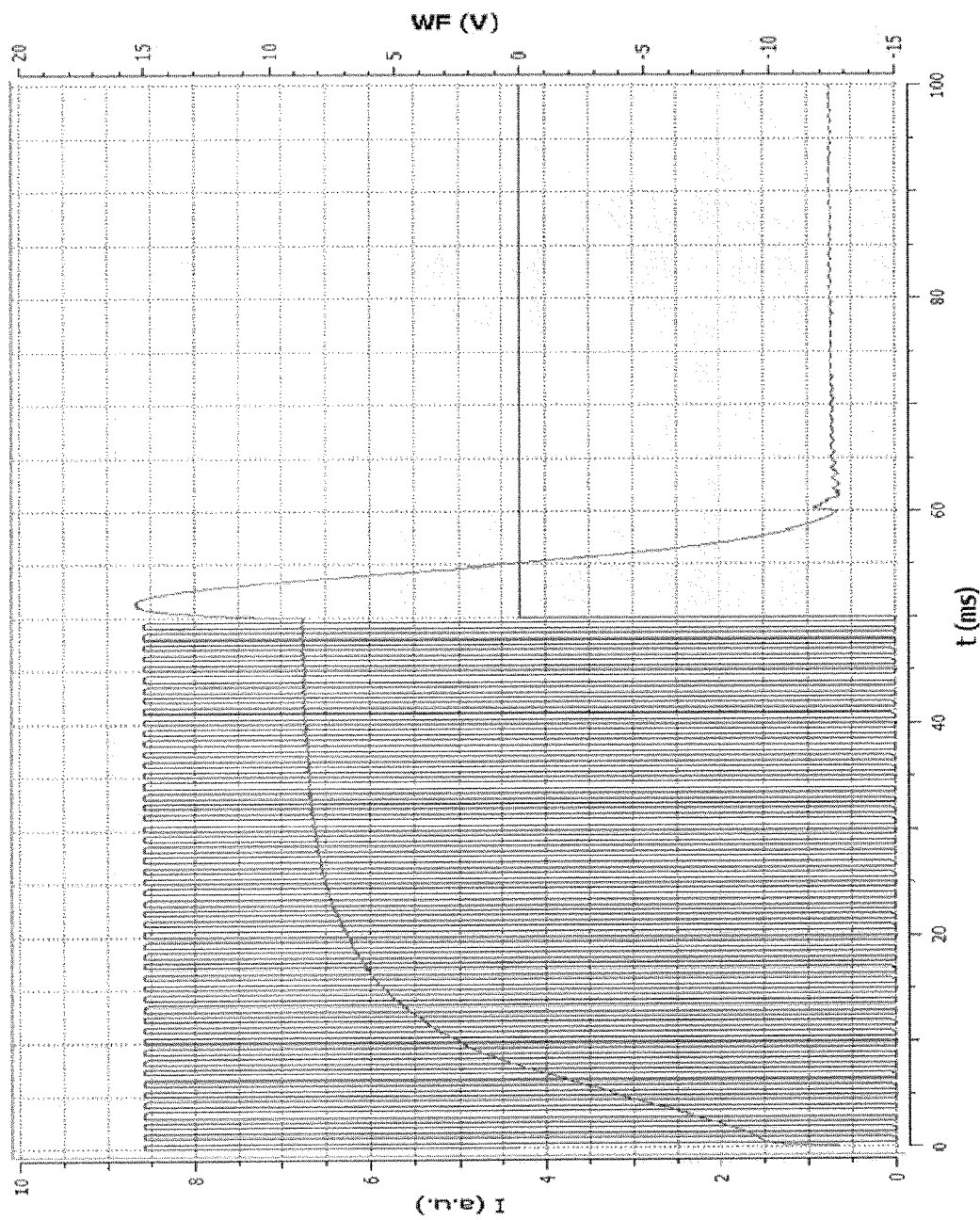
FIG. 37 illustrates the electro-optic response profile of two stacked liquid crystal panels. In-plane and out-of-plane retardation switching are observed.

A +/−15 V, 1 kHz rectangular waveform was applied to the inter digit electrode as every other line different potential electric field to apply so-called fringe field so that both of the IPS-LC panels provided the same liquid crystal molecular movement at the two panels. Using the measurement set up of FIG. 16, the electro-optic response behavior of the stacked two panels was observed, as shown in FIG. 37. FIG. 37 was measured by the initial configuration as follows. The initial liquid crystal molecular alignment direction was set with linear polarizer absorption. This configuration gave a dark state as the initial state. Once the fringe field works, out-of-plane retardation switching produces light throughput. The result showed obvious light throughput changes, which provides evidence of a mixture between in-plane and out-of-plane retardation switching.

In-plane only retardation optical switching realizes higher image quality amplitude modulation. Such higher image quality contributes improvement to fine pixel pitch higher resolution liquid crystal panel image quality. The improvement not only keeps a high contrast ratio, but also keeps fast response time with fine pixel pitch liquid crystal panels. Moreover, such improvement is also available using a simple top-bottom electrode structure, or vertical electric field application to the liquid crystal layer.

For phase modulation devices, in-plane only retardation provides pure phase modulation without changing amplitude modulation. This allows no light intensity change for phase modulation devices. With the use of top-bottom electrode, or vertical electric field application to liquid crystal layer, greater design freedom of phase modulation device is possible.

The invention claimed is:

1. An in-plane retardation switching device comprising:
a first substrate comprising a first electrode;
a second substrate comprising a second electrode; and
a liquid crystal layer contacting the first substrate and the second substrate and filling space between the first substrate and the second substrate, the liquid crystal layer including a non-chiral smectic C phase liquid crystal material disposed between the first substrate and the second substrate,
wherein the liquid crystal material is of a bulk state,
a liquid crystal molecular axis of the liquid crystal material stays within a plane parallel to the first and second substrates during the in-plane retardation switching,
no chiral liquid crystal material is disposed between the first electrode on the first substrate and the second electrode on the second substrate, and
the liquid crystal layer is homogeneously stacked between the first substrate and the second substrate.

2. The device of claim 1, wherein the first and second substrates are configured to apply an voltage to the liquid crystal material in a direction perpendicular to the first and second substrates.

3. An in-plane retardation switching device comprising:
a first substrate comprising a first electrode;
a second substrate comprising a second electrode; and
a liquid crystal layer contacting the first substrate and the second substrate and filling space between the first substrate and the second substrate, the liquid crystal layer including a liquid crystal material disposed between the first substrate and the second substrate,
wherein the liquid crystal material has a phase transition sequence of a smectic C phase, a smectic A phase, a nematic phase and an isotropic phase in this order,
a liquid crystal molecular axis of the liquid crystal material stays within a plane parallel to the first and second substrates during the in-plane retardation switching,
no chiral liquid crystal material is disposed between the first electrode on the first substrate and the second electrode on the second substrate, and
the liquid crystal layer is homogeneously stacked between the first substrate and the second substrate.

4. The in-plane retardation switching device of claim 3, wherein the phase transition sequence comprises a smectic sub phase of higher order than the smectic C phase before the smectic C phase.

5. The in-plane retardation switching device of claim 3, wherein the liquid crystal material shows an enthalpy change during phase transaction between the smectic A phase and the smectic C phase of at least 3 J/g.

6. The in-plane retardation switching device of claim 5, wherein the liquid crystal material shows an enthalpy change during phase transaction between the smectic A phase and the smectic C phase of at least 5 J/g.

7. An in-plane retardation switching device comprising:
a first substrate comprising a first electrode;
a second substrate comprising a second electrode; and
a liquid crystal layer contacting the first substrate and the second substrate and filling space between the first substrate and the second substrate, the liquid crystal layer including a non-chiral smectic C phase liquid crystal material disposed between the first substrate and the second substrate,
wherein the liquid crystal material does not have spontaneous polarization and is configured to be driven by quadrupole moment of the liquid crystal material,
a liquid crystal molecular axis of the liquid crystal material stays within a plane parallel to the first and second substrates during the in-plane retardation switching,
no chiral liquid crystal material is disposed between the first electrode on the first substrate and the second electrode on the second substrate, and
the liquid crystal layer is homogeneously stacked between the first substrate and the second substrate.

* * * * *